United States Patent
Albinger et al.

(10) Patent No.: US 11,497,144 B2
(45) Date of Patent: Nov. 8, 2022

(54) OPTIMIZED THERMAL CONTROL OF DATA CENTER

(71) Applicant: Johnson Controls Technology Company, Auburn Hills, MI (US)

(72) Inventors: Donald R. Albinger, New Berlin, WI (US); Karl F. Reichenberger, Mequon, WI (US); Sudhi R. Sinha, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/579,686

(22) Filed: Sep. 23, 2019

(65) Prior Publication Data

US 2020/0100394 A1    Mar. 26, 2020

Related U.S. Application Data

(60) Provisional application No. 62/734,829, filed on Sep. 21, 2018.

(51) Int. Cl.
| | |
|---|---|
| *H05K 7/20* | (2006.01) |
| *F24F 11/30* | (2018.01) |
| *G06F 30/20* | (2020.01) |
| *F24F 110/10* | (2018.01) |
| *G06F 119/08* | (2020.01) |

(52) U.S. Cl.
CPC ........ *H05K 7/20718* (2013.01); *F24F 11/30* (2018.01); *G06F 30/20* (2020.01); *H05K 7/20136* (2013.01); *H05K 7/20209* (2013.01); *F24F 2110/10* (2018.01); *G06F 2119/08* (2020.01)

(58) Field of Classification Search
CPC ... F24F 11/30; F24F 2110/10; G06F 2119/08; G06F 30/20; H05K 7/20136; H05K 7/20209; H05K 7/20718; H05K 7/20836
See application file for complete search history.

(56) References Cited

U.S. PATENT DOCUMENTS

| | | | |
|---|---|---|---|
| 9,753,465 B1* | 9/2017 | Ghose | H04L 29/06 |
| 10,101,731 B2 | 10/2018 | Asmus et al. | |
| 10,171,297 B2 | 1/2019 | Stewart et al. | |
| 10,180,261 B1* | 1/2019 | Ross | F24F 11/62 |
| 2016/0201934 A1* | 7/2016 | Hester | F24F 11/62 |
| | | | 700/276 |
| 2016/0313751 A1 | 10/2016 | Risbeck et al. | |
| 2017/0264493 A1* | 9/2017 | Cencini | H04L 67/1008 |
| 2017/0329649 A1* | 11/2017 | Cudak | G06F 1/206 |
| 2018/0285800 A1 | 10/2018 | Wenzel et al. | |
| 2019/0257544 A1 | 8/2019 | Alanqar et al. | |

* cited by examiner

*Primary Examiner* — Chad G Erdman
(74) *Attorney, Agent, or Firm* — Foley & Lardner LLP

(57) ABSTRACT

A method includes measuring a plurality of temperatures corresponding to a plurality of servers located in a data center, determining a subset of the plurality of servers as high-temperature servers based on the plurality of temperatures, and reassigning tasks from at least a portion of the subset of the plurality of servers to one or more other servers of the plurality of servers.

23 Claims, 20 Drawing Sheets

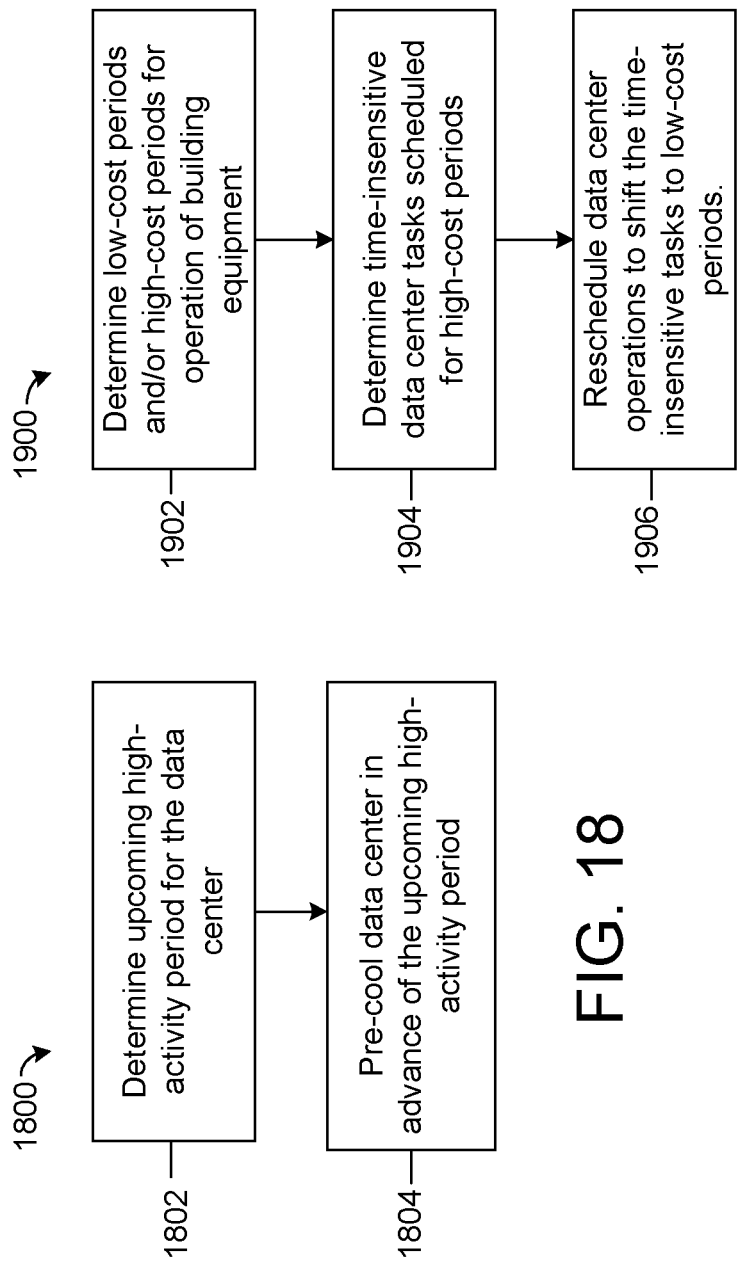

OPTIMIZED THERMAL CONTROL OF DATA CENTER

CROSS-REFERENCE TO RELATED APPLICATION

This application claims the benefit of and priority to U.S. Patent Application No. 62/734,829 filed Sep. 21, 2018, the entire disclosure of which is incorporated by reference herein.

BACKGROUND

The present disclosure relates to HVAC control for a data center, and more particularly to HVAC operation based on thermal contributions of servers and other data center equipment. Data center equipment (e.g., servers, processors, routers, power supplies, etc.) generate heat due to electrical resistance of electronic communications transmitted and processed therein. Building equipment, such as HVAC systems and other building systems, operate to manage the temperature and/or other environmental conditions in a space, for example a data center that houses data center equipment. Accordingly, a need exists for HVAC control systems that account for heat generated by data center equipment.

Some embodiments of the present disclosure relate generally to the operation of a central plant for serving building thermal energy loads and to distributing building thermal energy loads across a plurality of subplants configured to serve the building thermal energy loads. It should be understood that concepts, features, functions, processes, controllers, circuits, etc. are described herein with reference to a central plant and/or the plurality of subplants for the sake of generality and breadth and may also be adapted to be applied directly to an HVAC system, for example an HVAC system that serves a data center. The term HVAC system or equipment refers to a system associated with heating, ventilation, and/or air conditioning operations.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid then returns to the central plant to receive further heating or cooling and the cycle continues.

High efficiency equipment can help reduce the amount of energy consumed by a central plant; however, the effectiveness of such equipment is highly dependent on the control technology that is used to distribute the load across the multiple subplants. For example, it may be more cost efficient to run heat pump chillers instead of conventional chillers and a water heater when energy prices are high. It is difficult and challenging to determine when and to what extent each of the multiple subplants should be used to minimize energy cost. If electrical demand charges are considered, the optimization is even more complicated.

Thermal energy storage can be used to store energy for later use. When coupled with real-time pricing for electricity and demand charges, thermal energy storage provides a degree of flexibility that can be used to greatly decrease energy costs by shifting production to low cost times or when other electrical loads are lower so that a new peak demand is not set. It is difficult and challenging to integrate thermal energy storage with a central plant having multiple subplants and to optimize the use of thermal energy storage in conjunction with the multiple subplants to minimize energy cost.

SUMMARY

One implementation of the present disclosure is a method for operating heating, ventilation and air conditioning (HVAC) system in a data center. The method includes removing heat from air in the data center utilizing the HVAC system; collecting space temperature data and server temperature data, and using the space temperature data, the server temperature data, and a model of performance for the HVAC system and the data center to predict changes to the HVAC system and the data center. The changes are predicted to conserve energy while complying with temperature constraints for the data center and meeting a processing demand on the data center. The method also includes electronically controlling the HVAC system and the data center in accordance with the predicted changes for both the HVAC system and the data center.

In some embodiments, the model of performance of the HVAC system and the data center models an operational efficiency of servers of the data center as a function of at least one of the space temperature data or the server temperature data. In some embodiments, the model of performance for the HVAC system and the data center models thermal behavior of the data center as a function of a predicted outdoor air temperature.

In some embodiments, the changes include operating the HVAC system to pre-cool the data center in advance of a predicted increase in the processing demand on the data center. In some embodiments, the changes include shifting one or more computing tasks of the data center to a time period corresponding to a predicted increase in the efficiency of the HVAC system.

In some embodiments, the temperature constraints for the data center include a plurality of server temperature constraints corresponding to a plurality of servers. In some embodiments, the changes include providing targeted cooling to a first server of the data center and reassigning tasks from a second server of the data center to a third server of the data center.

Another implementation of the present disclosure is a method. The method includes measuring a plurality of temperatures corresponding to a plurality of servers located in a data center, determining a subset of the plurality of servers as high-temperature servers based on the plurality of temperatures, and reassigning tasks from at least a portion of the subset of the plurality of servers to one or more other servers of the plurality of servers.

In some embodiments, determining a subset of the plurality of servers as high-temperature servers based on the plurality of temperatures includes comparing, for each of the plurality of servers, a setpoint for the server to a corresponding temperature of the plurality of temperatures.

In some embodiments, the method includes providing targeted cooling to one or more servers in the subset. In some embodiments, reassigning tasks from at least a portion of the subset of the plurality of servers to one or more other servers of the plurality of servers comprises controlling the plurality of temperatures towards equilibrium across the data center.

In some embodiments, the method includes predicting a high-activity period for the plurality of servers and pre-cooling the data center in advance of the high-activity period. In some embodiments, the method includes rescheduling the tasks based on a time-variant cost of operating building equipment to cool the data center. In some embodiments, the one or more other servers have temperatures at or below a preferred operating temperature.

Another implementation of the present disclosure is a system. The system includes servers located at a data center and equipment configured to cool the servers. The equipment includes at least one of a central plant, an airside system, a waterside system, rack cooling equipment, a computer-room air conditioner, a rooftop unit, a floor cooling system, or a liquid cooling system. The system also includes a controller configured to control the equipment based on estimates of amounts of thermal energy output by each of the servers.

In some embodiments, the controller is configured to apply the estimates of the amounts of thermal energy output by the servers in a feedforward control approach to generate setpoints for the equipment.

In some embodiments, estimates of the amounts thermal energy output by the servers comprise predictions of the amount of thermal energy output by the servers for a plurality of time steps. The controller is configured to generate setpoints for the equipment for the plurality of time steps based on the predictions. In some embodiments, the controller is configured to generate the setpoints by performing an optimization process that minimizes an overall resource usage of the servers and the equipment over a time horizon.

In some embodiments, the controller is configured to reschedule operations of the servers based on a time-variant cost of operating the equipment. In some embodiments, the servers include fans and the controller is configured to control the fans. In some embodiments, the controller is configured to coordinate control of the waterside system, the airside system, the rack-cooling system, and the fans.

Another implementation of the present disclosure is a method. The method includes controlling operations of servers at a data center, controlling building equipment to cool the servers, determining a high-cost period for operating the building equipment and a low-cost period for operating the building equipment, identifying a time-insensitive task scheduled to occur during the high-cost period, and causing the time-insensitive task to be executed during the low-cost period.

In some embodiments, the method includes predicting a high-activity period for the servers and operating the building equipment to reduce a temperature at the servers before the high-activity period.

In some embodiments, the method includes comprising shifting the time-insensitive task from a first server to a second server based on a temperature differential between the first server and the second server. In some embodiments, determining the high-cost period includes predicting weather-based loads on the building equipment. In some embodiments, determining the high-cost period and the low-cost period includes determining utility rates over a time horizon. In some embodiments, the building equipment includes at least one of a central plant, an airside system, a waterside system, rack cooling equipment, a computer-room air conditioner, a rooftop unit, a floor cooling system, or a liquid cooling system.

Another implementation of the present disclosure is a method. The method includes providing a model of thermal behavior of a data center. The model includes a data center equipment term representing an amount of thermal energy provided to the data center by data center equipment. The method includes predicting values of the data center equipment term over a time horizon and performing an optimization process using the values and the model to generate setpoints for building equipment over the time horizon. The method also includes controlling the building equipment in accordance with the setpoints.

In some embodiments, the setpoints include amounts of thermal energy to be provided to the data center by the building equipment. In some embodiments, controlling the building equipment in accordance with the setpoints comprises pre-cooling the data center in advance of a predicted high-activity period for the data center equipment.

In some embodiments, the method includes coordinating control of the data center equipment and the building equipment. Coordinating control of the data center equipment and the building equipment may include scheduling operation of the data center equipment to reduce the amount of thermal energy provided to the data center by the building equipment over the time horizon. Coordinating control of the data center equipment and the building equipment may include scheduling operation of the data center based on a time-variant cost of operating the building equipment. Coordinating control of the data center equipment and the building equipment may include controlling the data center equipment to generate heat to reduce a load on the building equipment.

In some embodiments, predicting values of the data center equipment term comprises predicting heat generated by the data center equipment as a function of complexity of calculations executed on the data center equipment. In some embodiments, predicting values of the data center equipment term comprises predicting heat generated by the data center equipment based on a set of upcoming operations to be performed by the data equipment. In some embodiments, predicting values of the data center equipment term comprises predicting heat generated by the data center equipment as a function of physical data transmission routes of predicted data transmissions in the data center equipment.

In some embodiments, the data center equipment term is implemented in the model of thermal behavior of the data center as an input disturbance model. In some embodiments, providing the model comprises performing a system identification process using training data, the training data representing historical behavior of the building equipment and the data center equipment.

Another implementation of the present disclosure is one or more non-transitory computer-readable media containing program instructions that, when executed by one or more processors, cause the one or more processors to perform operations. The operations include predicting amounts of thermal energy provided by a data center equipment at specific times, receiving a measured temperature associated with the data center, using a model of thermal behavior of the data center to heat or cool the data center using building equipment. The model uses the measured temperature and the amounts of thermal energy provided by the data center to control the building equipment.

In some embodiments, the model operates to pre-cool the data center in advance of a predicted high-activity period for the data center. In some embodiments, the operations further comprising coordinating control of the data center equipment and the building equipment. Coordinating control of the data center equipment and the building equipment may include scheduling operation of the data center to reduce the amount of thermal energy provided to the data center by the building equipment over the time horizon. Coordinating control of the data center equipment and the building equipment may include scheduling operation of the data center based on a time-variant cost of operating the building equipment.

In some embodiments, predicting values of the data center equipment term comprises predicting heat generated by the data center equipment as a function of complexity of calculations executed on the data center equipment. In some embodiments, predicting amounts of thermal energy provided by data center equipment comprises predicting heat generated by the data center equipment based on a set of upcoming operations to be performed by the data equipment. In some embodiments, predicting amounts of thermal energy provided by data center equipment comprises predicting heat generated by the data center equipment as a function of physical data transmission routes of predicted data transmissions in the data center equipment.

Another implementation of the present disclosure is a heating, ventilation, and cooling (HVAC) system. The HVAC system includes building equipment and a controller. The controller is configured to receive a temperature value, a building mass heat value, and a prediction of heat provided by data center equipment in a data center and use a model to control the building equipment to heat or cool the data center. The model uses the building mass heat value and the prediction of heat provided by the thermal equipment to control the building equipment.

In some embodiments, the controller is configured to use the model to schedule amounts of heat to be provided or removed from the data center by the building system at a plurality of time steps. In some embodiments, the controller is configured to perform a system identification process to identify the model using training data. The training data may include historical information relating to operation of the data center equipment. The training data may include historical information relating to operating of the building equipment and historical weather data.

In some embodiments, the controller is configured to use the model to control the building equipment by generating setpoints for the building equipment that minimize a cost predicted using the model.

In some embodiments, the controller is further configured to coordinate control of the data center equipment and the building equipment using an artificial intelligence agent. In some embodiments, the controller is configured to schedule operation of the data center equipment to reduce the amount of thermal energy removed from the data center by the building equipment over a time period. In some embodiments, the controller is configured to schedule operation of the data center equipment based on a time-variant cost of operating the building equipment.

BRIEF DESCRIPTION OF THE DRAWINGS

FIG. 18 is a flowchart of a process for pre-cooling a data center, according to an exemplary embodiment.

FIG. 19 is a flowchart of a process for scheduling operations of the data center equipment, according to an exemplary embodiment.

DETAILED DESCRIPTION

Overview

Figure 1:
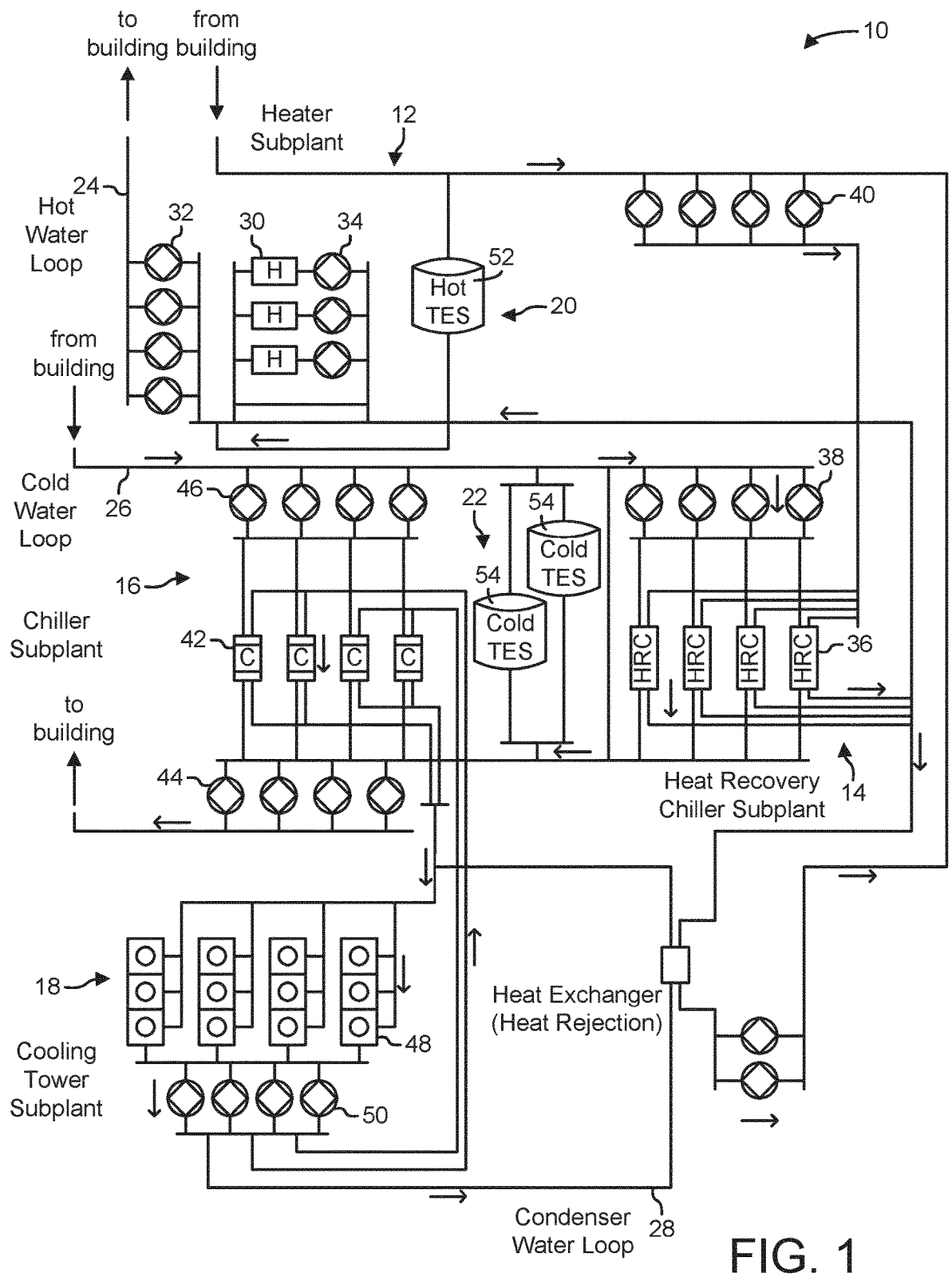
FIG. 1 is a schematic diagram of a central plant having a plurality of subplants including a heater subplant, heat recovery chiller subplant, a chiller subplant, a hot thermal energy storage subplant, and a cold thermal energy storage subplant, according to an exemplary embodiment.

Referring generally to the FIGURES, systems and methods for controlling HVAC equipment to heat or cool a data room (data center) are shown, according to exemplary embodiments. In some embodiments, systems and methods for optimizing control of a central plant and/or an HVAC system are shown, according to an exemplary embodiment. The systems and methods of the present disclosure are particularly suited for optimizing a central plant and/or an HVAC system that serves a data center, i.e., a space of a building that stores data center equipment (e.g., servers, computers, processors, routers, network components, etc.), in some embodiments. Data center equipment generates heat via electrical resistance while operating to execute various computing functions. This heat contributes to a disturbance load on the data center, thereby affecting the behavior of the central plant and/or HVAC system. The systems and methods described herein allow for coordination between a central plant and/or HVAC system and the data center equipment to improve optimization of the operation of both the central plant/HVAC system and the data center equipment, in some embodiments. For example, predictions of the heat generated by the data center equipment may be used in high level optimization, low level optimization, and/or model predictive control of a central plant and/or HVAC system. In some embodiments, a data center HVAC system which is not a central plant operates to heat or cool the data center. For example, a dedicated HVAC unit or series of units could provide heating and cooling for the data center.

A central plant is one type of system that could be used to heat or cool a data center. A central plant may include may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus. Optimizing the central plant may include operating the various subplants in such a way that results in a minimum monetary cost to serve the building energy loads.

In some embodiments, the central plant optimization is a cascaded optimization process including a high level optimization and a low level optimization. The high level optimization may determine an optimal distribution of energy loads across the various subplants. For example, the high level optimization may determine a thermal energy load to be produced by each of the subplants at each time element in an optimization period. In some embodiments, the high level optimization includes optimizing a high level cost function that expresses the monetary cost of operating the subplants as a function of the resources consumed by the subplants at each time element of the optimization period. The low level optimization may use the optimal load distribution determined by the high level optimization to determine optimal operating statuses for individual devices within each subplant. Optimal operating statuses may include, for example, on/off states and/or operating setpoints for individual devices of each subplant. The low level optimization may include optimizing a low level cost function that expresses the energy consumption of a subplant as a function of the on/off states and/or operating setpoints for the individual devices of the subplant.

In some embodiments, high level optimization systems and methods are provided for controlling HVAC equipment. A high level optimization circuit may perform the high level optimization. In various embodiments, the high level optimization circuit may be a component of a central plant controller configured for real-time control of a physical plant or a component of a planning tool configured to optimize a simulated plant (e.g., for planning or design purposes).

In some embodiments, the high level optimization circuit uses a linear programming framework to perform the high level optimization. Advantageously, linear programming can efficiently handle complex optimization scenarios and can optimize over a relatively long optimization period (e.g., days, weeks, years, etc.) in a relatively short timeframe (e.g., seconds, milliseconds, etc.). In other embodiments, the high level optimization circuit may use any of a variety of other optimization frameworks (e.g., quadratic programming, linear-fractional programming, nonlinear programming, combinatorial algorithms, etc.).

An objective function defining the high level optimization problem can be expressed in the linear programming framework as:

$$\mathop{\mathrm{argmin}}_{x} c^T x; \text{ subject to } Ax \leq b, Hx = g$$

where c is a cost vector, x is a decision matrix, A and b are a matrix and vector (respectively) which describe inequality constraints on the variables in the decision matrix x, and H and g are a matrix and vector (respectively) which describe equality constraints on the variables in the decision matrix x. The variables in the decision matrix x may include the subplant loads assigned to the various subplants and/or an amount of resource consumption by the subplants at each time element in the optimization period. The high level optimization circuit may define the cost vector c and the optimization constraints (e.g., the matrices A and H and the vectors b and g) and solve the optimization problem to determine optimal subplant load values for the variables in the decision matrix x.

The high level optimization circuit may receive, as an input, predicted or planned energy loads for the building or campus for each of the time elements in the optimization period. The high level optimization circuit may use the predicted or planned loads to formulate the constraints on the high level optimization problem (e.g., to define the matrices A and H and the vectors b and g). The high level optimization circuit may also receive utility rates (e.g., energy prices, water prices, demand charges, etc.) defining the cost of each resource consumed by the central plant to serve the energy loads. The utility rates may be time-variable rates (e.g., defining a different rates at different times) and may include demand charges for various time periods. The high level optimization circuit may use the utility rates to define the cost vector c.

The high level optimization circuit may receive or generate subplant curves for each of the subplants. A subplant curve defines the resource consumption of a subplant as a function of the load produced by the subplant. The subplant curves may be generated by a low level optimization circuit or by the high level optimization circuit based on operating data points received from the low level optimization circuit. The high level optimization circuit may use the subplant curves to constrain the resource consumption of each subplant to a value along the corresponding subplant curve (e.g., based on the load produced by the subplant). For example, the high level optimization circuit may use the subplant curves to define the optimization constraints (e.g., the matrices A and H and the vectors b and g) on the high level optimization problem.

In some embodiments, the high level optimization circuit is configured to incorporate a demand charge into the high level optimization process. The demand charge is an additional charge imposed by some utility providers based on the maximum rate of resource consumption during an applicable demand charge period. For example, an electric demand charge may be provided as a cost $c_{demand}$ per unit power and may be multiplied by the peak electricity usage $\max(P_{elec,k})$ during a demand charge period to determine the demand charge. Conventional systems have been unable to incorporate a demand charge into a linear optimization framework due to the nonlinear max( ) function used to calculate the demand charge.

Advantageously, the high level optimization circuit of the present disclosure may be configured to incorporate the demand charge into the linear optimization framework by modifying the decision matrix x, the cost vector c, and/or the A matrix and the b vector which describe the inequality constraints. For example, the high level optimization circuit may modify the decision matrix x by adding a new decision variable $x_{peak}$ representing the peak power consumption within the optimization period. The high level optimization circuit may modify the cost vector c with the demand charge rate $c_{demand}$ such that the demand charge rate $c_{demand}$ is multiplied by the peak power consumption $x_{peak}$. The high level optimization circuit may generate and/or impose constraints to ensure that the peak power consumption $x_{peak}$ is greater than or equal to the electric demand for each time step in the demand charge period and greater than or equal to its previous value during the demand charge period.

In some embodiments, the high level optimization circuit is configured to incorporate a load change penalty into the high level optimization process. The load change penalty may represent an increased cost (e.g., equipment degradation, etc.) resulting from a rapid change in the load assigned to a subplant. The high level optimization circuit may incorporate the load change penalty by modifying the decision matrix x, the cost vector c, and/or the optimization constraints. For example, the high level optimization circuit may modify the decision matrix x by adding load change variables $\delta$ for each subplant. The load change variables may represent the change in subplant load for each subplant from one time element to the next. The high level optimization circuit may modify the cost vector c to add a cost associated with changing the subplant loads. In some embodiments, the high level optimization circuit adds constraints that constrain the load change variables $\delta$ to the corresponding change in the subplant load. These and other enhancements to the high level optimization process may be incorporated into the linear optimization framework, as described in greater detail below.

Central Plant Optimization

Referring now to FIG. 1, a diagram of a central plant 10 is shown, according to an exemplary embodiment. The central plant 10 is one type of system that may be used to heat or cool a data center. In some embodiments, an HVAC system is used instead or in addition to the central plant 10. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subsystems 12-22.

Although central plant 10 is shown and described as heating and cooling water for circulation to a building, it is understood that any other type of working fluid (e.g., glycol, CO2, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
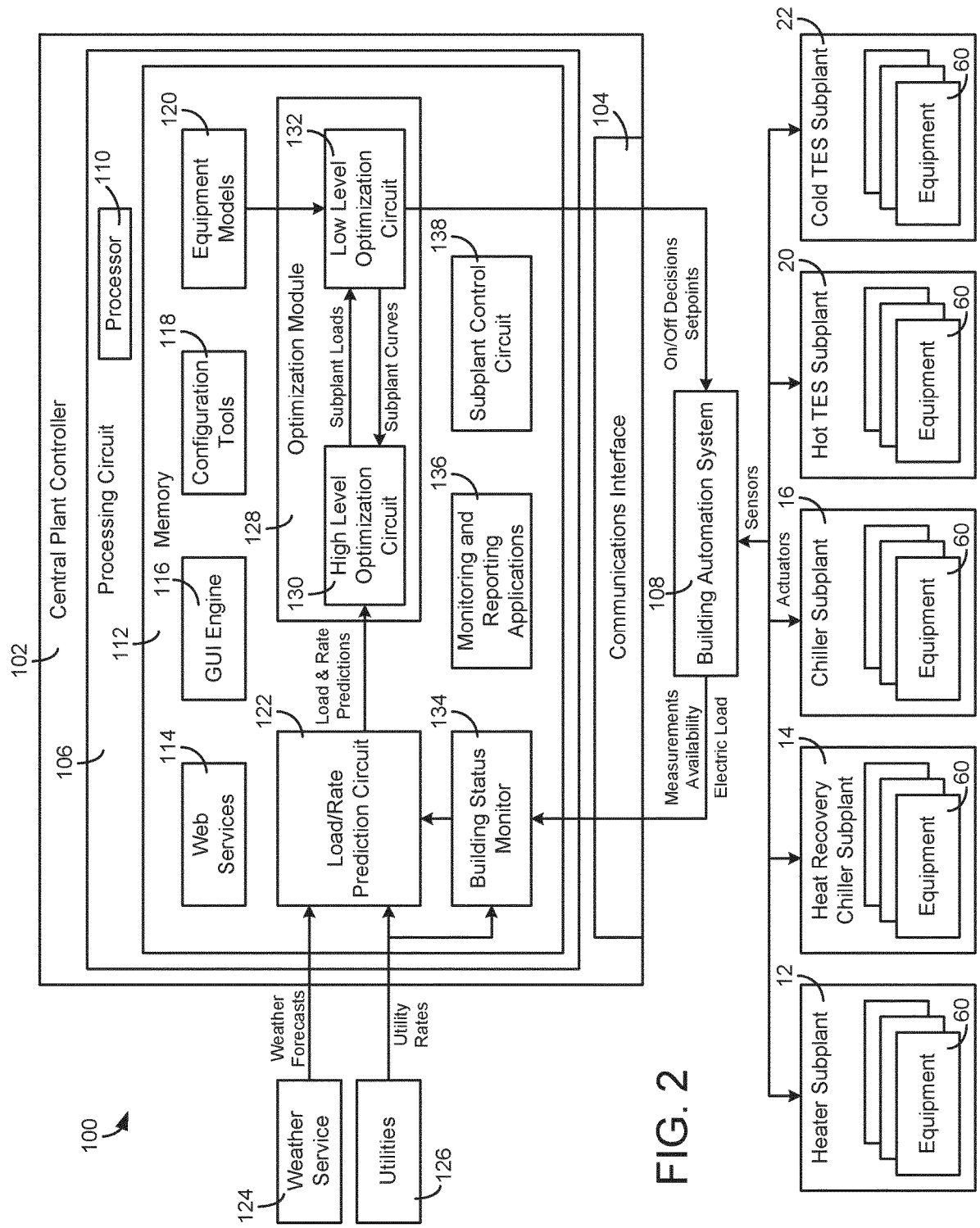
FIG. 2 is a block diagram illustrating a central plant system including a central plant controller that may be used to control the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52, 54, pumps 32, 44, 50, valves 34, 38, 46, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 includes a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building or building zone. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. Central plant controller 102 may be configured to carry out process 1100 (FIG. 11) and other processes described herein. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may integrated with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a WiFi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 106) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate prediction circuit 122. Load/rate prediction circuit 122 may be configured to predict the thermal energy loads ($\hat{l}_k$) of the building or campus for each time step k (e.g., k=1 . . . n) of an optimization period. Load/rate prediction circuit 122 is shown receiving weather forecasts from a weather service 124. In some embodiments, load/rate prediction circuit 122 predicts the thermal energy loads $\hat{l}_k$ as a function of the weather forecasts. In some embodiments, load/rate prediction circuit 122 uses feedback from BAS 108 to predict loads $\hat{l}_k$. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In an embodiment where the central plant and/or an HVAC system serves a data center, the load/rate prediction circuit 122 receives a prediction of heat generated by data center equipment in the data center from a data equipment heat predictor circuit 300. The data equipment heat predictor circuit 300 is described in more detail with reference to FIG. 12. Because a significant amount of heat may be generated by the operation of data center equipment in a data center, the heat from the data center equipment may substantially alter the load on the HVAC system and/or central plant that is configured to maintain the data center at or around a desired temperature setpoint. Accordingly, the load/rate predictor 300 is configured to incorporate the predicted heat generated by the data center equipment from the data equipment heat predictor circuit 300 in generating the thermal energy loads ($\hat{l}_k$) of the building or campus for each time step k of the optimization period. The predicted heat generated by the data center equipment from the data equipment heat predictor circuit 300 may thereby be propagated through and influence the operation of the central plant controller 102 including the high level optimization circuit 130 and the low level optimization circuit 132 to cause the subplants 12-22 to be controlled based in part on the predicted heat generated by the data center equipment.

In some embodiments, load/rate prediction circuit 122 receives a measured electric load and/or previous measured load data from BAS 108 (e.g., via building status monitor 134). Load/rate prediction circuit 122 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate prediction circuit 122 uses a deterministic plus stochastic model trained from historical load data to predict loads $\hat{l}_k$. Load/rate prediction circuit 122 may use any of a variety of prediction methods to predict loads $\hat{l}_k$ (e.g., linear regression for the deterministic portion and an AR model for the stochastic portion). Load/rate prediction circuit 122 may predict one or more different types of loads for the building or campus. For example, load/rate prediction circuit 122 may predict a hot water load $\hat{l}_{Hot,k}$ and a cold water load $\hat{l}_{Cold,k}$ for each time step k within the prediction window.

Load/rate prediction circuit 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 126 or predicted utility rates estimated by load/rate prediction circuit 122.

In some embodiments, the utility rates include demand charges for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization circuit 128 may be configured to account for demand charges in the high level optimization process performed by high level optimization circuit 130. Utilities 126 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate prediction circuit 122 may store the predicted loads $\hat{l}_k$ and the utility rates in memory 112 and/or provide the predicted loads $\hat{l}_k$ and the utility rates to optimization circuit 128. Optimization circuit 128 may use the predicted loads $\hat{l}_k$ and the utility rates to determine an optimal load distribution for subplants 12-22 and to generate on/off decisions and setpoints for equipment 60.

Still referring to FIG. 2, memory 112 is shown to include an optimization circuit 128. Optimization circuit 128 may perform a cascaded optimization process to optimize the performance of central plant 10. For example, optimization circuit 128 is shown to include a high level optimization circuit 130 and a low level optimization circuit 132. High level optimization circuit 130 may control an outer (e.g., subplant level) loop of the cascaded optimization. High level optimization circuit 130 may determine an optimal distribution of thermal energy loads across subplants 12-22 for each time step in the prediction window in order to optimize (e.g., minimize) the cost of energy consumed by subplants 12-22. Low level optimization circuit 132 may control an inner (e.g., equipment level) loop of the cascaded optimization. Low level optimization circuit 132 may determine how to best run each subplant at the load setpoint determined by high level optimization circuit 130. For example, low level optimization circuit 132 may determine on/off states and/or operating setpoints for various devices of equipment 60 in order to optimize (e.g., minimize) the energy consumption of each subplant while meeting the thermal energy load setpoint for the subplant. The cascaded optimization process is described in greater detail with reference to FIG. 3.

Still referring to FIG. 2, memory 112 is shown to include a subplant control circuit 138. Subplant control circuit 138 may store historical data regarding past operating statuses, past operating setpoints, and instructions for calculating and/or implementing control parameters for subplants 12-22. Subplant control circuit 138 may also receive, store, and/or transmit data regarding the conditions of individual devices of equipment 60, such as operating efficiency, equipment degradation, a date since last service, a lifespan parameter, a condition grade, or other device-specific data. Subplant control circuit 138 may receive data from subplants 12-22 and/or BAS 108 via communications interface 104. Subplant control circuit 138 may also receive and store on/off statuses and operating setpoints from low level optimization circuit 132.

Data and processing results from optimization circuit 128, subplant control circuit 138, or other circuits of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML databases, etc.) of relevant data and includes computer code circuits that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
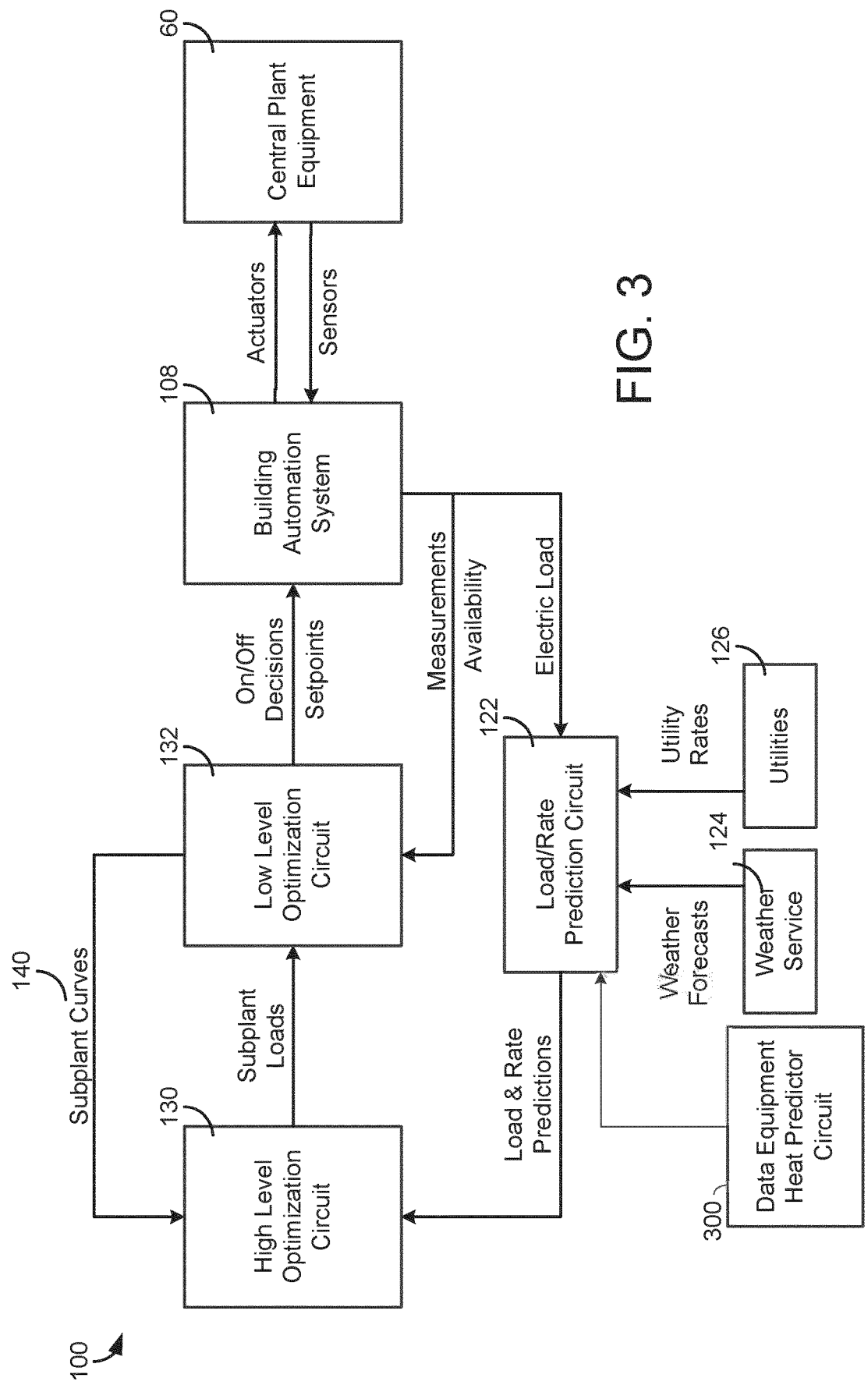
FIG. 3 is block diagram illustrating a portion of central plant system of FIG. 2 in greater detail, showing a load/rate prediction circuit, a high level optimization circuit, a low level optimization circuit, a building automation system, and central plant equipment, according to an exemplary embodiment.

Referring now to FIG. 3, a block diagram illustrating a portion of central plant system 100 in greater detail is shown, according to an exemplary embodiment. FIG. 3 illustrates the cascaded optimization process performed by optimization circuit 128 to optimize the performance of central plant 10. In the cascaded optimization process, high level optimization circuit 130 performs a subplant level optimization that determines an optimal distribution of thermal energy loads across subplants 12-22 for each time step in the prediction window in order to minimize the cost of energy consumed by subplants 12-22. Low level optimization circuit 132 performs an equipment level optimization that determines how to best run each subplant at the subplant load setpoint determined by high level optimization circuit 130. For example, low level optimization circuit 132 may determine on/off states and/or operating setpoints for various devices of equipment 60 in order to optimize the energy consumption of each subplant while meeting the thermal energy load setpoint for the subplant.

One advantage of the cascaded optimization process performed by optimization circuit 128 is the optimal use of computational time. For example, the subplant level optimization performed by high level optimization circuit 130 may use a relatively long time horizon due to the operation of the thermal energy storage. However, the equipment level optimization performed by low level optimization circuit 132 may use a much shorter time horizon or no time horizon at all since the low level system dynamics are relatively fast (compared to the dynamics of the thermal energy storage) and the low level control of equipment 60 may be handled by BAS 108. Such an optimal use of computational time makes it possible for optimization circuit 128 to perform the central plant optimization in a short amount of time, allowing for real-time predictive control. For example, the short computational time enables optimization circuit 128 to be implemented in a real-time planning tool with interactive feedback.

Another advantage of the cascaded optimization performed by optimization circuit 128 is that the central plant optimization problem can be split into two cascaded subproblems. The cascaded configuration provides a layer of abstraction that allows high level optimization circuit 130 to distribute the thermal energy loads across subplants 12-22 without requiring high level optimization circuit 130 to know or use any details regarding the particular equipment configuration within each subplant. The interconnections between equipment 60 within each subplant may be hidden from high level optimization circuit 130 and handled by low level optimization circuit 132. For purposes of the subplant level optimization performed by high level optimization circuit 130, each subplant may be completely defined by one or more subplant curves 140.

Still referring to FIG. 3, low level optimization circuit 132 may generate and provide subplant curves 140 to high level optimization circuit 130. Subplant curves 140 may indicate the rate of utility use by each of subplants 12-22 (e.g., electricity use measured in kW, water use measured in L/s, etc.) as a function of the subplant load. Exemplary subplant curves are shown and described in greater detail with reference to FIGS. 5A-8. In some embodiments, low level optimization circuit 132 generates subplant curves 140 based on equipment models 120 (e.g., by combining equipment models 120 for individual devices into an aggregate curve for the subplant). Low level optimization circuit 132 may generate subplant curves 140 by running the low level optimization process for several different loads and weather conditions to generate multiple data points. Low level optimization circuit 132 may fit a curve to the data points to generate subplant curves 140. In other embodiments, low level optimization circuit 132 provides the data points to high level optimization circuit 132 and high level optimization circuit 132 generates the subplant curves using the data points.

High level optimization circuit 130 may receive the load and rate predictions from load/rate prediction circuit 122 and the subplant curves 140 from low level optimization circuit 132. The load predictions may be based on weather forecasts from weather service 124 and/or information from building automation system 108 (e.g., a current electric load of the building, measurements from the building, a history of previous loads, a setpoint trajectory, etc.). The utility rate predictions may be based on utility rates received from utilities 126 and/or utility prices from another data source. High level optimization circuit 130 may determine the optimal load distribution for subplants 12-22 (e.g., a subplant load for each subplant) for each time step the prediction window and provide the subplant loads as setpoints to low level optimization circuit 132. In some embodiments, high level optimization circuit 130 determines the subplant loads by minimizing the total operating cost of central plant 10 over the prediction window. In other words, given a predicted load and utility rate information from load/rate prediction circuit 122, high level optimization circuit 130 may distribute the predicted load across subplants 12-22 over the optimization period to minimize operating cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta^*_{HL} = \underset{\theta_{HL}}{\mathrm{argmin}}\, J_{HL}(\theta_{HL})$$

where $\theta^*_{HL}$ contains the optimal high level decisions (e.g., the optimal load for each of subplants 12-22) for the entire optimization period and $J_{HL}$ is the high level cost function.

To find the optimal high level decisions $\theta^*_{HL}$, high level optimization circuit 132 may minimize the high level cost function $J_{HL}$. The high level cost function $J_{HL}$ may be the sum of the economic costs of each utility consumed by each of subplants 12-22 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions lead to both equality and inequality constraints on the high level optimization problem, as described in greater detail with reference to FIG. 4.

Still referring to FIG. 3, low level optimization circuit 132 may use the subplant loads determined by high level optimization circuit 130 to determine optimal low level decisions $\theta^*_{LL}$ (e.g. binary on/off decisions, flow setpoints, temperature setpoints, etc.) for equipment 60. The low level optimization process may be performed for each of subplants 12-22. Low level optimization circuit 132 may be responsible for determining which devices of each subplant to use and/or the operating setpoints for such devices that will achieve the subplant load setpoint while minimizing energy consumption. The low level optimization may be described using the following equation:

$$\theta^*_{LL} = \operatorname*{argmin}_{\theta_{LL}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimization circuit 132 may minimize the low level cost function $J_{LL}$. The low level cost function $J_{LL}$ may represent the total energy consumption for all of equipment 60 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization circuit 132 may minimize the low level cost function $J_{LL}$ subject to inequality constraints based on the capacities of equipment 60 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimization circuit 132 performs the equipment level optimization without considering system dynamics. The optimization process may be slow enough to safely assume that the equipment control has reached its steady-state. Thus, low level optimization circuit 132 may determine the optimal low level decisions $\theta^*_{LL}$ at an instance of time rather than over a long horizon.

Low level optimization circuit 132 may determine optimum operating statuses (e.g., on or off) for a plurality of devices of equipment 60. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization circuit 132 may also determine optimum operating setpoints for equipment using nonlinear optimization. Nonlinear optimization may identify operating setpoints that further minimize the low level cost function $J_{LL}$. Low level optimization circuit 132 may provide the on/off decisions and setpoints to building automation system 108 for use in controlling the central plant equipment 60.

In some embodiments, the low level optimization performed by low level optimization circuit 132 is the same or similar to the low level optimization process described in U.S. patent application Ser. No. 14/634,615, filed Feb. 27, 2015, incorporated by reference herein in its entirety.

Figure 4:
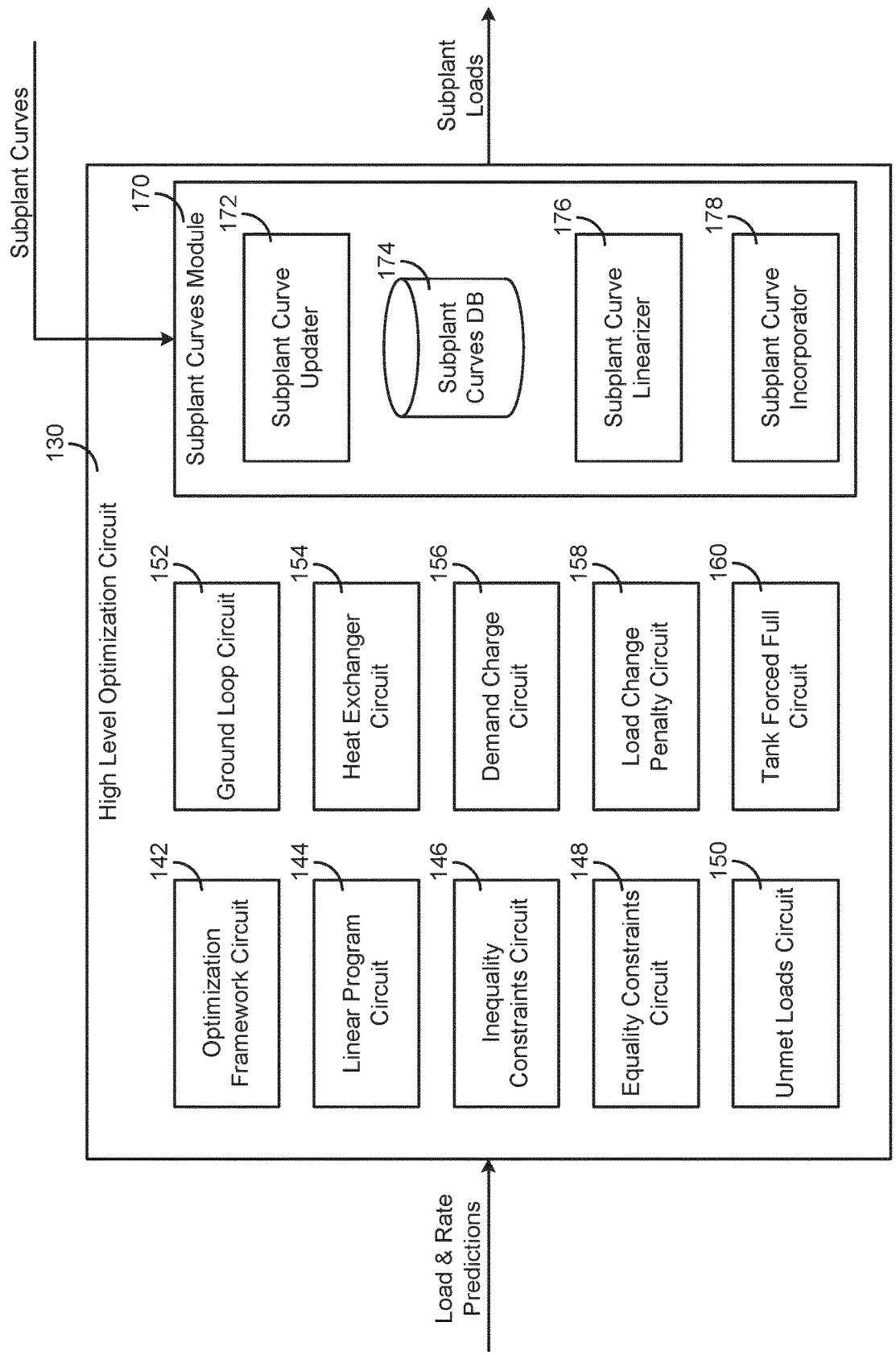
FIG. 4, a block diagram illustrating the high level optimization circuit of FIG. 3 in greater detail, according to an exemplary embodiment.

Referring now to FIG. 4, a block diagram illustrating high level optimization circuit 130 in greater detail is shown, according to an exemplary embodiment. High level optimization circuit 130 may receive load and rate predictions from load/rate prediction circuit 122 and subplant curves from low level optimization circuit 132. High level optimization circuit 130 may determine optimal subplant loads for each of subplants 12-22 as a function of the load and rate predictions and the subplant curves. In some embodiments, the optimal subplant loads minimize the economic cost of operating subplants 12-22 to satisfy the predicted loads for the building or campus. High level optimization circuit 130 may output the optimal subplant loads to low level optimization circuit 132.

High level optimization circuit 130 is shown to include an optimization framework circuit 142. Optimization framework circuit 142 may be configured to select and/or establish an optimization framework for use in calculating the optimal subplant loads. In some embodiments, optimization framework circuit 142 uses linear programming as the optimization framework. A linear programming problem has the following form:

$$\operatorname*{argmax}_{x} c^T x; \text{ subject to } Ax \leq b, Hx = g$$

where c is a cost vector, x is a decision matrix, A and b are a matrix and vector (respectively) which describe inequality constraints on the optimization problem, and H and g are a matrix and vector (respectively) which describe equality constraints on the optimization problem.

The following paragraphs describe an exemplary linear optimization framework that may be used by high level optimization circuit 130 to calculate the optimal subplant loads. Advantageously, the linear programming framework described herein allows high level optimization circuit 130 to determine the subplant load distribution for a long optimization period in a very short timeframe complete with load change penalties, demand charges, and subplant performance curves. However, the linear optimization framework is merely one example of an optimization framework that can be used by high level optimization circuit 130 and should not be regarded as limiting. It should be understood that in other embodiments, high level optimization circuit 130 may use any of a variety of other optimization frameworks and/or optimization techniques (e.g., quadratic programming, linear-fractional programming, nonlinear programming, combinatorial algorithms, etc.) to calculate the optimal subplant loads.

Still referring to FIG. 4, high level optimization circuit 130 is shown to include a linear program circuit 144. Linear program circuit 144 may be configured to formulate and solve a linear optimization problem to calculate the optimal subplant loads. For example, linear program circuit 144 may determine and set values for the cost vector c, the A matrix and the b vector which describe the inequality constraints, and the H matrix and the g vector which describe the equality constraints. Linear program circuit 144 may determine an optimal decision matrix x* that minimizes the cost function $c^T x$. The optimal decision matrix x* may correspond to the optimal decisions $\theta^*_{HL}$ (for each time step k within an optimization period) that minimize the high level cost function $J_{HL}$, as described with reference to FIG. 3.

For a central plant 10 that includes chillers, heat recovery chillers, hot water generators, and thermal energy storage, the plant assets across which the loads are to be distributed may include a chiller subplant 16, a heat recovery chiller subplant 14, a heater subplant 12, a hot thermal energy storage subplant 20, and a cold thermal energy storage subplant 22. The loads across each of subplants 12-22 may be the decision variables in the decision matrix x that the high level optimization determines for each time step k within the optimization period. For example, linear program circuit 144 may formulate the decision matrix x as:

$$x = [\dot{Q}_{Chiller,1 \ldots n}, \dot{Q}_{hrChiller,1 \ldots n}, \dot{Q}_{Heater,1 \ldots n}, \dot{Q}_{HotStorage,1 \ldots n}, \dot{Q}_{ColdStorage,1 \ldots n}]^T$$

where $\dot{Q}_{Chiller,1 \ldots n}$, $\dot{Q}_{hrChiller,1 \ldots n}$, $\dot{Q}_{Heater,1 \ldots n}$, $\dot{Q}_{HotStorage,1 \ldots n}$, and $\dot{Q}_{ColdStorage,1 \ldots n}$ are n-dimensional vectors representing the thermal energy load assigned to chiller subplant 16, heat recovery chiller subplant 14, heater subplant 12, hot TES subplant 20, and cold TES subplant 22, respectively, for each of the n time steps within the optimization period.

Linear program circuit 144 may formulate the linear program for the simple case where only energy cost and equipment constraints are considered. The simplified linear program may then be modified by inequality constraints circuit 146, equality constraints circuit 148, unmet loads circuit 150, ground loop circuit 152, heat exchanger circuit 154, demand charge circuit 156, load change penalty circuit 158, tank forced full circuit 160, and/or subplant curves circuit 170 to provide additional enhancements, described in greater detail below.

In some embodiments, linear program circuit 144 formulates the simplified linear program using the assumption that each subplant has a specific cost per unit load. For example, linear program circuit 144 may assume that each subplant has a constant coefficient of performance (COP) or efficiency for any given time step k. The COP can change over time and may have a different value for different time steps; however, in the simplest case, the COP for each of subplant is not a function of the loading. With this assumption, linear program circuit 144 may formulate the cost function c as:

$$c = t_s \cdot \left[ \left[ \sum_{j=1}^{n_u} c_j u_{j,Chiller} \right]_{1 \ldots h}, \left[ \sum_{j=1}^{n_u} c_j u_{j,hrChiller} \right]_{1 \ldots h}, \left[ \sum_{j=1}^{n_u} c_j u_{j,Heater} \right]_{1 \ldots h}, 0_h, 0_h \right]^T$$

where $t_s$ is the duration of a time step, $n_u$ is the total number of resources (e.g., electricity, natural gas, water, etc.) consumed by the subplants, $c_j$ is the cost per unit of the jth resource, and $u_{j,Chiller}$, $u_{j,hrChiller}$, and $u_{j,Heater}$ are the usage rates of the jth resource by chiller subplant 16, heat recovery chiller subplant 14, and heater subplant 12, respectively, for each of the h time steps within the optimization period. The first three elements of the form $[\Sigma_{j=1}^{n_u} c_j u_j]_{1 \ldots h}$ represent vectors of h sums (i.e., summing over all resource use), one for each time step within the optimization period. The last two elements of the form $0_h$ are zero to indicate that charging or discharging the thermal energy storage tanks has no cost (pumping power is neglected).

In some embodiments, linear program circuit 144 uses the load and rate predictions to formulate the linear program. For example, linear program circuit 144 may use the load predictions to determine values for $u_{j,Chiller}$, $u_{j,hrChiller}$, and $u_{j,Heater}$ and may use the rate predictions to determine values for $c_j$ for each of the $n_u$ resources. In some embodiments, linear program circuit 144 uses the subplant curves to define $c_j$ as a function of the resource usage. Linear program circuit 144 may use inputs from inequality constraints circuit 146, equality constraints circuit 148, unmet loads circuit 150, ground loop circuit 152, heat exchanger circuit 154, demand charge circuit 156, load change penalty circuit 158, tank forced full circuit 160, and/or subplant curves circuit 170 to determine and set values for the various matrices and vectors in the linear program. Circuits 146-170 may modify the cost vector c, the A matrix, the b vector, the H matrix, and/or the g vector to provide additional enhancements and/or functionality to the linear program. The inputs provided by circuits 146-170 are described in greater detail below.

Linear program circuit 144 may use any of a variety of linear optimization techniques to solve the linear optimization problem. For example, linear program circuit 144 may use basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the linear program subject to the optimization constraints. For embodiments in which nonlinear optimization is used, linear program circuit 144 may use any of a variety of nonlinear optimization techniques to solve the nonlinear optimization problem.

Still referring to FIG. 4, high level optimization circuit 130 is shown to include an inequality constraints circuit 146. Inequality constraints circuit 146 may formulate or define one or more inequality constraints on the optimization problem solved by linear program circuit 144. In some instances, inequality constraints circuit 146 defines inequality constraints on the decision variables $\dot{Q}_{Chiller,k}$, $\dot{Q}_{hrChiller,k}$, and $\dot{Q}_{Heater,k}$ corresponding to the loads on chiller subplant 16, heat recovery chiller subplant 14, and heater subplant 12, respectively, for each time step k within optimization period. For example, each of subplants 12-16 may have two capacity constraints given by the following equations:

$$\dot{Q}_{i,k} \leq \dot{Q}_{i,max} \forall k \in \text{horizon}$$

$$\dot{Q}_{i,k} \geq 0 \forall k \in \text{horizon}$$

where $\dot{Q}_{i,k}$ is the load on the ith subplant during time step k and $\dot{Q}_{i,max}$ is the maximum capacity of the ith subplant. The first capacity constraint requires the load $\dot{Q}_{i,k}$ on each of subplants 12-16 to be less than or equal to the maximum capacity $\dot{Q}_{i,max}$ of the subplant for each time step k within the optimization period. The second capacity constraint requires the load $\dot{Q}_{i,k}$ on each of subplants 12-16 to be greater than or equal to zero for each time step k within the optimization period.

The inequality constraints for chiller subplant 16 can be placed in the form Ax≤b by defining the A matrix and the b vector as follows:

$$A = \begin{bmatrix} [I_h] & [0_h] & [0_h] & [0_h] & [0_h] \\ [-I_h] & [0_h] & [0_h] & [0_h] & [0_h] \end{bmatrix}, b = \begin{bmatrix} \dot{Q}_{Chiller,max}[I_h] \\ [0_h] \end{bmatrix}$$

where $[I_h]$ represents either an h by h identity matrix or an h by 1 ones vector, $[0_h]$ represents either an h by h zero matrix or an h by 1 zero vector, and $\dot{Q}_{Chiller,max}$ is the maximum capacity of chiller subplant 16. Similar inequality constraints for heat recovery chiller subplant 14 and heater subplant 12 can be placed in the form Ax≤b by defining the A matrices and the b vectors as follows:

$$A = \begin{bmatrix} [0_h] & [I_h] & [0_h] & [0_h] & [0_h] \\ [0_h] & [-I_h] & [0_h] & [0_h] & [0_h] \end{bmatrix}, b = \begin{bmatrix} \dot{Q}_{hrChiller,max}[I_h] \\ [0_h] \end{bmatrix}$$

$$A = \begin{bmatrix} [0_h] & [0_h] & [I_h] & [0_h] & [0_h] \\ [0_h] & [0_h] & [-I_h] & [0_h] & [0_h] \end{bmatrix}, b = \begin{bmatrix} \dot{Q}_{Heater,max}[I_h] \\ [0_h] \end{bmatrix}$$

where $\dot{Q}_{hrChiller,max}$ is the maximum capacity of heat recovery chiller subplant 14 and $\dot{Q}_{Heater,max}$ is the maximum capacity of heater subplant 12.

Inequality constraints circuit 146 may formulate or define inequality constraints on the decision variables $\dot{Q}_{HotStorage,k}$ and $\dot{Q}_{ColdStorage,k}$ corresponding to the loads on hot TES subplant 20 and cold TES subplant 22 for each time step k within the optimization period. For example, each of subplants 20-22 may have two capacity constraints given by the following equations:

$$\dot{Q}_{i,k} \leq \dot{Q}_{discharge,i,max} \forall k \in \text{horizon}$$

$$-\dot{Q}_{i,k} \leq \dot{Q}_{charge,i,max} \forall k \in \text{horizon}$$

where $\dot{Q}_{i,k}$ is the rate at which ith TES subplant is being discharged at time step k, $\dot{Q}_{discharge,i,max}$ is the maximum discharge rate of the ith subplant, and $\dot{Q}_{charge,i,max}$ is the maximum charge rate of the ith subplant. Positive load values for $\dot{Q}_{i,k}$ indicate that the TES subplant is discharging and negative load values for $\dot{Q}_{i,k}$ indicate that the subplant is charging. The first capacity constraint requires the discharge rate $\dot{Q}_{i,k}$ for each of subplants 20-22 to be less than or equal to the maximum discharge rate $\dot{Q}_{discharge,i,max}$ of the subplant for each time step k within the optimization period. The second capacity constraint requires the negative discharge rate $-\dot{Q}_{i,k}$ (i.e., the charge rate) for each of subplants 20-22 to be less than or equal to the maximum charge rate $\dot{Q}_{charge,i,max}$ of the subplant for each time step k within the optimization period.

The inequality constraints for hot TES subplant 20 can be placed in the form Ax≤b by defining the A matrix and the b vector as follows:

$$A = \begin{bmatrix} [0_h] & [0_h] & [0_h] & [I_h] & [0_h] \\ [0_h] & [0_h] & [0_h] & [-I_h] & [0_h] \end{bmatrix}, b = \begin{bmatrix} \dot{Q}_{HotDischarge,max}[I_h] \\ \dot{Q}_{HotCharge,max}[I_h] \end{bmatrix}$$

where $\dot{Q}_{HotDischarge,max}$ is the maximum discharge rate for hot TES subplant 20 and $\dot{Q}_{HotCharge,max}$ is the maximum charge rate for hot TES subplant 20. Similar inequality constraints for cold TES subplant 22 can be placed in the form Ax≤b by defining the A matrix and the b vector as follows:

$$A = \begin{bmatrix} [0_h] & [0_h] & [0_h] & [0_h] & [I_h] \\ [0_h] & [0_h] & [0_h] & [0_h] & [-I_h] \end{bmatrix}, b = \begin{bmatrix} \dot{Q}_{ColdDischarge,max}[I_h] \\ \dot{Q}_{ColdCharge,max}[I_h] \end{bmatrix}$$

where $\dot{Q}_{ColdDischarge,max}$ is the maximum discharge rate for cold TES subplant 22 and $\dot{Q}_{ColdCharge,max}$ is the maximum charge rate for cold TES subplant 22.

Inequality constraints circuit 146 may implement an electrical demand constraint for the total electrical usage of all the subplants and the building/campus $P_{elec,campus}$. Inequality constraints circuit 146 may require that the total electrical demand be less than or equal to a maximum electrical demand $P_{elec,max}$ by defining the A matrix and the b vector as follows:

$$A=[u_{elec,Chiller}[I_h], u_{elec,hrChiller}[I_h], u_{elec,Heater}[I_h], 0_n, 0_n], b=P_{elec,max}[I_h]-P_{elec,campus,k}$$

where $u_{elec,Chiller}$, $u_{elec,hrChiller}$, and $u_{elec,Heater}$ are the electrical usage values for chiller subplant 16, heat recovery chiller subplant 14, and heater subplant 12, respectively, $P_{elec,campus,k}$ is the electrical usage of the building/campus at time k, and $P_{elec,max}$ is the maximum total electrical usage for central plant 10 and the building/campus.

Inequality constraints circuit 146 may implement tank capacity constraints for hot TES subplant 20 and cold TES subplant 22. The tank capacity constraints may require that each TES tank never charge above its maximum capacity or discharge below zero. These physical requirements lead to a series of constraints to ensure that the initial tank level $Q_0$ of each TES tank at the beginning of the optimization period plus all of the charging during time steps 1 to k into the optimization period is less than or equal to the maximum capacity $Q_{max}$ of the TES tank. A similar constraint may be implemented to ensure that the initial tank level $Q_0$ of each TES tank at the beginning of the optimization period minus all of the discharging during time steps 1 to k into the optimization period is greater than or equal to zero.

The tank capacity constraints for hot TES subplant 20 can be placed in the form Ax≤b by defining the A matrix and the b vector as follows:

$$A = \begin{bmatrix} [0_h] & [0_h] & [0_h] & t_s[\Delta_h] & [0_h] \\ [0_h] & [0_h] & [0_h] & t_s[-\Delta_h] & [0_h] \end{bmatrix},$$

$$b = \begin{bmatrix} Q_{0,Hot}[I_h] \\ Q_{max,Hot} - Q_{0,Hot}[I_h] \end{bmatrix}$$

where $Q_{0,Hot}$ is the initial charge level of hot TES subplant 20 at the beginning of the optimization period, $Q_{max,Hot}$ is the maximum charge level of hot TES subplant 20, $\Delta_h$ is a lower triangular matrix of ones, and $t_s$ is the duration of a time step. Discharging the tank is represented in the top row of the A matrix as positive flow from the tank and charging the tank is represented in the bottom row of the A matrix as negative flow from the tank. Similar inequality constraints for cold TES subplant 22 can be placed in the form Ax≤b by defining the A matrix and the b vector as follows:

$$A = \begin{bmatrix} [0_h] & [0_h] & [0_h] & t_s[\Delta_h] \\ [0_h] & [0_h] & [0_h] & t_s[-\Delta_h] \end{bmatrix},$$

$$b = \begin{bmatrix} Q_{0,Cold}[I_h] \\ Q_{max,Cold} - Q_{0,Cold}[I_h] \end{bmatrix}$$

where $Q_{0,Cold}$ is the initial charge level of cold TES subplant 22 at the beginning of the optimization period and $Q_{max,Cold}$ is the maximum charge level of cold TES subplant 22.

Still referring to FIG. 4, high level optimization circuit 130 is shown to include an equality constraints circuit 148. Equality constraints circuit 148 may formulate or define one or more equality constraints on the optimization problem solved by linear program circuit 144. The equality constraints may ensure that the predicted thermal energy loads of the building or campus are satisfied for each time step k in the optimization period. Equality constraints circuit 148 may formulate an equality constraint for each type of thermal energy load (e.g., hot water, cold water, etc.) to ensure that the load is satisfied. The equality constraints may be given by the following equation:

$$\sum_{i=1}^{n_s} \dot{Q}_{p,i,k} = \hat{\ell}_{p,k} \; \forall \; k \in \text{horizon}$$

where $\dot{Q}_{p,i,k}$ is the thermal energy load of type p (e.g., hot water, cold water, etc.) on the ith subplant during time step k, $n_s$ is the total number of subplants capable of serving thermal energy load p, and $\hat{\ell}_{p,k}$ is the predicted thermal energy load of type p that must be satisfied at time step k.

The predicted thermal energy loads may be received as load predictions from load/rate prediction circuit 122.

In some embodiments, the predicted thermal energy loads include a predicted hot water thermal energy load $\hat{\ell}_{Hot,k}$ and a predicted cold water thermal energy load $\hat{\ell}_{Cold,k}$ for each time step k. The predicted hot water thermal energy load $\hat{\ell}_{Hot,k}$ may be satisfied by the combination of heat recovery chiller subplant 14, heater subplant 12, and hot TES subplant 20. The predicted cold water thermal energy load $\hat{\ell}_{Cold,k}$ may be satisfied by the combination of heat recovery chiller subplant 14, chiller subplant 16, and cold TES subplant 22.

The equality constraints can be placed in the form Hx=g by defining the H matrix and the g vector as follows:

$$H = \begin{bmatrix} [I_h] & [I_h] & [0_h] & [0_h] & [I_h] \\ [0_h] & (1 + u_{elec,hrChiller}[I_h]) & [I_h] & [I_h] & [0_h] \end{bmatrix},$$

$$g = \begin{bmatrix} \hat{\ell}_{Cold,1\ldots k} \\ \hat{\ell}_{Hot,1\ldots k} \end{bmatrix}$$

where $\hat{\ell}_{Cold,1 \ldots k}$ and $\hat{\ell}_{Hot,1 \ldots k}$ are k-dimensional vectors of predicted cold water loads and predicted hot water loads, respectively, at each of time steps k, and $u_{elec,hrChiller}$ is the electrical consumption of heat recovery chiller subplant 14. For central plants that serve one or more additional types of loads, an additional row may be added to the H matrix and the g vector to define the equality constraints for each additional load served by the central plant.

For this example problem, assuming an optimization period of 72 one-hour samples, the linear program has 360 decision variables and 1224 constraints. However, linear program circuit 144 can solve this linear program to determine the optimal subplant load values in less than 200 milliseconds using the linear programming framework. Advantageously, this allows high level optimization circuit 130 to determine the subplant load distribution for a long optimization period in a very short timeframe.

Still referring to FIG. 4, high level optimization circuit 130 is shown to include an unmet loads circuit 150. In some instances, the central plant equipment 60 may not have enough capacity or reserve storage to satisfy the predicted thermal energy loads, regardless of how the thermal energy loads are distributed across subplants 12-22. In other words, the high level optimization problem may have no solution that satisfies all of the inequality and equality constraints, even if the applicable subplants are operated at maximum capacity. Unmet loads circuit 150 may be configured to modify the high level optimization problem to account for this possibility and to allow the high level optimization to find the solution that results in the minimal amount of unmet loads.

In some embodiments, unmet loads circuit 150 modifies the decision variable matrix x by introducing a slack variable for each type of thermal energy load. The slack variables represent an unsatisfied (e.g., unmet, deferred, etc.) amount of each type of thermal energy load. For example, unmet loads circuit 150 may modify the decision variable matrix x as follows:

$$x = [\dot{Q}_{Chiller,1} \ldots {}_m \dot{Q}_{hrChiller,1} \ldots {}_m \dot{Q}_{Heater,1} \ldots {}_m \\ \dot{Q}_{HotStorage,1} \ldots {}_m \dot{Q}_{ColdStorage,1} \ldots {}_m \\ \dot{Q}_{ColdUnmet,1} \ldots {}_n \dot{Q}_{HotUnmet,1} \ldots {}_n]^T$$

where $Q_{ColdUnmet,1 \ldots n}$ and $Q_{HotUnmet,1 \ldots n}$ are n-dimensional vectors representing a total deferred cold thermal energy load and a total deferred hot thermal energy load, respectively, at each time step k within the optimization period. In some embodiments, the decision variables $Q_{ColdUnmet,1...n}$ and $Q_{HotUnmet,1...n}$ represent total deferred loads that have accumulated up to each time step k rather than the incremental deferred load at each time step. The total deferred load may be used because any deferred load is likely to increase the required load during subsequent time steps.

Unmet loads circuit 150 may modify the equality constraints to account for any deferred thermal energy loads. The modified equality constraints may require that the predicted thermal energy loads are equal to the total loads satisfied by subplants 12-22 plus any unsatisfied thermal energy loads. The modified equality constraints can be placed in the form Hx=g by defining the H matrix and the g vector as follows:

$$H = \begin{bmatrix} [I_h] & [I_h] & [0_h] & [0_h] & [I_h] & [I_h] - [D_{-1}] & [0_h] \\ [0_h] & (1 + u_{elec,hrChiller}[I_h] & [I_h] & [I_h] & [0_h] & [0_h] & [I_h] - [D_{-1}] \end{bmatrix},$$

$$g = \begin{bmatrix} \hat{\ell}_{Cold,1...k} \\ \hat{\ell}_{Hot,1...k} \end{bmatrix}$$

where $[D_{-1}]$ is a lower diagonal matrix of ones.

Unmet loads circuit 150 may modify the cost vector c to associate cost values with any unmet loads. In some embodiments, unmet loads circuit 150 assigns unmet loads a relatively higher cost compared to the costs associated with other types of loads in the decision variable matrix x. Assigning a large cost to unmet loads ensures that the optimal solution to the high level optimization problem uses unmet loads only as a last resort (i.e., when the optimization has no solution without using unmet loads). Accordingly, linear program circuit 144 may avoid using unmet loads if any feasible combination of equipment is capable of satisfying the predicted thermal energy loads. In some embodiments, unmet loads circuit 150 assigns a cost value to unmet loads that allows linear program circuit 144 to use unmet loads in the optimal solution even if the central plant is capable of satisfying the predicted thermal energy loads. For example, unmet loads circuit 150 may assign a cost value that allows linear program circuit 144 to use unmet loads if the solution without unmet loads would be prohibitively expensive and/or highly inefficient.

Still referring to FIG. 4, high level optimization circuit 130 is shown to include a subplant curves circuit 170. In the simplest case described with reference to linear program circuit 144, it was assumed that the resource consumption of each subplant is a linear function of the thermal energy load produced by the subplant. However, this assumption may not be true for some subplant equipment, much less for an entire subplant. Subplant curves circuit 170 may be configured to modify the high level optimization problem to account for subplants that have a nonlinear relationship between resource consumption and load production.

Subplant curves circuit 170 is shown to include a subplant curve updater 172, a subplant curves database 174, a subplant curve linearizer 176, and a subplant curves incorporator 178. Subplant curve updater 172 may be configured to request subplant curves for each of subplants 12-22 from low level optimization circuit 132. Each subplant curve may indicate an amount of resource consumption by a particular subplant (e.g., electricity use measured in kW, water use measured in L/s, etc.) as a function of the subplant load. Exemplary subplant curves are shown and described in greater detail with reference to FIGS. 5A-8.

In some embodiments, low level optimization circuit 132 generates the subplant curves by running the low level optimization process for various combinations of subplant loads and weather conditions to generate multiple data points. Low level optimization circuit 132 may fit a curve to the data points to generate the subplant curves and provide the subplant curves to subplant curve updater 172. In other embodiments, low level optimization circuit 132 provides the data points to subplant curve updater 172 and subplant curve updater 172 generates the subplant curves using the data points. Subplant curve updater 172 may store the subplant curves in subplant curves database 174 for use in the high level optimization process.

Figure 6:
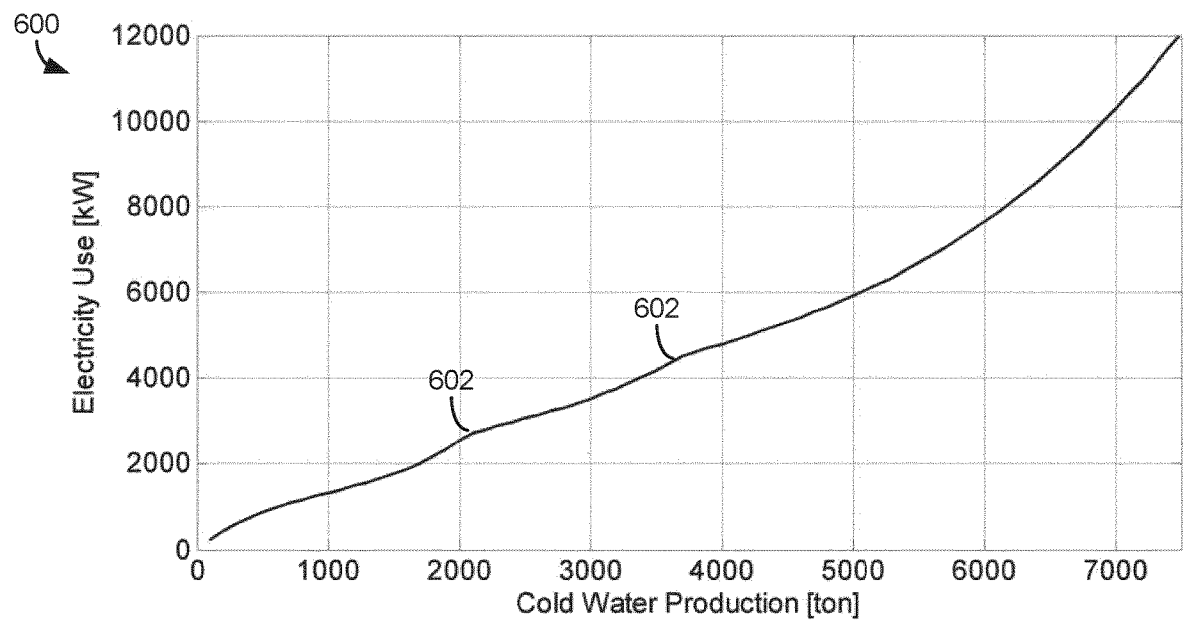
FIG. 6 is a non-convex and nonlinear subplant curve that may be generated from experimental data or by combining equipment curves for individual devices of the central plant, according to an exemplary embodiment.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 120. For some devices, the device efficiency curves may indicate that resource consumption is a U-shaped function of load. Accordingly, when multiple device efficiency curves are combined into a subplant curve for the entire subplant, the resultant subplant curve may be a wavy curve as shown in FIG. 6. The waves are caused by a single device loading up before it is more efficient to turn on another device to satisfy the subplant load.

Figure 7:
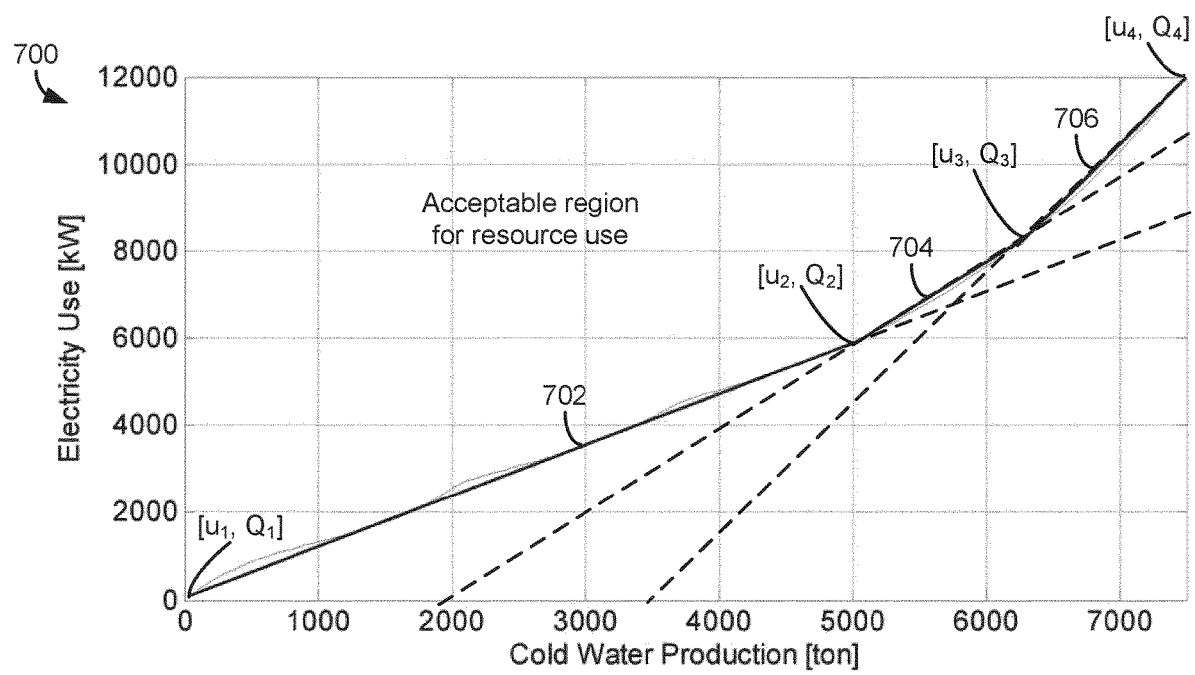
FIG. 7 is a linearized subplant curve that may be generated from the subplant curve of FIG. 6 by converting the non-convex and nonlinear subplant curve into piecewise linear segments, according to an exemplary embodiment.

Subplant curve linearizer 176 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 176 may be configured to break the subplant curves into piecewise linear segments that combine to form a piecewise-defined convex curve. An unmodified subplant curve 600 and a linearized subplant curve 700 generated by subplant curve linearizer 176 are shown in FIGS. 6 and 7, respectively. Subplant curve linearizer 176 may store the linearized subplant curves in subplant curves database 174.

Still referring to FIG. 4, subplant curves circuit 170 is shown to include a subplant curve incorporator 178. Subplant curve incorporator 178 may be configured to modify the high level optimization problem to incorporate the subplant curves into the optimization. In some embodiments, subplant curve incorporator 178 modifies the decision matrix x to include one or more decision vectors representing the resource consumption of each subplant. For example, for chiller subplant 16, subplant curve incorporator 178 may modify the decision matrix x as follows:

$$x = [ \ldots \dot{Q}_{Chiller,1 \ldots n} \ldots u_{Chiller,elec,1 \ldots n}$$
$$u_{Chiller,water,1 \ldots n} \ldots ]^T$$

where $u_{Chiller,elec,1 \ldots n}$ and $u_{Chiller,water,1 \ldots n}$ are n-dimensional vectors representing the amount of electrical consumption and water consumption, respectively, by chiller subplant 16 at each time step k.

Subplant curve incorporator 178 may add one or more resource consumption vectors to matrix x for each of subplants 12-22. The decision vectors added by subplant curve incorporator 178 for a given subplant may represent an amount of resource consumption for each resource consumed by the subplant (e.g., water, electricity, natural gas, etc.) at each time step k within the optimization period. For example, if heater subplant 12 consumes natural gas, electricity, and water, subplant curve incorporator 178 may add a decision vector $u_{Heater,gas,1 \ldots n}$ representing an amount of natural gas consumed by heater subplant 12 at each time step, a decision vector $u_{Heater,elec,1 \ldots n}$ representing an amount of electricity consumed by heater subplant 12 at each time step, and a decision vector $u_{Heater,water,1 \ldots n}$ representing an amount of water consumed by heater subplant at each time step. Subplant curve incorporator 178 may add resource consumption vectors for other subplants in a similar manner.

Subplant curve incorporator 178 may modify the cost vector c to account for the resource consumption vectors in the decision matrix x. In some embodiments, subplant curve incorporator 178 removes (or sets to zero) any cost directly associated with the subplant loads (e.g., $\dot{Q}_{Chiller,1 \ldots n}$, $\dot{Q}_{Heater,1 \ldots n}$, etc.) and adds economic costs associated with the resource consumption required to produce the subplant loads. For example, for chiller subplant 16, subplant curve incorporator 178 may modify the cost vector c as follows:

$$c = [ \ldots 0_n \ldots c_{elec,1 \ldots n} c_{water,1 \ldots n} \ldots ]^T$$

where $0_n$ is a n-dimensional zero vector indicating that the direct economic cost of $\dot{Q}_{Chiller,1 \ldots n}$ is zero at each time step, $c_{elec,1 \ldots n}$ is a n-dimensional vector indicating the per unit cost of electricity at each time step, and $c_{water,1 \ldots n}$ is a n-dimensional vector indicating the per unit cost of water at each time step. The modified cost vector associates an economic cost with the resources consumed to produce the subplant loads rather than the subplant loads themselves. In some embodiments, the values for $c_{elec,1 \ldots n}$ and $c_{water,1 \ldots n}$ are utility rates obtained from load/rate prediction circuit 122.

Subplant curve incorporator 178 may modify the inequality constraints to ensure that the proper amount of each resource is consumed to serve the predicted thermal energy loads. In some embodiments, subplant curve incorporator 178 formulates inequality constraints that force the resource usage for each resource in the epigraph of the corresponding linearized subplant curve. For example, chiller subplant 16 may have a linearized subplant curve that indicates the electricity use of chiller subplant 16 (i.e., $u_{Chiller,elec}$) as a function of the cold water production of chiller subplant 16 (i.e., $\dot{Q}_{Chiller}$). Such a linearized subplant curve 700 is shown in FIG. 7. The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 178 may formulate an inequality constraint for each piecewise segment of the subplant curve that constrains the value of $u_{Chiller,elec}$ to be greater than or equal to the amount of electricity use defined by the line segment for the corresponding value of $\dot{Q}_{Chiller}$. The subplant curve constraints for the electricity use of chiller subplant 16 can be placed in the form Ax≤b by defining the A matrix and the b vector as follows:

$$A = \begin{bmatrix} \ldots & [-(u_2-u_1)]I_n & \ldots & [(Q_2-Q_1)]I_n & 0_n & \ldots \\ \ldots & [-(u_3-u_2)]I_n & \ldots & [(Q_3-Q_2)]I_n & 0_n & \ldots \\ \ldots & [-(u_4-u_3)]I_n & \ldots & [(Q_4-Q_3)]I_n & 0_n & \ldots \end{bmatrix},$$

$$b = \begin{bmatrix} Q_1 u_2 - Q_2 u_1 \\ Q_2 u_3 - Q_3 u_2 \\ Q_3 u_4 - Q_4 u_3 \end{bmatrix}$$

Similar inequality constraints can be formulated for other subplant curves. For example, subplant curve incorporator 178 may generate a set of inequality constraints for the water consumption $u_{Chiller,water,1 \ldots n}$ of chiller subplant 16 using the points defining the linearized subplant curve for the water consumption $u_{Chiller,water,1 \ldots n}$ of chiller subplant 16 as a function of cold water production $\dot{Q}_{Chiller}$. In some embodiments, the water consumption of chiller subplant 16 is equal to the cold water production and the linearized subplant curve for water consumption includes a single line segment connecting point $[u_5, Q_5]$ to point $[u_6, Q_6]$ (as shown in FIG. 5B). The subplant curve constraints for the cold water consumption of chiller subplant 16 can be placed in the form Ax≤b by defining the A matrix and the b vector as follows:

$$A = [ \ldots [-(u_6-u_5)]I_n \ldots 0_n[(Q_6-Q_5)]I_n \ldots ],$$
$$b = [Q_5 u_6 - Q_6 u_5]$$

Subplant curve incorporator 178 may repeat this process for each subplant curve for chiller subplant 16 and for the other subplants of central plant 10 to define a set of inequality constraints for each subplant curve.

The inequality constraints generated by subplant curve incorporator 178 ensure that high level optimization circuit 130 keeps the resource consumption above all of the line segments of the corresponding subplant curve. In most situations, there is no reason for high level optimization circuit 130 to choose a resource consumption value that lies above the corresponding subplant curve due to the economic cost associated with resource consumption. High level optimization circuit 130 can therefore be expected to select resource consumption values that lie on the corresponding subplant curve rather than above it.

The exception to this general rule is heat recovery chiller subplant 14. The equality constraints for heat recovery chiller subplant 14 provide that heat recovery chiller subplant 14 produces hot water at a rate equal to the subplant's cold water production plus the subplant's electricity use. The inequality constraints generated by subplant curve incorporator 178 for heat recovery chiller subplant 14 allow high level optimization circuit 130 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 14 actually operates.

To prevent high level optimization circuit 130 from overusing electricity, subplant curve incorporator 178 may check whether the calculated amount of electricity use (determined by the optimization algorithm) for heat recovery chiller subplant 14 is above the corresponding subplant curve. In some embodiments, the check is performed after each iteration of the optimization algorithm. If the calculated amount of electricity use for heat recovery chiller subplant 14 is above the subplant curve, subplant curve incorporator 178 may determine that high level optimization circuit 130 is overusing electricity. In response to a determination that high level optimization circuit 130 is overusing electricity, subplant curve incorporator 178 may constrain the production of heat recovery chiller subplant 14 at its current value and constrain the electricity use of subplant 14 to the corresponding value on the subplant curve. High level optimization circuit 130 may then rerun the optimization with the new equality constraints.

Still referring to FIG. 4, high level optimization circuit 130 is shown to include a ground loop circuit 152 and a heat exchanger circuit 154. In some embodiments, central plant 10 includes a heat exchanger configured to transfer heat between hot water loop 24 and condenser water loop 28. In some embodiments, central plant 10 includes a ground loop that serves as heat rejection for chiller subplant 16 and/or heat extraction for heat recovery chiller subplant 14. Ground loop circuit 152 and heat exchanger circuit 154 may be configured to modify the optimization problem to account for heat transfer resulting from operation of the heat exchanger and/or the ground loop.

Ground loop circuit 152 may incorporate heat rejection to the ground loop into the optimization problem by changing the amount of electricity and water usage by chiller subplant 16. For example, for loadings up to the heat rejection capacity of the ground loop, chiller subplant 16 may use an additional amount of electricity to run the ground loop pumps. The additional electricity usage may be constant or may vary per unit of flow through the ground loop. The amount of water production of chiller subplant 16 may be constant regardless of whether the ground loop is used.

Ground loop circuit 152 and heat exchanger circuit 154 may incorporate heat extraction from the ground loop and heat transfer between hot water loop 24 and condenser water loop 28 into the optimization problem in a similar manner. For example, ground loop circuit 152 and heat exchanger circuit 154 may use heat extraction from the ground loop and heat transfer between loops 24 and 28 to modify the load seen by the central plant equipment. Ground loop circuit 152 may use the ground loop to create what appears as a false building load to the equipment, thereby allowing heat recovery chiller subplant 14 to operate as heat pumps when the building load does not add enough heat to the system. This outcome may be optimal when the ratio between electricity prices and gas prices is low such that it is less expensive to operate the ground loop and the heat exchanger using electricity than it would be to use natural gas to generate heat in heater subplant 12.

Heat exchanger circuit 154 may use the heat exchanger to create what appears to be a false hot water building load, thereby allowing heat recovery chiller subplant 14 to operate as conventional chillers. The excess heat from heat recovery chiller subplant 14 may be transferred through the heat exchanger to condenser loop 28 and ultimately into the atmosphere or into the ground. In some embodiments, heat exchanger circuit 154 operates the heat exchanger to prevent condenser loop from becoming overloaded. For example, heat exchanger circuit 154 may limit the total heat rejected to the capacity of condenser loop 28 minus the heat produced by the conventional chillers.

Ground loop circuit 152 and heat exchanger circuit 154 may modify the decision matrix x by adding a new decision vector for each type of thermal energy load. The new decision vectors may represent the overproduction of each thermal energy load for each time step k within the optimization period. For example, the modified decision matrix may appear as follows:

$$x = [\dot{Q}_{Chiller,1} \ldots \ _n, \dot{Q}_{hrChiller,1} \ldots \ _n, \dot{Q}_{Heater,1} \ldots \ _n,$$
$$\dot{Q}_{HotStorage,1} \ldots \ _n, \dot{Q}_{ColdStorage,1} \ldots \ _n, \ldots,$$
$$\dot{Q}_{ColdUnmet,1} \ldots \ _n, \dot{Q}_{HotUnmet,1} \ldots \ _n,$$
$$\dot{Q}_{ColdOver,1} \ldots \ _n, \dot{Q}_{HotOver,1} \ldots \ _n]^T$$

where $\dot{Q}_{ColdOver,1 \ldots n}$ and $\dot{Q}_{HotOver,1 \ldots n}$ are n-dimensional vectors representing the overproduction rates of the cold thermal energy load and the hot thermal energy load, respectively, for each time step k within the optimization period.

Ground loop circuit 152 and heat exchanger circuit 154 may modify the equality constraints to account for any overproduced thermal energy loads. The overproduced thermal energy loads may be added to the equality constraints as slack variables that operate in the opposite direction of the unmet loads. The modified equality constraints may require that the predicted thermal energy loads plus any overproduction are equal to the total loads satisfied by subplants 12-22 plus any unsatisfied thermal energy loads. The modified equality constraints can be placed in the form Hx=g by defining the H matrix and the g vector as follows:

$$H = \begin{bmatrix} [I_h] & [I_h] & [0_h] & [0_h] & [I_h] & [I_h]-[D_{-1}] & [0_h] & -[I_n] & [0_h] \\ [0_h] & (1+u_{elec,hrChiller}[I_h]) & [I_h] & [I_h] & [0_h] & [0_h] & [I_h]-[D_{-1}] & [0_h] & -[I_h] \end{bmatrix}$$

$$g = \begin{bmatrix} \hat{\ell}_{Cold,1 \ldots k} \\ \hat{\ell}_{Hot,1 \ldots k} \end{bmatrix}$$

where $[D_{-1}]$ is a lower diagonal matrix of ones. Ground loop circuit 152 and heat exchanger circuit 154 may modify the cost vector c with the additional cost of the pumping power per unit of overproduction required to run the ground loop and/or the heat exchanger.

Still referring to FIG. 4, high level optimization circuit 130 is shown to include a demand charge circuit 156. As discussed above, optimization framework circuit 142 may formulate the optimization problem as:

$$\underset{x}{\operatorname{argmin}} c^T x; \text{ subject to } Ax \leq b, Hx = g$$

However, such a formulation does not account for the demand charge.

The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge. In some instances, the demand charge can account for more than 15% of the electrical bill. Failure to include the demand charge in the optimization scheme can cause all of the equipment to turn on at the same time (e.g., the most efficient or lowest cost time). This would be optimal from a consumption cost standpoint. However, shifting some of the load in time may save thousands of dollars on demand while only costing a few dollars in consumption cost.

Demand charge circuit 156 may be configured to modify the optimization problem to account for the demand charge. Incorporating the demand charge into the optimization framework may greatly improve the performance of the high level optimization. For example, including the demand charge in the optimization framework may reduce the total operating costs of central plant 10 by an additional 5% on top of the 8-10% cost reduction provided by other circuits of central plant controller 102. In various implementations, the savings provided by demand charge circuit 156 and/or central plant controller 102 as a whole may be greater than or less than the exemplary amounts defined herein due to differences in plant configuration and/or energy costs.

Demand charge circuit 156 may account for the demand charge by modifying the cost function used by high level optimization circuit 130. The modified cost function may be defined as:

$$\operatorname*{argmin}_{x}[c^T x + c_{demand}\max(P_{elec,k})];$$
$$\text{subject to } Ax \leq b, Hx = g$$

where $c_{demand}$ is the demand charge (e.g., $/kW) for the applicable demand charge period and $P_{elec,k}$ is the total electrical power consumption of central plant 10 and the building/campus at time step k. The term $\max(P_{elec,k})$ selects the peak electrical power consumption at any time during the demand charge period. The demand charge $c_{demand}$ and the demand charge period may be defined by the utility rate information received from utilities 126 and may be provided to high level optimization circuit 130 by load/rate prediction circuit 122.

Incorporating the demand charge into the optimization framework complicates the optimization problem in two primary ways. First, the cost function is no longer linear due to the inclusion of the max( ) function. Second, the consumption term $c^T x$ calculates cost over a consumption period defined by a time horizon, whereas the demand charge term $c_{demand} \max(P_{elec,k})$ calculates cost over the demand charge period. For example, the consumption period may be defined as the time period beginning at the current time step k and ending at a future time step k+h, where h represents the time horizon. The demand charge period may be defined by utilities 126 and provided to high level optimization circuit 130 along with the utility rate information. In some instances, the consumption period and the demand charge period may not be the same. This complicates the optimization problem by obfuscating potential trade-offs between control decisions that reduce the consumption term at the expense of the demand charge term or vice versa.

Demand charge circuit 156 may modify the optimization problem to incorporate the demand charge term into the linear optimization framework. For example, demand charge circuit 156 may modify the decision matrix x by adding a new decision variable $x_{peak}$ as follows:

$$x_{new} = [\ldots\; u_{Chiller,elec,1} \ldots n \ldots\; u_{hpChiller,elec,1} \ldots n \ldots u_{Heater,elec,1} \ldots n \ldots x_{peak}]^T$$

where $x_{peak}$ is the peak power consumption within the demand charge period. Demand charge circuit 156 may modify the cost vector c as follows:

$$c_{new} = [\ldots\; c_{elec,1} \ldots n \ldots\; c_{elec,1} \ldots n \ldots c_{elec,1} \ldots n \ldots c_{demand}]^T$$

such that the demand charge $c_{demand}$ is multiplied by the peak power consumption $x_{peak}$.

Demand charge circuit 156 may formulate and/or apply inequality constraints to ensure that the peak power consumption $x_{peak}$ is greater than or equal to the maximum electric demand over the demand charge period. I.e.:

$$x_{peak} \geq \max(u_{Chiller,elec,k} + u_{hpChiller,elec,k} + u_{Heater,elec,k} + P_{elec,campus,k}) \forall k \in \text{horizon}$$

This inequality constraint may be represented in the linear optimization framework by defining the A matrix and the b vector as follows:

$$A = [\ldots\; [I_h] \ldots [I_h] \ldots [I_h] \ldots -1],$$
$$b = -P_{elec,campus,k}$$

During the high level optimization process, high level optimization circuit 130 may choose a $x_{peak}$ that is equal to the maximum electrical demand over the demand charge period to minimize the cost associated with $x_{peak}$.

Demand charge circuit 156 may apply an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A = [\ldots -1], b = -x_{peak,previous}$$

Advantageously, the modifications to the decision variable matrix x, the cost vector c, and the inequality constraints provided by demand charge circuit 156 allow the cost function to be written in a linear form as follows:

$$\operatorname*{argmin}_{x}[c_{new}^T x_{new}] = \operatorname*{argmin}_{x}[c^T x + c_{demand} x_{peak}];$$
$$\text{subject to } Ax \leq b, Hx = g$$

This linear form of the cost function can be used in the linear optimization framework.

The cost function as written in the previous equation has components that are over different time periods. For example, the consumption term $c^T x$ is over the consumption period whereas the demand charge term $c_{demand} x_{peak}$ is over the demand charge period. To properly make the trade-off between increasing the demand charge versus increasing the cost of energy consumption, demand charge circuit 156 may apply a weighting factor to the demand charge term and/or the consumption term. For example, demand charge circuit 156 may divide the consumption term $c^T x$ by the duration h of the consumption period (i.e., the time period between the current time and the time horizon) and multiply by the amount of time $d_{demand}$ remaining in the current demand charge period so that the entire cost function is over the demand charge period. The new optimization function may be given by:

$$\underset{x}{\mathrm{argmin}}\left[\frac{d_{demand}}{h}c^T x + c_{demand}x_{peak}\right];$$

subject to $Ax \leq b$, $Hx = g$ which is equivalent to:

$$\underset{x}{\mathrm{argmin}}\left[c^T x + \frac{h}{d_{demand}}c_{demand}x_{peak}\right];$$

subject to $Ax \leq b$, $Hx = g$

The latter form of the new optimization function has the advantage of adjusting only one term of the function rather than several.

Still referring to FIG. 4, high level optimization circuit 130 is shown to include a load change penalty circuit 158. In some instances, high level optimization circuit 130 determines a solution to the optimization problem that includes significantly changing the load on one or more of subplants 12-22 within a relatively short timeframe. For example, the lowest cost solution from a resource consumption standpoint may involve taking a subplant from off to full load and back to off again within only a few time steps. This behavior may result from high level optimization circuit 130 identifying small fluctuations in the economic cost of resources and operating central plant 10 accordingly to achieve the minimal economic cost. However, operating central plant 10 in such a way may be undesirable due to various negative effects of rapidly changing the subplant loads (e.g., increased equipment degradation), especially if the cost saved is relatively minimal (e.g., a few cents or dollars).

Load change penalty circuit 158 may modify the optimization problem to introduce a penalty for rapidly changing the subplant loads. For example, load change penalty circuit 158 may modify the decision matrix x by adding a new decision vector for each subplant. The new decision vectors represent the change in subplant load for each subplant from one time step to the next. For example, load change penalty circuit 158 may modify the decision matrix x as follows:

$$x = [\ldots \dot{Q}_{Chiller,1\ldots n} \ldots \dot{Q}_{hrChiller,1\ldots n} \ldots \\ \dot{Q}_{Heater,1\ldots n} \ldots \delta_{Chiller,1\ldots n} \delta_{hrChiller,1\ldots n} \\ \delta_{Heater,1\ldots n}]^T$$

where $\delta_{Chiller,1\ldots n}$, $\delta_{hrChiller,1\ldots n}$, and $\delta_{Heater,1\ldots n}$ are n-dimensional vectors representing the change in subplant load for $\dot{Q}_{Chiller,1\ldots n}$, $\dot{Q}_{hrChiller,1\ldots n}$, and $\dot{Q}_{Heater,1\ldots n}$, respectively, at each time step k relative to the previous time step k−1.

Load change penalty circuit 158 may modify the cost vector c to add a cost associated with changing the subplant loads. For example, load change penalty circuit 158 may modify the cost vector c as follows:

$$c = [\ldots 0_n \ldots 0_n \ldots 0_n \ldots c_{\delta Chiller,1\ldots n} \\ c_{\delta hrChiller,1\ldots n} c_{\delta Heater,1\ldots n}]^T$$

Load change penalty circuit 158 may add constraints such that each of the load change variables δ cannot be less than the change in the corresponding subplant load $\dot{Q}$. For example, the added constraints for chiller subplant 16 may have the following form:

$$A = \begin{bmatrix} \ldots & I_h - D_{-1} & \ldots & -[I_h] & [0_h] & [0_h] \\ \ldots & D_{-1} - I_h & \ldots & -[I_h] & [0_h] & [0_h] \\ \vdots & \vdots & \vdots & \vdots & \vdots & \vdots \end{bmatrix},$$

$$b = \begin{bmatrix} \begin{bmatrix} \dot{Q}_{Chiller,old} \\ 0_{h-1} \end{bmatrix} \\ \begin{bmatrix} -\dot{Q}_{Chiller,old} \\ 0_{h-1} \end{bmatrix} \\ \vdots \end{bmatrix}$$

where $\dot{Q}_{Chiller,old}$ is the value for $\dot{Q}_{Chiller}$ at the previous time step. Similar constraints may be added for each of subplants 12-22.

The constraints added by load change penalty circuit 158 require that the load change variables δ are greater than or equal to the magnitude of the difference between the current value of the corresponding subplant load $\dot{Q}$ and the previous value of the subplant load $\dot{Q}_{old}$. In operation, high level optimization circuit 130 may select values for the load change variables δ that are equal to the magnitude of the difference due to the costs associated with the load change variables. In other words, high level optimization circuit 130 may not choose to make the load change variables δ greater than the actual change in the corresponding subplant load because making the load change variables δ greater than necessary would be suboptimal.

Still referring to FIG. 4, high level optimization circuit 130 is shown to include a tank forced full circuit 160. Tank forced full circuit 160 may modify the optimization problem such that the thermal energy storage (TES) tanks are forced to full at the end of the optimization period. This feature provides increased robustness in the event of a subplant failure and/or controller failure by ensuring that the TES tanks have sufficient stored thermal energy to satisfy building loads while the failure is being repaired. For example, plant operators can use the stored thermal energy to meet the building loads while central plant controller 102 is brought back online.

Tank forced full circuit 160 may force the TES tanks to full by increasing the cost of discharging the TES tanks. In some embodiments, tank forced full circuit 160 modifies the cost of discharging the TES tanks such that the discharge cost is higher than other costs in the cost function, but less than the cost of unmet loads. This forces high level optimization circuit 130 to take the benefit (i.e., negative cost) of charging the TES tanks to their maximum values.

Figure 5A:
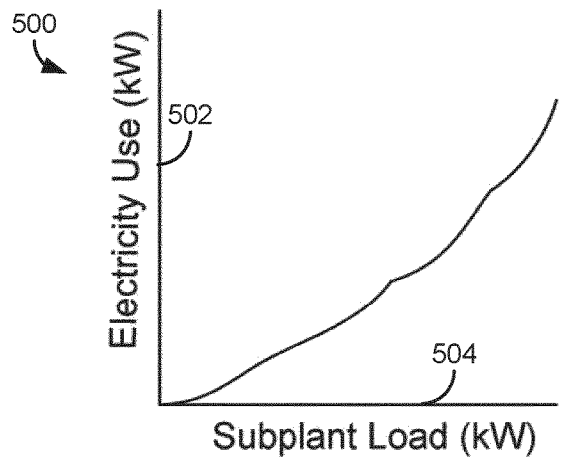
FIGS. 5A-5B are subplant curves illustrating a relationship between the resource consumption of a subplant and the subplant load and which may be used by the high level optimization circuit of FIG. 4 to optimize the performance of the central plant of FIG. 1, according to an exemplary embodiment.
Figure 5B:
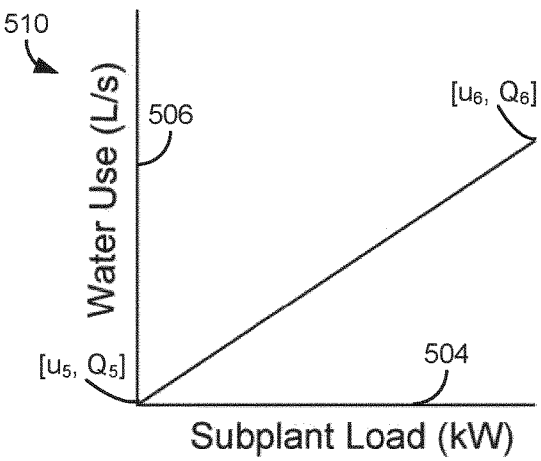

Referring now to FIGS. 5A-B, two subplant curves 500 and 510 are shown, according to an exemplary embodiment. Subplant curves 500 and 510 may be used as subplant curves 140, as described with reference to FIG. 3. Subplant curves 500 and 510 define the resource usage of a subplant (e.g., one of subplants 12-22) as a function of the subplant load. Each subplant curve may be specific to a particular subplant and a particular type of resource used by the subplant. For example, subplant curve 500 may define the electricity use 502 of chiller subplant 16 as a function of the load 504 on chiller subplant 16, whereas subplant curve 510 may define the water use 506 of chiller subplant 16 as a function of the load 504 on chiller subplant 16. Each of subplants 12-22 may have one or more subplant curves (e.g., one for each type of resource consumed by the subplant).

In some embodiments, low level optimization circuit 132 generates subplant curves 500 and 510 based on equipment models 120 (e.g., by combining equipment models 120 for individual devices into an aggregate curve for the subplant). Low level optimization circuit 132 may generate subplant curves 500 and 510 by running the low level optimization process for several different loads and weather conditions to generate multiple data points. Low level optimization circuit 132 may fit a curve to the data points to generate the subplant curves. In other embodiments, low level optimization circuit 132 provides the data points to high level optimization circuit 132 and high level optimization circuit 132 generates the subplant curves using the data points.

Referring now to FIG. 6, another subplant curve 600 is shown, according to an exemplary embodiment. Subplant curve 600 defines the electricity use of chiller subplant 16 (i.e., $u_{Chiller,elec}$) as a function of the cold water production of chiller subplant 16 (i.e., $\dot{Q}_{Chiller}$). In some embodiments, subplant curve 600 is generated by combining efficiency curves for individual devices of chiller subplant 16 (e.g., individual chillers, pumps, etc.). For example, each of the chillers in subplant 16 may have a device-specific efficiency curve that defines the amount of electricity use by the chiller as a function of the load on the chiller. Many devices operate less efficiently at higher loads and have device efficiency curves that are U-shaped functions of load. Accordingly, combining multiple device efficiency curves to form subplant curve 600 may result in subplant curve 600 having one or more waves 602, as shown in FIG. 6. Waves 602 may be caused by a single device loading up before it is more efficient to turn on another device to satisfy the subplant load.

Referring now to FIG. 7, a linearized subplant curve 700 is shown, according to an exemplary embodiment. Subplant curve 700 defines the electricity use of chiller subplant 16 (i.e., $u_{Chiller,elec}$) as a function of the cold water production of chiller subplant 16 (i.e., $\dot{Q}_{Chiller}$). Subplant curve 700 may be generated by converting subplant curve 600 into a linearized convex curve. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions.

In some embodiments, subplant curve 700 is generated by subplant curve linearizer 176, as described with reference to FIG. 4. Subplant curve 700 may be created by generating a plurality of linear segments (i.e., segments 702, 704, and 706) that approximate subplant curve 600 and combining the linear segments into a piecewise-defined linearized convex curve 700. Linearized subplant curve 700 is shown to include a first linear segment 702 connecting point $[u_1, Q_1]$ to point $[u_2, Q_2]$, a second linear segment 704 connecting point $[u_2, Q_2]$ to point $[u_3, Q_3]$, and a third linear segment 706 connecting point $[u_3, Q_3]$ to point $[u_4, Q_4]$. The endpoints of line segments 702-706 may be used to form constraints that force the electricity use of chiller subplant 16 in the epigraph of the linearized subplant curve 700.

Figure 8:
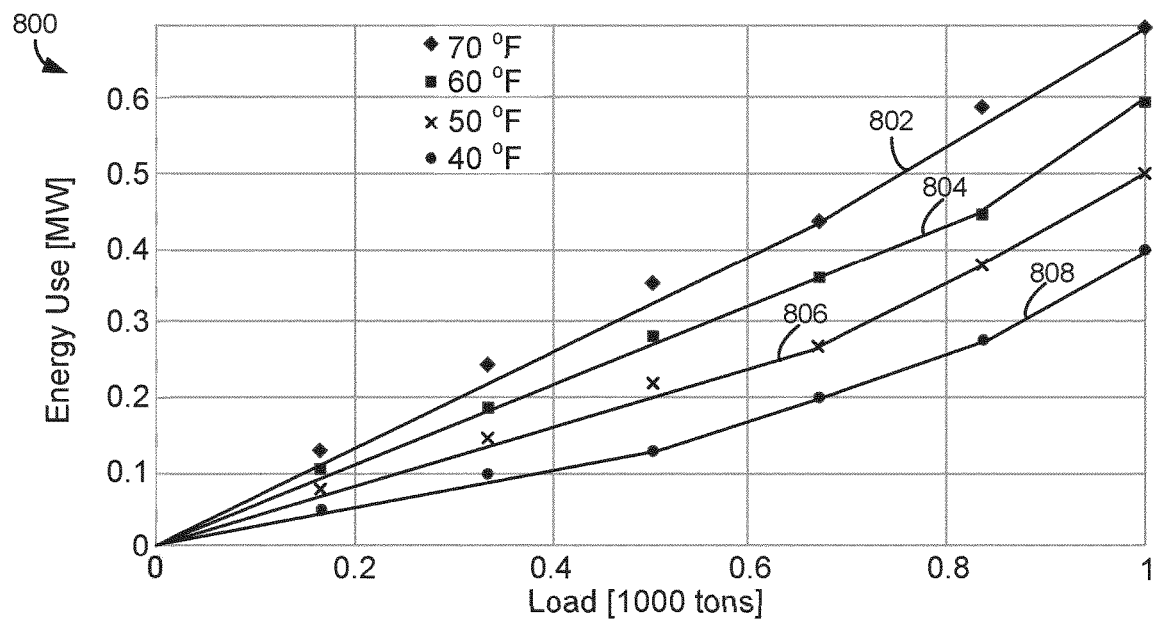
FIG. 8 is a graph illustrating a set of subplant curves that may be generated by the high level optimization circuit of FIG. 3 based on experimental data from a low level optimization circuit for multiple different environmental conditions, according to an exemplary embodiment.

Referring now to FIG. 8, another subplant curve 800 is shown, according to an exemplary embodiment. Subplant curve 800 defines the energy use of one of subplants 12-22 as a function of the load on the subplant for several different weather conditions. In some embodiments, subplant curve 800 is generated by subplant curves circuit 170 using experimental data obtained from the low level optimization circuit 132. For example, subplant curve updater 172 may request resource usage data from low level optimization circuit 132 for various combinations of load conditions and environmental conditions. In the embodiment shown in FIG. 8, subplant curve updater 172 requests energy use data for each combination of temperature (e.g., 40° F., 50° F., 60° F., and 70° F.) and load (e.g., 170 tons, 330 tons, 500 tons, 830 tons, and 1000 tons). Low level optimization circuit 132 may perform the low level optimization process for the requested load and temperature combinations and return an energy use value for each combination.

Subplant curve updater 172 may use the data points provided by low level optimization circuit 132 to find the best piecewise linear convex function that fits the data. For example, subplant curve updater 172 may fit a first subplant curve 802 to the data points at 70° F., a second subplant curve 804 to the data points at 60° F., a third subplant curve 806 to the data points at 50° F., and a fourth subplant curve 808 to the data points at 40° F. Subplant curve updater 172 may store the generated subplant curves 802-808 in subplant curves database 174 for use in the high level optimization algorithm.

In some implementations, central plant controller 102 uses high level optimization circuit 130 as part of an operational tool to exercise real-time control over central plant 10. In the operational tool, high level optimization circuit 130 may receive load and rate predictions from load/rate prediction circuit 122 and subplant curves (or data that can be used to generate subplant curves) from low level optimization circuit 132. When implemented in the operational tool, high level optimization circuit 130 may determine optimal subplant loads for heater subplant 12, heat recovery chiller subplant 14, chiller subplant 16, hot TES subplant 20, and/or cold TES subplant 22, as described with reference to FIGS. 2-4. In some embodiments, high level optimization circuit 130 determines ground loop and heat exchanger transfer rates in addition to the subplant loads. When implemented in the operational tool, high level optimization circuit 130 may provide the determined subplant loads and/or transfer rates to low level optimization circuit 132 for use in determining optimal on/off decisions and/or operating setpoints for the equipment of each subplant.

Figure 9:
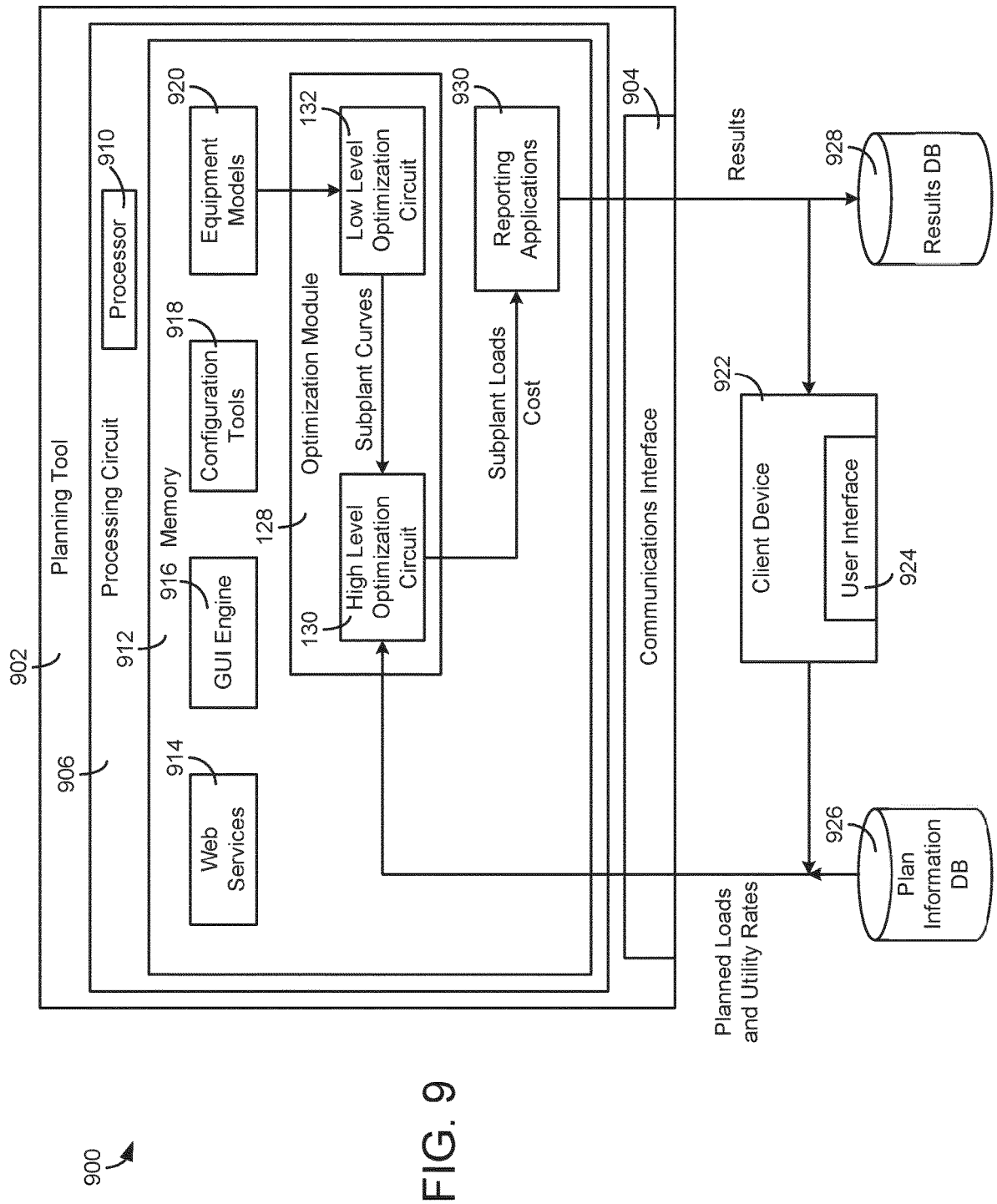
FIG. 9 is a block diagram of a planning system that incorporates the high level optimization circuit of FIG. 3, according to an exemplary embodiment.

Referring now to FIG. 9, a block diagram of a planning system 900 is shown, according to an exemplary embodiment. Planning system 900 may be configured to use optimization circuit 128 as part of a planning tool 902 to simulate the operation of a central plant over a predetermined time period (e.g., a day, a month, a week, a year, etc.) for planning, budgeting, and/or design considerations. When implemented in planning tool 902, optimization circuit 128 may operate in a similar manner as described with reference to FIGS. 2-4. For example, optimization circuit 128 may use building loads and utility rates to determine an optimal subplant load distribution to minimize cost over a simulation period. However, planning tool 902 may not be responsible for real-time control of a building automation system or central plant.

In planning tool 902, high level optimization circuit 130 may receive planned loads and utility rates for the entire simulation period. The planned loads and utility rates may be defined by input received from a user via a client device 922 (e.g., user-defined, user selected, etc.) and/or retrieved from a plan information database 926. High level optimization circuit 130 uses the planned loads and utility rates in conjunction with subplant curves from low level optimization circuit 132 to determine optimal subplant loads (i.e., an optimal dispatch schedule) for a portion of the simulation period.

The portion of the simulation period over which high level optimization circuit 130 optimizes the subplant loads may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimization circuit 130 requests all of the subplant curves used in the simulation from low level optimization circuit 132 at the beginning of the simulation. Since the planned loads and environmental conditions are known for the entire simulation period, high level optimization circuit 130 may retrieve all of the relevant subplant curves at the beginning of the simulation. In some embodiments, low level optimization circuit 132 generates functions that map subplant production to equipment level production and resource use when the subplant curves are provided to high level optimization circuit 130. These subplant to equipment functions may be used to calculate the individual equipment production and resource use (e.g., in a post-processing circuit) based on the results of the simulation.

Still referring to FIG. 9, planning tool 902 is shown to include a communications interface 904 and a processing circuit 906. Communications interface 904 may include wired or wireless interfaces (e.g., jacks, antennas, transmitters, receivers, transceivers, wire terminals, etc.) for conducting data communications with various systems, devices, or networks. For example, communications interface 904 may include an Ethernet card and port for sending and receiving data via an Ethernet-based communications network and/or a WiFi transceiver for communicating via a wireless communications network. Communications interface 904 may be configured to communicate via local area networks or wide area networks (e.g., the Internet, a building WAN, etc.) and may use a variety of communications protocols (e.g., BACnet, IP, LON, etc.).

Communications interface 904 may be a network interface configured to facilitate electronic data communications between planning tool 902 and various external systems or devices (e.g., client device 922, results database 928, plan information database 926, etc.). For example, planning tool 902 may receive planned loads and utility rates from client device 922 and/or plan information database 926 via communications interface 904. Planning tool 902 may use communications interface 904 to output results of the simulation to client device 922 and/or to store the results in results database 928.

Still referring to FIG. 9, processing circuit 906 is shown to include a processor 910 and memory 912. Processor 910 may be a general purpose or specific purpose processor, an application specific integrated circuit (ASIC), one or more field programmable gate arrays (FPGAs), a group of processing components, or other suitable processing components. Processor 910 may be configured to execute computer code or instructions stored in memory 912 or received from other computer readable media (e.g., CDROM, network storage, a remote server, etc.).

Memory 912 may include one or more devices (e.g., memory units, memory devices, storage devices, etc.) for storing data and/or computer code for completing and/or facilitating the various processes described in the present disclosure. Memory 912 may include random access memory (RAM), read-only memory (ROM), hard drive storage, temporary storage, non-volatile memory, flash memory, optical memory, or any other suitable memory for storing software objects and/or computer instructions. Memory 912 may include database components, object code components, script components, or any other type of information structure for supporting the various activities and information structures described in the present disclosure. Memory 912 may be communicably connected to processor 910 via processing circuit 906 and may include computer code for executing (e.g., by processor 906) one or more processes described herein.

Still referring to FIG. 9, memory 912 is shown to include a GUI engine 926, web services 914, and configuration tools 918. In an exemplary embodiment, GUI engine 916 includes a graphical user interface component configured to provide graphical user interfaces to a user for selecting or defining plan information for the simulation (e.g., planned loads, utility rates, environmental conditions, etc.). Web services 914 may allow a user to interact with planning tool 902 via a web portal and/or from a remote system or device (e.g., an enterprise control application).

Configuration tools 918 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 918 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 926) and adapt it or enable it for use in the simulation.

Still referring to FIG. 9, memory 912 is shown to include optimization circuit 128. Optimization circuit 128 may use the planned loads and utility rates to determine optimal subplant loads over a prediction window. The operation of optimization circuit 128 may be the same or similar as previously described with reference to FIGS. 2-4. With each iteration of the optimization process, optimization circuit 128 may shift the prediction window forward and apply the optimal subplant loads for the portion of the simulation period no longer in the prediction window. Optimization circuit 128 may use the new plan information at the end of the prediction window to perform the next iteration of the optimization process. Optimization circuit 128 may output the applied subplant loads to reporting applications 930 for presentation to a client device 922 (e.g., via user interface 924) or storage in results database 928.

Still referring to FIG. 9, memory 912 is shown to include reporting applications 930. Reporting applications 930 may receive the optimized subplant loads from optimization circuit 128 and, in some embodiments, costs associated with the optimized subplant loads. Reporting applications 930 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize subplant loads and the costs associated therewith and provide the results to a user via a GUI. The GUI elements may include charts or histograms that allow the user to visually analyze the results of the simulation. An exemplary output that may be generated by reporting applications 930 is shown in FIG. 10.

Figure 10:
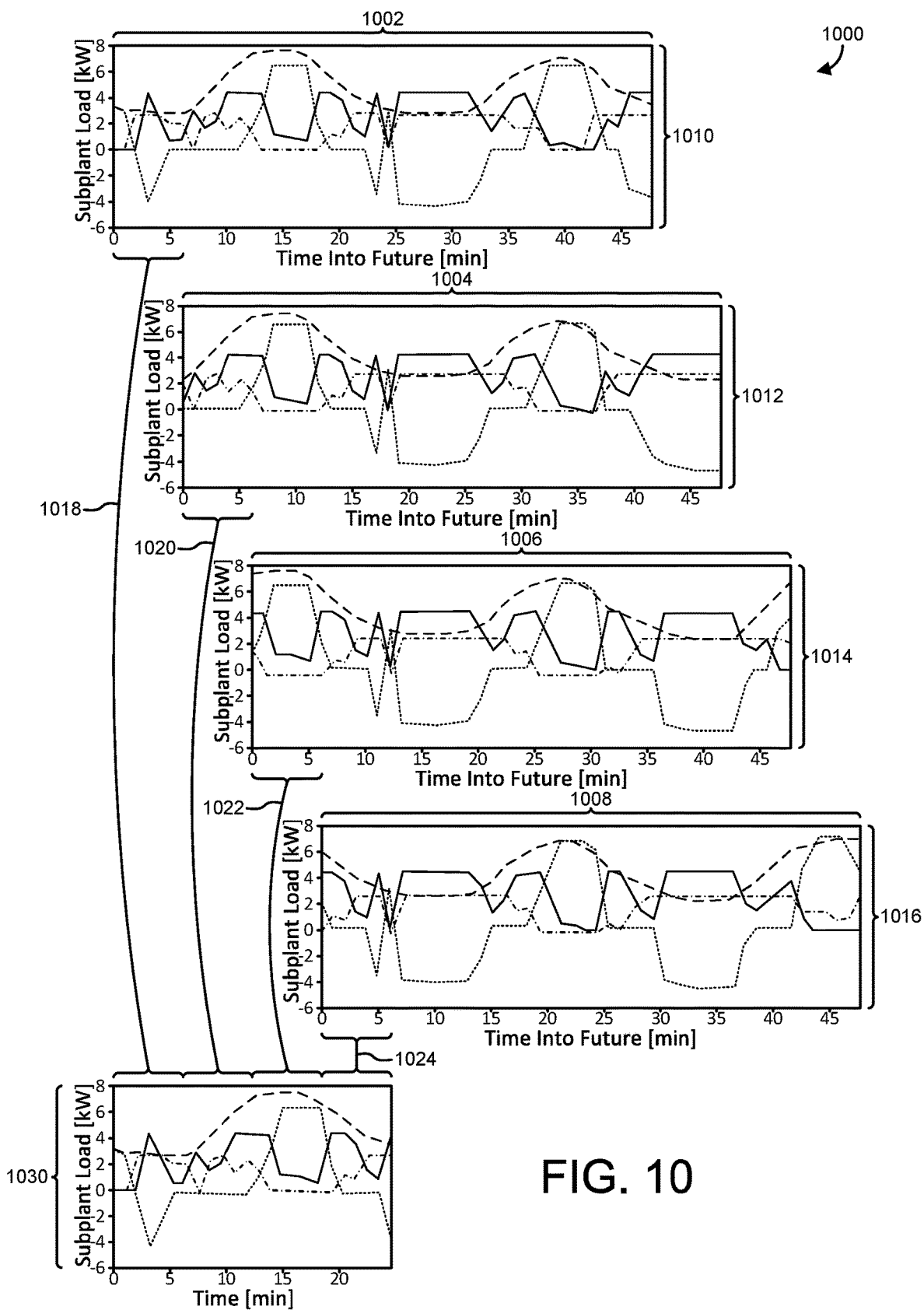
FIG. 10 is a drawing illustrating the operation of the planning system of FIG. 9, according to an exemplary embodiment.

Referring now to FIG. 10, several graphs 1000 illustrating the operation of planning tool 902 are shown, according to an exemplary embodiment. With each iteration of the optimization process, planning tool 902 selects an optimization period (i.e., a portion of the simulation period) over which the optimization is performed. For example, planning tool 902 may select optimization period 1002 for use in the first iteration. Once the optimal load distribution 1010 has been determined, planning tool 902 may select a portion 1018 of load distribution 1010 to send to plant dispatch 1030. Portion 1018 may be the first b time steps of load distribution 1010. Planning tool 902 may shift the optimization period 1002 forward in time, resulting in optimization period 1004. The amount by which the prediction window is shifted may correspond to the duration of time steps b.

Planning tool 902 may repeat the optimization process for optimization period 1004 to determine the optimal plant load distribution 1012. Planning tool 902 may select a portion 1020 of plant load distribution 1012 to send to plant dispatch 1030. Portion 1020 may be the first b time steps of load distribution 1012. Planning tool 902 may then shift the prediction window forward in time, resulting in optimization period 1006. This process may be repeated for each subsequent optimization period (e.g., optimization periods 1006, 1008, etc.) to generate updated load distributions (e.g., load distributions 1014, 1016, etc.) and to select portions of each load distribution (e.g., portions 1022, 1024) to send to plant dispatch 1030. Plant dispatch 1030 includes the first b time steps 1018-1024 from each of optimization periods 1002-1008. Once the optimal subplant load distribution 1030 is compiled for the entire simulation period, the results may be sent to reporting applications 930, results database 928, and/or client device 922, as described with reference to FIG. 9.

Figure 11:
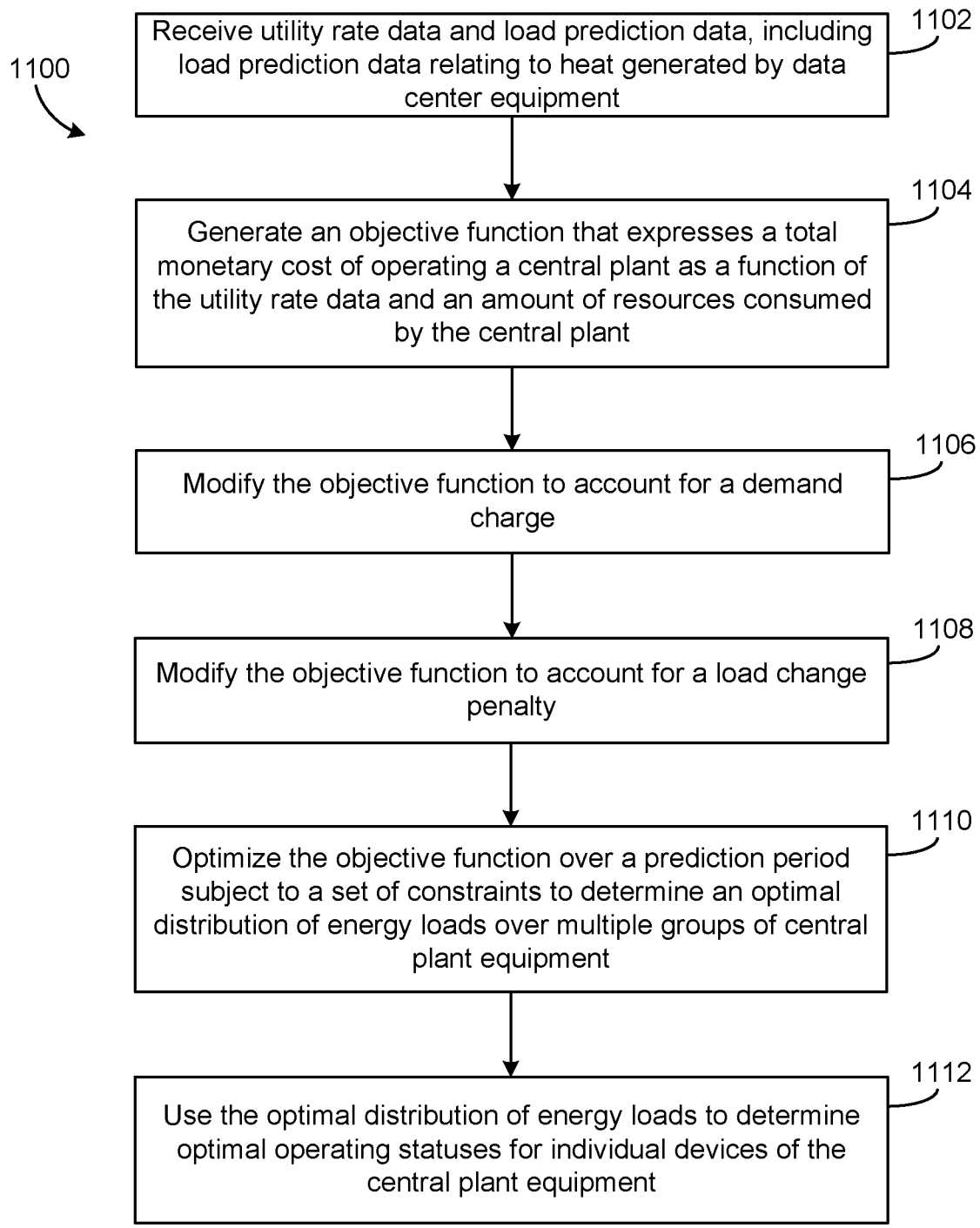
FIG. 11 is a flowchart of a process for optimizing cost in a central plant that may be performed by the central plant controller of FIG. 2 or the planning system of FIG. 9, according to an exemplary embodiment.

Referring now to FIG. 11, a flowchart of a process 1100 for optimizing cost in a central plant is shown, according to an exemplary embodiment. In various implementations, process 1100 may be performed by central plant controller 102 or planning tool 902. The central plant may include a plurality of subplants (e.g., subplants 12-22) configured to serve the energy loads of a building or campus. The central plant may be an actual plant (e.g., central plant 10) or a simulated central plant including a plurality of simulated subplants.

Process 1100 is shown to include receiving load prediction data and utility rate data (step 1102). The load prediction data may include predicted or planned thermal energy loads for a building or campus for each time step k (e.g., k=1 . . . n) of an optimization period. The load prediction data may include predicted or planned values one or more different types of loads for the building or campus. For example, the load prediction data may include a predicted hot water load $\hat{l}_{Hot,k}$ and a predicted cold water load $\hat{l}_{Cold,k}$ for each time step k within the prediction window.

In some embodiments, the load prediction data are based on weather forecasts from a weather service and/or feedback from the building or campus. Feedback from the building or campus may include various types of sensory inputs (e.g., temperature, flow, humidity, enthalpy, etc.) or other data relating to the controlled building (e.g., inputs from a HVAC system, a lighting control system, a security system, a water system, etc.). The load predictions may also be based on predictions of heat generated by data center equipment, for example as described herein with reference to data center heat prediction circuit 300. In some embodiments, the load prediction data are generated by load/rate prediction circuit 122, as described with reference to FIG. 2. For example, the load prediction data may be based on a measured electric load and/or previous measured load data from the building or campus. The load prediction data may be a function of a given weather forecast ($\hat{\phi}_w$), a day type (day), the time of day (t), and/or previous measured load data ($Y_{k-1}$). Such a relationship is expressed in the following equation:

$$\hat{l}_k = f(\hat{\phi}_w, \text{day}, t | Y_{k-1})$$

The utility rate data may indicate a cost or price per unit of one or more resources (e.g., electricity, natural gas, water, etc.) consumed by the central plant to serve the thermal energy loads of the building or campus at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates (e.g., received from utilities 126) or predicted utility rates (e.g., estimated by load/rate prediction circuit 122).

In some embodiments, the utility rates include demand charges for one or more of the resources consumed by the central plant. A demand charge may define a separate cost based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. The utility rate data may include time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Still referring to FIG. 11, process 1100 is shown to include generating an objective function that expresses a total monetary cost of operating the central plant as a function of the utility rate data and an amount of resources consumed by the central plant (step 1104). In some embodiments, the objective function is a high level cost function $J_{HL}$ for the central plant. The high level cost function $J_{HL}$ may represent the sum of the monetary costs of each utility consumed by the central plant for the duration of the optimization period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the objective function is generated using a linear programming framework. For example, step 1104 may include generating an objective function of the form:

$$\arg\min_x c^T x; \text{ subject to } Ax \le b, Hx = g$$

where c is a cost vector, x is a decision matrix, A and b are a matrix and vector (respectively) which describe inequality constraints on the variables in the decision matrix x, and H and g are a matrix and vector (respectively) which describe equality constraints on the variables in the decision matrix x. In other embodiments, the objective function may be generated using any of a variety of other optimization frameworks (e.g., quadratic programming, linear-fractional programming, nonlinear programming, combinatorial algorithms, etc.).

In some embodiments, step 1104 includes formulating the decision matrix x. The loads across each of subplants 12-22 may be the decision variables in the decision matrix x. For example, for a central plant that includes chillers, heat recovery chillers, hot water generators, and thermal energy storage, step 1104 may include formulating the decision matrix x as:

$$x = [\dot{Q}_{Chiller,1 \ldots n}, \dot{Q}_{hrChiller,1 \ldots n}, \dot{Q}_{Heater,1 \ldots n}, \dot{Q}_{HotStorage,1 \ldots n}, \dot{Q}_{ColdStorage,1 \ldots n}]^T$$

where $\dot{Q}_{Chiller,1 \ldots n}$, $\dot{Q}_{hrChiller,1 \ldots n}$, $\dot{Q}_{Heater,1 \ldots n}$, $\dot{Q}_{HotStorage,1 \ldots n}$, and $\dot{Q}_{ColdStorage,1 \ldots n}$ are n-dimensional vectors representing the thermal energy load assigned to chiller subplant 16, heat recovery chiller subplant 14, heater subplant 12, hot TES subplant 20, and cold TES subplant 22, respectively, for each of the n time steps within the optimization period.

In some embodiments, step 1104 includes generating the decision matrix x to include one or more decision vectors representing the resource consumption of each subplant. For example, for a central plant that includes a chiller subplant, step 1104 may include generating the decision matrix x as follows:

$$x = [\ldots \dot{Q}_{Chiller,1 \ldots n} \ldots u_{Chiller,elec,1 \ldots n} u_{Chiller,water,1 \ldots n} \ldots]^T$$

where $u_{Chiller,elec,1 \ldots n}$ and $u_{Chiller,water,1 \ldots n}$ are n-dimensional vectors representing the amount of electrical consumption and water consumption, respectively, by the chiller subplant at each time step k.

Step 1104 may include adding one or more resource consumption vectors to matrix x for each of subplants 12-22. The decision vectors added in step 1104 for a given subplant may represent an amount of resource consumption for each resource consumed by the subplant (e.g., water, electricity, natural gas, etc.) at each time step k within the optimization period. For example, if a heater subplant consumes natural gas, electricity, and water, step 1104 may include adding a decision vector $u_{Heater,gas,1 \ldots n}$ representing an amount of natural gas consumed by the heater subplant at each time step, a decision vector $u_{Heater,elec,1 \ldots n}$ representing an amount of electricity consumed by the heater subplant at each time step, and a decision vector $u_{Heater,water,1 \ldots n}$ representing an amount of water consumed by the heater subplant at each time step. Step 1104 may include adding resource consumption vectors for other subplants in a similar manner.

In some embodiments, step 1104 includes generating the cost vector c. Generating the cost vector c may include adding economic costs associated with the resource consumption required to produce the subplant loads. For example, the decision matrix x provided above, step 1104 may include generating the cost vector c as follows:

$$c = [\ldots 0_n \ldots c_{elec,1 \ldots n} c_{water,1 \ldots n} \ldots]^T$$

where $0_n$ is a n-dimensional zero vector indicating that the direct economic cost of $\dot{Q}_{Chiller,1 \ldots n}$ is zero at each time step, $c_{elec,1 \ldots n}$ is a n-dimensional vector indicating the per unit cost of electricity at each time step, and $c_{water,1 \ldots n}$ is a n-dimensional vector indicating the per unit cost of water at each time step. The cost vector associates an economic cost with the resources consumed to produce the subplant loads rather than the subplant loads themselves. In some embodiments, the values for $c_{elec,1 \ldots n}$ and $c_{water,1 \ldots n}$ are utility rates obtained from the utility rate data received in step 1102.

In some embodiments, step 1104 includes generating the A matrix and the b vector which describe the inequality constraints, and the H matrix and the g vector which describe the equality constraints. The inequality constraints and equality constraints may be generated by inequality constraints circuit 146 and equality constraints circuit 148, as described with reference to FIG. 4. For example, step 1104 may include generating inequality constraints that constrain the decision variables in matrix x to be less than or equal to maximum capacities for the corresponding central plant equipment and less than or equal to maximum charge/discharge rates for thermal energy storage. Step 1104 may include generating inequality constraints that prevent charging the thermal energy storage above maximum capacity and/or discharging the thermal energy storage below zero. Step 1104 may include generating equality constraints that ensure the building energy loads are satisfied at each of the time steps in the prediction window.

In some embodiments, step 1104 includes modifying the objective function to account for unmet loads (e.g., as described with reference to unmet loads circuit 150), to account for heat extraction or rejection to a ground loop (e.g., as described with reference to ground loop circuit 152), to account for heat exchange between the hot water loop and the condenser water loop (e.g., as described with reference to heat exchanger circuit 154), to account for subplant curves that are not simple linear functions of load (e.g., as described with reference to subplant curves circuit 170), and/or to force the thermal energy storage tanks to full at the end of the prediction window (e.g., as described with reference to tank forced full circuit 160). Modifying the objective function may include modifying the decision matrix x, the cost vector c, the A matrix and the b vector which describe the inequality constraints, and/or the H matrix and the g vector which describe the equality constraints.

Still referring to FIG. 11, process 1100 is shown to include modifying the objective function to account for a demand charge (step 1106). Step 1106 is an optional step that may be performed by demand charge circuit 156 to account for a demand charge that may be imposed by utility providers in some pricing scenarios. The demand charge is an additional charge imposed by some utility providers based on the maximum rate of energy consumption during an applicable demand charge period. For example, the demand charge may be provided in terms of dollars per unit of power (e.g., $/kW) and may be multiplied by the peak power usage (e.g., kW) during a demand charge period to calculate the demand charge.

Accounting for the demand charge may include modifying the various components of the objective function such as the decision matrix x, the cost vector c, and/or the A matrix and the b vector which describe the inequality constraints. The modified objective function may be defined as:

$$\operatorname*{argmin}_{x}[c^T x + c_{demand}\max(P_{elec,k})];$$

subject to $Ax \leq b$, $Hx = g$ where $c_{demand}$ is the demand charge for the applicable demand charge period and $P_{elec,k}$ is the total electrical power consumption of the central plant and the building/campus at time step k. The term $\max(P_{elec,k})$ selects the peak electrical power consumption at any time during the demand charge period. The demand charge $c_{demand}$ and the demand charge period may be defined by the utility rate information received in step 1102.

Step 1106 may include modifying the decision matrix x by adding a new decision variable $c_{peak}$ as follows:

$$x_{new} = [\ldots u_{Chiller,elec,1} \ldots n \ldots\\ u_{hpChiller,elec,1} \ldots n \ldots u_{Heater,elec,1} \ldots n \ldots\\ x_{peak}]^T$$

where $x_{peak}$ is the peak power consumption within the optimization period. Step 1106 may include modifying the cost vector c as follows:

$$c_{new} = [\ldots c_{elec,1} \ldots n\ c_{elec,1} \ldots n \ldots c_{elec,1} \ldots n \ldots\\ c_{demand}]^T$$

such that the demand charge $c_{demand}$ is multiplied by the peak power consumption $x_{peak}$.

Step 1106 may include generating and/or imposing inequality constraints to ensure that the peak power consumption $x_{peak}$ is greater than or equal to the maximum electric demand for each time step in the optimization period. I.e.:

$$x_{peak} \geq \max(u_{Chiller,elec,k} + u_{hpChiller,elec,k} + u_{Heater,elec,k} + P_{elec,campus,k}) \forall k \in \text{horizon}$$

This inequality constraint may be represented in the linear optimization framework by defining the A matrix and the b vector as follows:

$$A = [\ldots [I_h] \ldots [I_h] \ldots [I_H] \ldots -1],\\ b = -P_{elec,campus,k}$$

Step 1106 may include generating and/or imposing an inequality constraint to ensure that the peak power consumption decision variable $x_{peak}$ is greater than or equal to its previous value $x_{peak,previous}$ during the demand charge period. This inequality constraint may be represented in the linear optimization framework by defining the A matrix and the b vector as follows:

$$A = [\ldots -1],\ b = -x_{peak,previous}$$

Advantageously, the modifications to the decision variable matrix x, the cost vector c, and the inequality constraints in step 1106 may allow the objective function to be written in a linear form as follows:

$$\operatorname*{argmin}_{x}[c_{new}^T x_{new}] = \operatorname*{argmin}_{x}[c^T x + c_{demand}x_{peak}];$$

subject to $Ax \leq b$, $Hx = g$

This linear form of the objective function can be used in the linear optimization framework.

In some embodiments, step 1106 includes applying a weighting factor to at least one of the consumption term and the demand charge term of the objective function. For example, the objective function as written in the previous equation has components that are over different time periods. The consumption term $c^T x$ is over the consumption period whereas the demand charge term $c_{demand}x_{peak}$ is over the demand charge period. To properly make the trade-off between increasing the demand charge versus increasing the cost of energy consumption, step 1106 may include applying a weighting factor to the demand charge term and/or the consumption term. For example, step 1106 may include dividing the consumption term $c^T x$ by the duration h of the consumption period (i.e., the time period between the current time and the time horizon) and multiplying by the amount of time $d_{demand}$ remaining in the current demand charge period so that the entire objective function is over the demand charge period. The new optimization function may be given by:

$$\operatorname*{argmin}_{x}\left[\frac{d_{demand}}{h} c^T x + c_{demand}x_{peak}\right];$$

subject to $Ax \leq b$, $Hx = g$ which is equivalent to:

$$\operatorname*{argmin}_{x}\left[c^T x + \frac{h}{d_{demand}} c_{demand}x_{peak}\right];$$

subject to $Ax \leq b$, $Hx = g$

The latter form of the new optimization function has the advantage of adjusting only one term of the function rather than several.

Still referring to FIG. 11, process 1100 is shown to include modifying the objective function to account for a load change penalty (step 1108). Step 1108 is an optional step that may be performed by load change penalty circuit 158 to account for the cost of changing the loads assigned to each of the subplants. In some instances, the lowest cost solution from a resource consumption standpoint may involve taking a subplant from off to full load and back to off again within only a few time steps. However, operating the central plant in such a way may be undesirable due to various negative effects of rapidly changing the subplant loads (e.g., increased equipment degradation), especially if the cost saved is relatively minimal (e.g., a few cents or dollars).

Step 1108 may include modifying the objective function to introduce a penalty for rapidly changing the subplant loads. In some embodiments, step 1108 includes modifying the decision matrix x by adding a new decision vector for each subplant. The new decision vectors represent the change in subplant load for each subplant from one time step to the next. For example, step 1108 may include modifying the decision matrix x as follows:

$$x = [\ldots \dot{Q}_{Chiller,1} \ldots n \ldots \dot{Q}_{hrChiller,1} \ldots n \ldots\\ \dot{Q}_{Heater,1} \ldots n\ \vdots \ldots \delta_{Chiller,1} \ldots n\ \delta_{hrChiller,1} \ldots n\\ \delta_{Heater,1} \ldots n]^T$$

where $\delta_{Chiller,1 \ldots n}$, $\delta_{hrChiller,1 \ldots n}$, and $\delta_{Heater,1 \ldots n}$ are n-dimensional vectors representing the change in subplant load for $\dot{Q}_{Chiller,1\ldots n}$, $\dot{Q}_{hrChiller,1\ldots n}$, and $\dot{Q}_{Heater,1\ldots n}$, respectively, at each time step k relative to the previous time step k−1.

Step 1108 may include modifying the cost vector c to add a cost associated with changing the subplant loads. For example, step 1108 may include modifying the cost vector c as follows:

$$c = [\ldots 0_n \ldots 0_n \ldots 0_n \ldots c_{\delta Chiller,1\ldots n}\ c_{\delta hrChiller,1\ldots n}\ c_{\delta Heater,1\ldots n}]^T$$

Step 1108 may include adding constraints such that each of the load change variables δ cannot be less than the change in the corresponding subplant load $\dot{Q}$. For example, the added constraints for a chiller subplant may have the following form:

$$A = \begin{bmatrix} \cdots & I_h - D_{-1} & \cdots & -[I_h] & [0_h] & [0_h] \\ \cdots & D_{-1} - I_h & \cdots & -[I_h] & [0_h] & [0_h] \\ \vdots & \vdots & \vdots & \vdots & \vdots & \vdots \end{bmatrix},$$

$$b = \begin{bmatrix} \begin{bmatrix} \dot{Q}_{Chiller,old} \\ 0_{h-1} \end{bmatrix} \\ \begin{bmatrix} -\dot{Q}_{Chiller,old} \\ 0_{h-1} \end{bmatrix} \\ \vdots \end{bmatrix}$$

where $\dot{Q}_{Chiller,old}$ is the value for $\dot{Q}_{Chiller}$ at the previous time step. Similar constraints may be added for each of subplants 12-22. The constraints added by in step 1108 may require that the load change variables δ are greater than or equal to the magnitude of the difference between the current value of the corresponding subplant load $\dot{Q}$ and the previous value of the subplant load $\dot{Q}_{old}$.

Still referring to FIG. 11, process 1100 is shown to include optimizing the objective function over an optimization period subject to a set of constraints to determine an optimal distribution of energy loads over multiple groups of central plant equipment (step 1110). The set of constraints may include the inequality constraints and the equality constraints formulated in steps 1104, 1106, and/or 1108. Optimizing the objective function may include determining an optimal decision matrix x* that minimizes the cost function $c^T x$. The optimal decision matrix x* may correspond to the optimal decisions $\theta^*_{HL}$ (for each time step k within an optimization period) that minimize the high level cost function $J_{HL}$, as described with reference to FIG. 3.

Step 1110 may include using any of a variety of linear optimization techniques to determine the optimal decision matrix. For example, step 1110 may include using basis exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve for the optimal decision matrix subject to the optimization constraints. For embodiments in which nonlinear optimization is used, step 1110 may include using any of a variety of nonlinear optimization techniques to solve for the optimal decision matrix. The result of step 1110 may be an optimal distribution of energy loads over the multiple groups of subplant equipment (i.e., the multiple subplants) for each of the time steps k.

Still referring to FIG. 11, process 1100 is shown to include using the optimal distribution of energy loads to determine optimal operating statuses for individual devices of the central plant equipment (step 1112). In some embodiments, step 1112 is performed by low level optimization circuit 132, as described with reference to FIGS. 2-4. For example, step 1112 may include using the subplant loads determined in step 1110 to determine optimal low level decisions $\theta^*_{LL}$ (e.g. binary on/off decisions, flow setpoints, temperature setpoints, etc.) for the central plant equipment. In some embodiments, step 1112 is performed for each of the plurality of subplants.

Step 1112 may include determining which devices of each subplant to use and/or the operating setpoints for such devices that will achieve the subplant load setpoint while minimizing energy consumption. The low level optimization performed in step 1112 may be described using the following equation:

$$\theta^*_{LL} = \underset{\theta_{LL}}{\mathrm{argmin}}\, J_{LL}(\theta_{LL})$$

where $\theta^*_{LL}$ contains the optimal low level decisions and $J_{LL}$ is the low level cost function.

To find the optimal low level decisions $\theta^*_{LL}$, step 1112 may include minimizing the low level cost function $J_{LL}$. The low level cost function $J_{LL}$ may represent the total energy consumption for all of the equipment in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

In some embodiments, step 1112 includes minimizing the low level cost function $J_{LL}$ subject to inequality constraints based on the capacities of the subplant equipment and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off.

Step 1112 may include determining optimum operating statuses (e.g., on or off) for a plurality of devices of the central plant equipment. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear).

Step 1112 may include determining optimum operating setpoints for equipment using nonlinear optimization. Nonlinear optimization may identify operating setpoints that further minimize the low level cost function $J_{LL}$. In some embodiments, step 1112 includes providing the on/off decisions and setpoints to building automation system 108 for use in controlling the central plant equipment 60.

HVAC Control for Data Center

Figure 12:
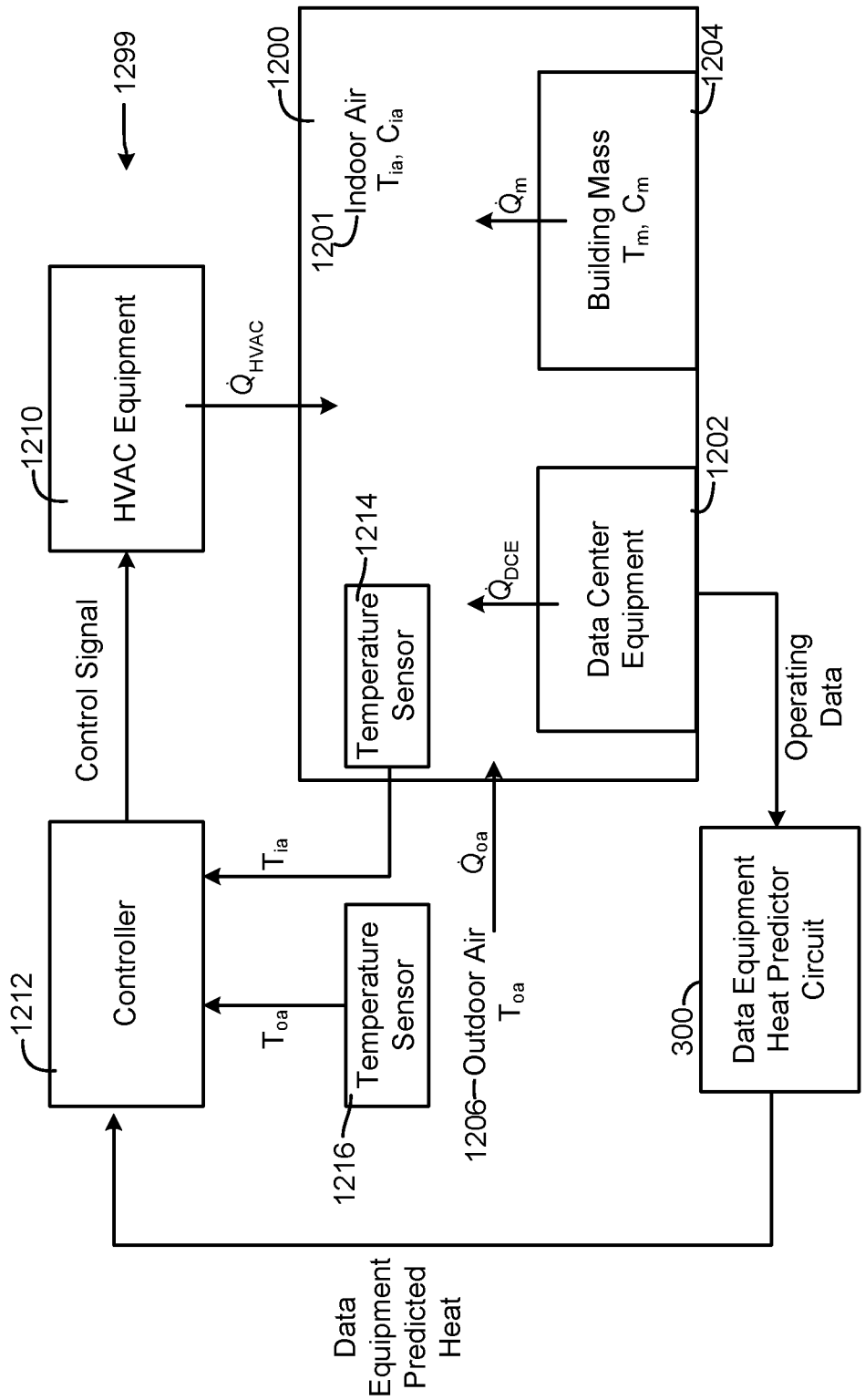
FIG. 12 is a block diagram of a data center, according to an exemplary embodiment.

Referring now to FIG. 12, a block diagram of an HVAC system 1299 that serves a data center 1200 is shown, according to an exemplary embodiment. FIG. 12 illustrates the variety of heat transfers that affect the indoor air temperature $T_{ia}$ of the indoor air 1201 in data center 1200 of building 10. Data center 1200 is a room, floor, area, etc. of a building that houses data center equipment 1202. In general, the primary goal of the HVAC system 1299 is to maintain the indoor air temperature $T_{ia}$ in the data center 1200 at or around a desired temperature to maximizes the efficiency of the data center equipment 1202 in the data center 1200 or to meet other needs of the data center 1200. The HVAC system is a central plant as described with reference to FIGS. 1-11 or another type of HVAC system (e.g., an HVAC system provided for the data center 1200).

As shown in FIG. 12, the indoor air temperature $T_{ia}$ of the data center 1200 has a thermal capacitance $C_m$. The indoor air temperature $T_{ia}$ is affected by a variety of heat transfers $\dot{Q}$ into the data center 1200, as described in detail below. It should be understood that although all heat transfers $\dot{Q}$ (e.g., thermal energy) are shown in FIG. 12 as directed into the data center 1200, the value of one or more of the heat transfers $\dot{Q}$ may be negative, such that heat flows out of the data center 1200.

The data center equipment 1202 contributes data center equipment heat transfer $\dot{Q}_{DCE}$ to the data center 1200. The data center equipment 1202 includes servers, processor, computers, and other electronic devices in the data center 1200 that generate heat through electrical resistance during operation of the data center equipment 1202. The heat transferred into the data center 1200 by the data center equipment 1202 is denoted as $\dot{Q}_{DCE}$. The heat transfer $\dot{Q}_{DCE}$ may be predicted/modeled by the data equipment heat predictor circuit 300 as described below.

The building mass 1204 contributes building mass heat transfer $\dot{Q}_m$ to the data center 1200. The building mass 1204 includes the physical structures in the building, such as walls, floors, ceilings, furniture, etc., all of which can absorb or give off heat. The building mass 1204 has a temperature $T_m$ and a lumped mass thermal capacitance $C_m$. The resistance of the building mass 1204 to exchange heat with the indoor air 201 (e.g., due to insulation, thickness/layers of materials, etc.) may be characterized as mass thermal resistance $R_{mi}$.

The outdoor air 1206 contributes outside air heat transfer $\dot{Q}_{oa}$ to the data center 1200. The outdoor air 1206 is the air outside of the building 10 with outdoor air temperature $T_{oa}$. The outdoor air temperature $T_{oa}$ fluctuates with the weather and climate. Barriers between the outdoor air 1206 and the indoor air 1201 (e.g., walls, closed windows, insulation) create an outdoor-indoor thermal resistance $R_{oi}$ to heat exchange between the outdoor air 1206 and the indoor air 1201.

The HVAC system 1299 also contributes heat to the data center 1200, denoted as $\dot{Q}_{HVAC}$. The HVAC system 1299 includes HVAC equipment 1210, controller 1212, an indoor air temperature sensor 1214 and an outdoor air temperature sensor 1216, as well as a data equipment heat predictor circuit 300. The HVAC equipment 1210 may include any suitable equipment for controllably supplying heating and/or cooling to the data center 1200. In general, HVAC equipment 1210 is controlled by a controller 1212 to provide heating (e.g., positive value of $\dot{Q}_{HVAC}$) or cooling (e.g., a negative value of $\dot{Q}_{HVAC}$) to the data center 1200.

The indoor air temperature sensor 1214 is located in the data center 1200, measures the indoor air temperature $T_{ia}$, and provides the measurement of $T_{ia}$ to the controller 1212. The outdoor air temperature sensor 1216 is located outside of the building, measures the outdoor air temperature $T_{oa}$, and provides the measurement of $T_{oa}$ to the controller 1212.

The data equipment heat predictor circuit 300 is configured to quantify, model, and/or predict the heat transfer $\dot{Q}_{DCE}$ generated by the data center equipment 1202. In various embodiments, the data equipment heat predictor 300 follows various approaches calculating heat generated by computing devices. For example, in some embodiments a relationship between the complexity of calculations executed on the data center equipment 1202 and the heat generated by the data center equipment is determined. Heat generation can then be modeled and predicted based on predicted and/or schedule upcoming calculations assigned to the data center equipment 1202.

In some embodiments, the data equipment heat predictor circuit 300 follows a mechanism of communication approach. In such embodiments, the data equipment heat predictor circuit 300 stores a model of a physical layout of the data equipment. The data equipment heat predictor circuit 300 then predicts each data transmission (or a statistical approximation thereof) through the data equipment based on a understanding of the starting points, ending points, and paths taken therebetween of various transmissions, calculations, messages, etc. The distance of each transmission may be correlated to an amount of heat generated based on a relationship between electrical resistance, current, and heat. The total amount of heat generated may then be calculated based on an aggregation of the heat generated by each communication/data transmission within the data equipment 1202. In some embodiments, the data equipment heat predictor circuit 300 may be configured to categorize portions of the heat generated by task, function, operation, time of day, day of week, season, holiday/workday, etc. in order to facilitate discrete control decisions to manage the heat generated by the data equipment 1202.

The controller 1212 receives the temperature measurements $T_{oa}$ and $T_{ia}$ and a data equipment predicted heat, generates a control signal for the HVAC equipment 1210, and transmits the control signal to the HVAC equipment 1210. The operation of the controller 1212 is discussed in detail below. In general, the controller 1212 considers the effects of the data center equipment 1202, building mass 1204, and outdoor air 1206 on the indoor air 1201 in controlling the HVAC equipment 1210 to provide a suitable level of $\dot{Q}_{HVAC}$. A model of this system for use by the controller 1212 is described with reference to FIG. 3.

In the embodiments described herein, the control signal provide to the HVAC equipment 1210 by the controller 1212 indicates a temperature setpoint $T_{sp}$ for the data center 1200. To determine the temperature setpoint $T_{sp}$, the controller 1212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \qquad \text{(Eq. A)}$$

$$\varepsilon_{sp} = T_{sp,j} - T_{ia} \qquad \text{(Eq. B)}$$

where j∈{clg, hlg} is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 13:
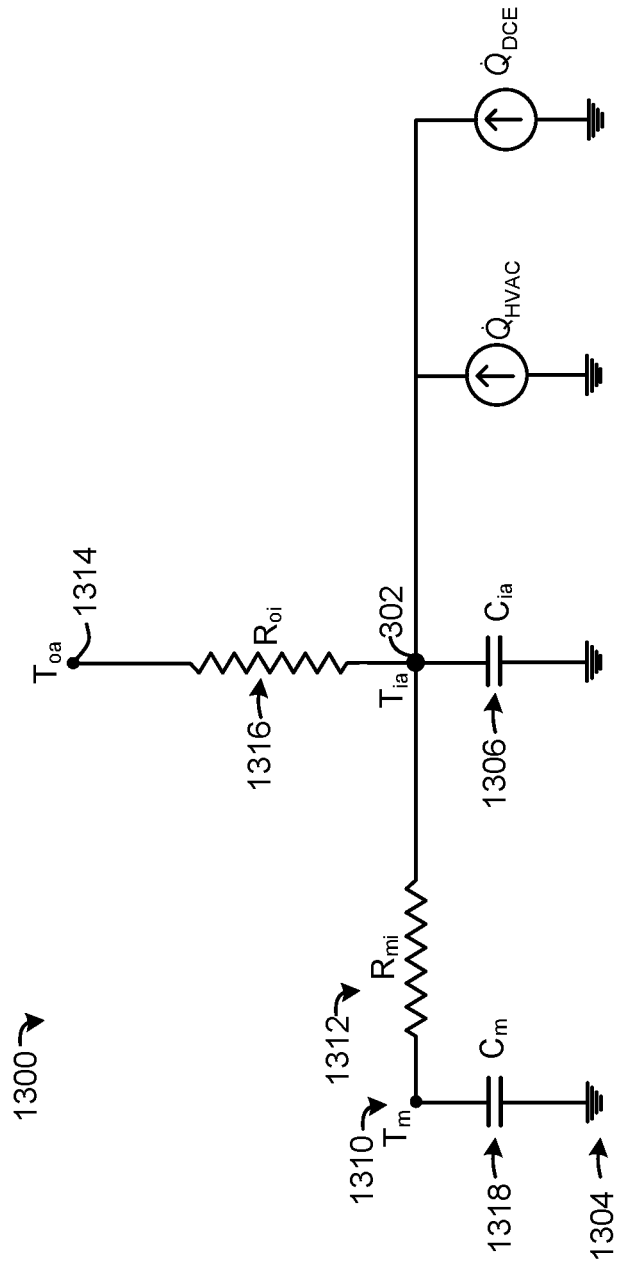
FIG. 13 is a circuit-style diagram of heat transfer in the data center of FIG. 12, according to an exemplary embodiment.

Referring now to FIG. 13, a circuit-style diagram 1300 corresponding to the data center 1200 and the various heat transfers $\dot{Q}$ of FIG. 12 is shown, according to an exemplary embodiment. In general, the diagram 1300 models the data center 1200 as a control-oriented thermal mass system having two thermal resistance terms and two thermal capacitance terms. This model can be characterized by the following system of linear differential equations, described with reference to FIG. 13 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{DCE} \quad \text{(Eq. C)}$$

$$C_m\dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 1300 as explained below:

Indoor air node 1302 corresponds to the indoor air temperature $T_{ia}$. From indoor air node 1302, the model branches in several directions, including down to a ground 304 via a capacitor 1306 with a capacitance $C_{ia}$. The capacitor 1306 models the ability of the indoor air to absorb or release heat and is associated with the rate of change of the indoor heat transfer $\dot{T}_{ia}$. Accordingly, the capacitor 1306 enters Eq. C on the left side of the equation as $C_{ia}\dot{T}_{ia}$.

From indoor air node 1302, the diagram 1300 also branches left to building mass node 1310, which corresponds to the thermal mass temperature $T_m$. A resistor 1312 with mass thermal resistance $R_{mi}$ separates the indoor air node 1302 and the building mass node 1310, modeling the heat transfer $\dot{Q}_m$ from the building mass 1204 to the indoor air 1201 as $$\frac{1}{R_{mi}}(T_m - T_{ia}).$$

This term is included on the right side of Eq. C above as contributing to the rate of change of the indoor air temperature $\dot{T}_{ia}$.

The diagram 1300 also branches up from indoor air node 1302 to outdoor air node 1314. A resistor 1316 with outdoor-indoor thermal resistance $R_{oi}$ separates the indoor air node 302 and the outdoor air node 1314, modeling the flow heat from the outdoor air 1206 to the indoor air 1201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 1302, the diagram 1300 branches right to two $\dot{Q}$ sources, namely $\dot{Q}_{HVAC}$ and $\dot{Q}_{DCE}$. As mentioned above, $\dot{Q}_{DCE}$ corresponds to heat generated by the data center equipment 1202 that may have a significant impact the rate of change of the indoor air temperature $T_{ia}$. $\dot{Q}_{DCE}$ is typically not measured by the HVAC system 1299, but may be predicted and/or otherwise quantified/approximated by the data equipment heat predictor. In some embodiments, the controller 1212 may be configured to alter operation of the data center equipment 1202 to control the amount of heat generated by the data center equipment 1202. $\dot{Q}_{HVAC}$ is generated and controlled by the HVAC system 100 to manage the indoor air temperature $T_{ia}$. Accordingly, $\dot{Q}_{HVAC}$ and $\dot{Q}_{DCE}$ are included on the right side of Eq. C above. In some embodiments, an additional heat disturbance term $\dot{Q}_{OTHER}$ is also included to model other heat disturbances (e.g., due to occupancy, solar irradiance, etc.).

The second nonlinear differential equation (Eq. D) above focuses on the rate of change $\dot{T}_m$ in the building mass temperature T. The capacity of the building mass to receive or give off heat is modeled by capacitor 1318. Capacitor 1318 has lumped mass thermal capacitance $C_m$ and is positioned between a ground 1304 and the building mass node 1310 and regulates the rate of change in the building mass temperature $T_m$. Accordingly, the capacitance $C_m$ is included on left side of Eq. D. Also branching from the building mass node 1310 is resistor 1312 leading to indoor air node 1302. As mentioned above, this branch accounts for heat transfer $\dot{Q}_m$ between the building mass 1204 and the indoor air 1201. Accordingly, the term $$\frac{1}{R_{mi}}(T_{ia} - T_m)$$

is included on the right side of Eq. D.

The model represented by diagram 1300 is used by the controller 1212 in generating a control signal for the HVAC equipment 1210. More particularly, the controller 1212 uses a state-space representation of the model shown in diagram 1300. The state-space representation used by the controller 1212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \quad \text{(Eq. E)}$$

$$\begin{bmatrix} T_{ia} \\ T_m \\ I \end{bmatrix} + \begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} 0 \\ \frac{1}{C_{ia}} \\ 0 \end{bmatrix} \dot{Q}_{DCE};$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{i,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix}; \quad \text{(Eq. F)}$$

where I represents the integral term $\int_0^t \varepsilon_{sp}(s)ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{DCE}$.

In some cases, $\dot{Q}_{DCE}$ is not measured or controlled and the controller 212 models the disturbance $\dot{Q}_{DCE}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix},$$

$$D_c(\theta) = \begin{bmatrix} 0 & 0 \\ \theta_4 & 0 \end{bmatrix};$$

$$\theta_1 = \frac{1}{C_{ia}R_{oi}}; \theta_2 = \frac{1}{C_{ia}R_{mi}}; \theta_3 = \frac{1}{C_{ia}};$$

$$\theta_4 = K_p; \theta_5 = \frac{1}{\tau}; \theta_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{spj} \\ T_{oa} \end{bmatrix}.$$

In some embodiments, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and an Kalman estimator gain is added, such that in the second step the controller 212 identifies the Kalman gain parameters K.

In some embodiments, the disturbance state d may be modeled based on predictions generated by the data equipment heat predictor circuit 300 to facilitate system identification. In other embodiments, the data equipment heat predictor circuit 300 may provide predictions/model of $\dot{Q}_{DCE}$ that allows the system to be model without the need for the disturbance state approach.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters. In various embodiments, time steps have various intervals therebetween (e.g., one minute, fifteen minutes, one hour, etc.).

Controller for HVAC Equipment with System Identification

Figure 14:
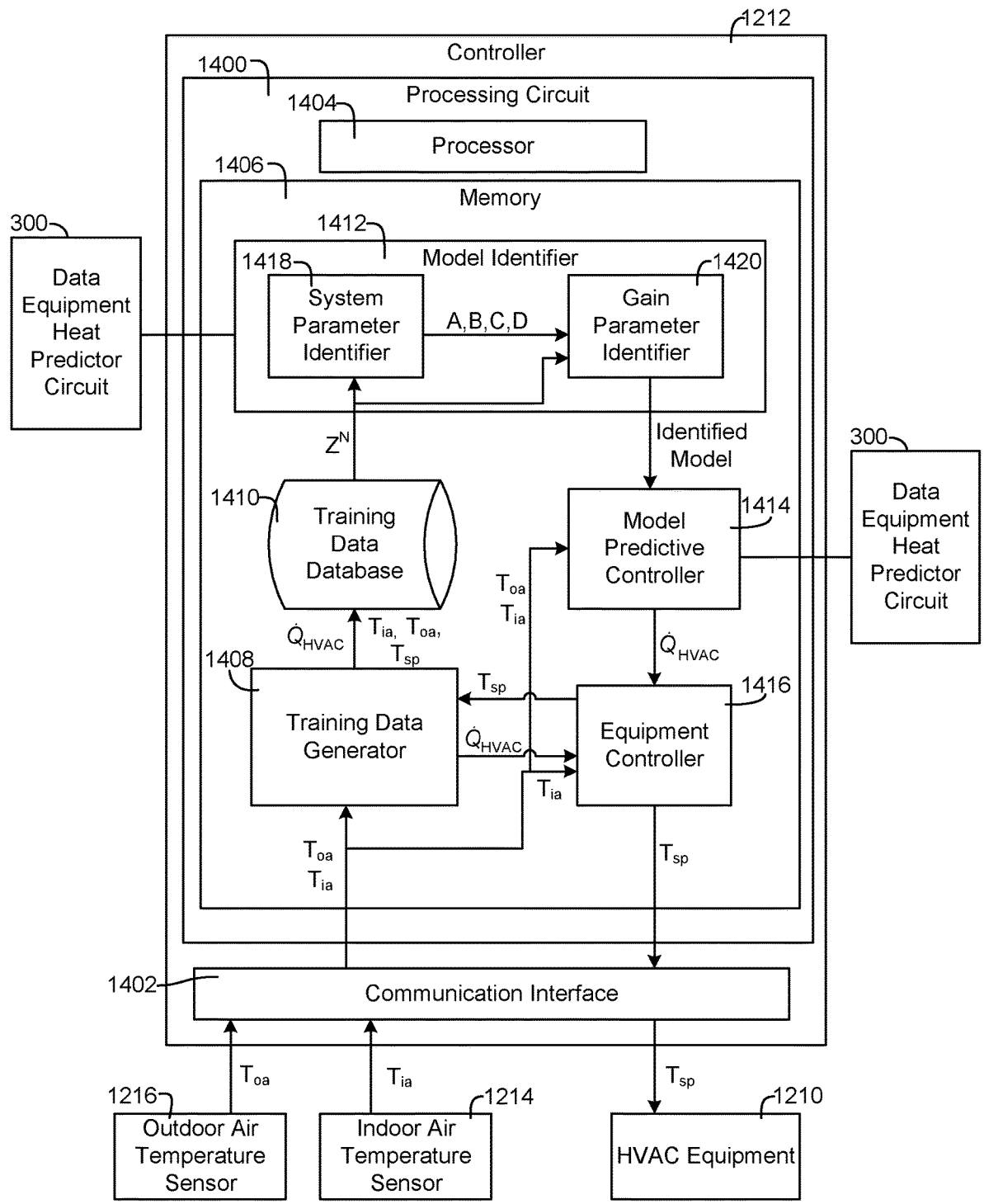
FIG. 14 is a block diagram of a controller of a HVAC system for use with data center of FIG. 12, according to an exemplary embodiment.

Referring now to FIG. 14, a detailed diagram of the controller 1212 is shown, according to an exemplary embodiment. The controller 1212 includes a processing circuit 1400 and a communication interface 1402. The communication interface 1402 is structured to facilitate the exchange of communications (e.g., data, control signals) between the processing circuit 1400 and other components of HVAC system 100. As shown in FIG. 14, the communication interface 1402 facilitates communication between the processing circuit 1400 and the outdoor air temperature sensor 1216 and the indoor air temperature sensor 1214 to all temperature measurements $T_{oa}$ and $T_{ia}$ to be received by the processing circuit 1400. The communication interface 1402 also facilitates communication between the processing circuit 1400 and the HVAC equipment 1210 that allows a control signal (indicated as temperature setpoint $T_{sp}$) to be transmitted from the processing circuit 1400 to the HVAC equipment 1210.

The processing circuit 1400 is structured to carry out the functions of the controller described herein. The processing circuit 1400 includes a processor 1404 and a memory 1406. The processor 1404 may be implemented as a general-purpose processor, an application-specific integrated circuit, one or more field programmable gate arrays, a digital signal processor, a group of processing components, or other suitable electronic processing components. The memory 1406, described in detail below, includes one or more memory devices (e.g., RAM, ROM, NVRAM, Flash Memory, hard disk storage) that store data and/or computer code for facilitating at least some of the processes described herein. For example, the memory 1406 stores programming logic that, when executed by the processor 1404, controls the operation of the controller 212. More particularly, the memory 1406 includes a training data generator 1408, a training data database 1410, a model identifier 1412, a model predictive controller 1414, and an equipment controller 1416. The various generators, databases, identifiers, controllers, etc. of memory 1406 may be implemented as any combination of hardware components and machine-readable media included with memory 1406.

The equipment controller 1416 is configured to generate a temperature setpoint $T_{sp}$ that serves as a control signal for the HVAC equipment 1210. The equipment controller receives inputs of the indoor air temperature $T_{ia}$ from the indoor air temperature sensor 1214 via the communication interface 1402 and $\dot{Q}_{HVAC}$ from the model predictive controller 1414 (during normal operation) and the training data generator 1408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 1416 then provides the control signal $T_{sp}$ to the HVAC equipment 1210 via the communication interface 1402.

The model predictive controller 1414 determines $\dot{Q}_{HVAC}$ based on an identified model and the temperature measurements $T_{ia}$, $T_{oa}$, and provides $\dot{Q}_{HVAC}$ to the equipment controller 1416. The model predictive controller 1414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally difficult. Thus, the model predictive controller 1414 uses a model identified through a system identification process facilitated by the training data generator 1408, the training data database 1410, the model identifier 1412, and the data equipment heat predictor circuit 300 as described in detail below.

System identification, as facilitated by the training data generator 1408, the training data database 1410, data equipment heat predictor circuit 300, and the model identifier 1412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 1408, the training data database 1410, the data equipment heat predictor circuit 300 and the model identifier 1412 each contribute to system identification by the controller 1212.

The training data generator 1408 is configured to generate training data by providing an excitation signal to the system. That is, the training data generator provides various $\dot{Q}_{HVAC}$ values to the equipment controller 1416 for a number N of time steps k, and receives the measured output response of the indoor air temperature $T_{ia}$ at each time step k from the air temperature sensor 1214. The various $\dot{Q}_{HVAC}$ values may be chosen by the training data generator 1408 to explore the system dynamics as much as possible (e.g., across a full range of possible $\dot{Q}_{HVAC}$ values, different patterns of $\dot{Q}_{HVAC}$ values, etc.).

The equipment controller 1416 receives the various $\dot{Q}_{HVAC}$ values and generates various control inputs $T_{sp}$ in response. The temperature setpoint $T_{sp}$ for each time step k is provided to the HVAC equipment 1210, which operates accordingly to heat or cool the zone 200 (i.e., to influence $T_{ia}$). The temperature setpoints $T_{sp}$ may also be provided to the training data generator 1408 to be included in the training data. The training data generator receives an updated measurement of the indoor air temperature $T_{ia}$ for each time step k and may also receive the outdoor air temperature $T_{oa}$ for each time step k. The training data generator 1408 thereby causes the states, inputs, and outputs of the system to vary across the time steps k and generates data corresponding to the inputs and outputs.

The inputs and outputs generated by the training data generator 1408 are provided to the training data database 1410. More particularly, in the nomenclature of the model of Eq. E and Eq. F above, the training data generator 1408 provides inputs $T_{sp}$ and $T_{oa}$ and outputs $\dot{Q}_{HVAC}$ and $T_{ia}$ for each time step k to the training data database 1410.

The training data database 1410 stores the inputs and outputs for each time step k provided by the training data generator 1408. Each input and output is tagged with a time step identifier, so that data for the same time step can be associated together. The training data database 1410 thereby collects and stores input and output data for each time step k, k=0, . . . , N, or, more specifically, $T_{sp}(k)$, $T_{oa}(k)$, $T_{ia}(k)$, and $\dot{Q}_{HVAC}(k)$, for k, k=0, . . . , N. This data is grouped together in the training data database 410 in a set of training data $Z^N$. In the notation of Eq. G and Eq. H, $Z^N$=[y(1), u(1), y(2), u(2), . . . , y(N), u(N)].

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 1412 accesses the training data database 410 to retrieve the training data $Z^N$ and uses the training data $Z^N$ to identify a model of the system. The model identifier 1412 includes a system parameter identifier 1418 and a gain parameter identifier 1420. The system parameter identifier 1418 carries out a first step of system identification, namely identifying the model parameters, while the gain parameter identifier 1420 carries out a second step, namely determining a Kalman gain estimator. This two-step process is described in detail in U.S. patent application Ser. No. 15/953,324, filed Apr. 13, 2018, incorporated by reference herein in its entirety.

The model parameters and the Kalman gain estimator are included in an identified model of the system, and that model is provided to the model predictive controller 1414. The model predictive controller can thus facilitate the control of the HVAC equipment 1210 as described above.

In some embodiments, the data equipment heat predictor circuit 300 provides predictions, models, and/or other data relating to the heat generated by the data center equipment 1202 to the model identifier 1412. The model identifier 1412 may use such data in identifying model parameters and/or determining a Kalman gain estimator. For example, the model identifier 1412 may use data from the data equipment heat predictor circuit 300 to identify trends in the training data $Z^N$ attributable to operation of the data center equipment 1202. The system model identified by the model identifier 1412 may then be tailored to include an understanding of the influence of the heat $Q_{DCE}$ provided by the data center equipment 1202. For example, a model may be generated that uses predictions and/or other data from the data equipment heat predictor circuit 300 as an input to the system model.

In some cases, the model predictive controller 1414 receives a data equipment predicted heat, a time series of data equipment predicted heats, etc. from the data equipment heat predictor circuit 300 and uses those predictions in optimizing control of the HVAC equipment 1210. For example, the model predictive controller 1414 may reduce the temperature setpoint in advance of a period of predicted high data equipment activity to pre-cool the data center 1200, either by increasing $\dot{Q}_{HVAC}$ (when the $T_{oa}$ is greater than $T_{ia}$) or reducing $\dot{Q}_{HVAC}$ (when the $T_{oa}$ is lower than $T_{ia}$). This may reduce an overall cost of operating the HVAC equipment 1210 and minimize a demand charge over an optimization period.

Integrated Controller

Figure 15:
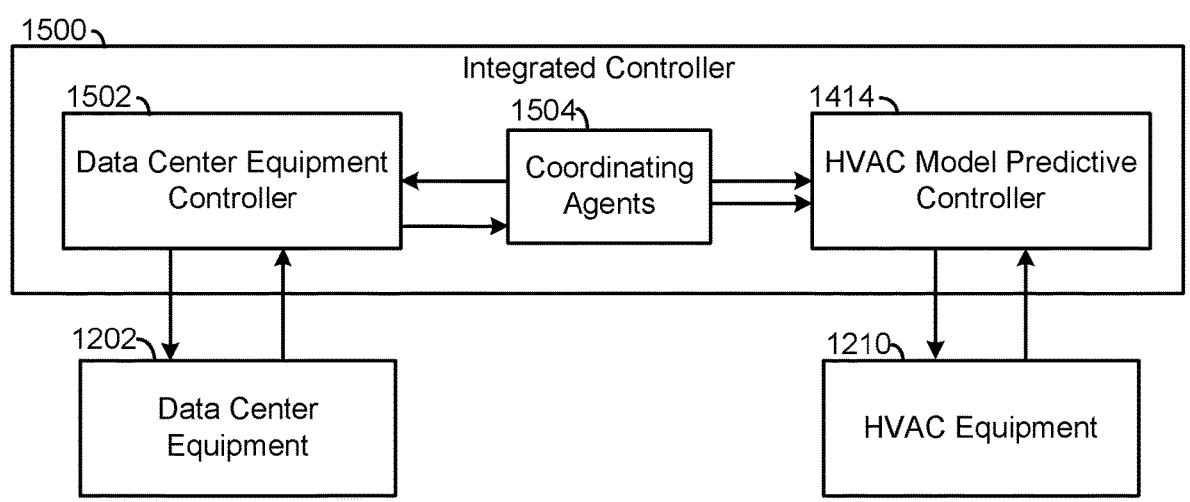
FIG. 15 is a block diagram of an integrated controller for use with a HVAC system and data center equipment of the data center of FIG. 12, according to an exemplary embodiment.

Referring now to FIG. 15, a block diagram of an integrated controller 1500 is shown, according to an exemplary embodiment. The integrated controller 1500 is configured to coordinate operation of the data center equipment 1202 and the HVAC equipment 1210 to achieve desired environmental condition(s) for the data center 1200 at a minimize cost, for example to maintain the data center equipment 1202 within a desired temperature range while minimize utility consumption.

The data center equipment controller 1502 may be configured to make various control decisions regarding the operation of the data center equipment 1202. For example, the data center equipment controller 1502 may be configured to make scheduling decisions (i.e., to determine when to execute particular operations) and resource allocation decisions (i.e., to choose which device(s) of the data center equipment 1202 will execute particular operations). As further examples, the data center equipment controller 1502 may determine how many virtual machines to spool up, decide how much memory to allocate (e.g., allocating more RAM memory to a processing intensive task to help reduce processing and hard drive heat), how much CPU utilization to utilize, data rates, line load, an amount of parallelization, etc. Accordingly, the data center equipment controller 1502 is configured to make various control decisions that affect the amount of heat generated by the data center equipment 1202 and the schedule of the heat generate by the data center equipment 1202.

As described above, the HVAC model predictive controller 1414 is configured to predict future system states, loads, and rates and generate controls for the HVAC equipment 1210 to optimize a cost function associated with operating the HVAC equipment 1210. Accordingly, the HVAC model predictive controller 1414 is configured to control the amount of heat provided/removed by the HVAC equipment 1210 and the schedule of the heat provided/removed by the HVAC equipment 1210.

The coordinating agents 1504 are configured to facilitate coordination between the data center equipment controller 1502 and the HVAC model predictive controller 1414. The coordinating agents 1504 may be based on one or more of a variety of artificial intelligence approaches, and may include a provisioning agent, scheduling agent, thermal load agent, MPC agent, HVAC optimization agent, etc. The coordinating agents 1504 may facilitate the HVAC model predictive controller 1414 in controlling the HVAC equipment 1210 to anticipate various increases or decreases in heat generated by the data center equipment 1202. The coordinating agents 1504 may also facilitate the data center equipment controller 1502 in provisioning, scheduling, assigning, managing, etc. the data center equipment 1202 and operations executed thereon to minimize an overall cost of operating the HVAC equipment.

For example, the coordinating agents 1504 may direct the data center equipment controller 1502 to reduce the heat generated by the data center 1202 when the cost of operating the HVAC equipment 1210 is high (e.g., when a utility rate is high, when an outside air temperature is high), and to increase the operation of the data center 1202 when the cost of operating the HVAC equipment 1210 is low. As another example, the coordinating agents 1504 may control the data center equipment 1202 to generate extra heat (e.g., beyond what may be necessary for ordinary operation) to reducing a heating load on the HVAC equipment 1210. As another example, the coordinating agents 1504 may monitor health, risk, bugs, bad reads, errors that result in recalculations or re-reads, corrupted sectors, fragmentations of hard drives, HVAC equipment faults, etc. and coordinate control of the data center equipment 1202 and HVAC equipment 1210 to adjust for such events. The coordinating agents 1504 may be configured to make many such coordination decisions.

Feedforward Control of Building Equipment Based on Per Server Heat Contribution

Figure 16:
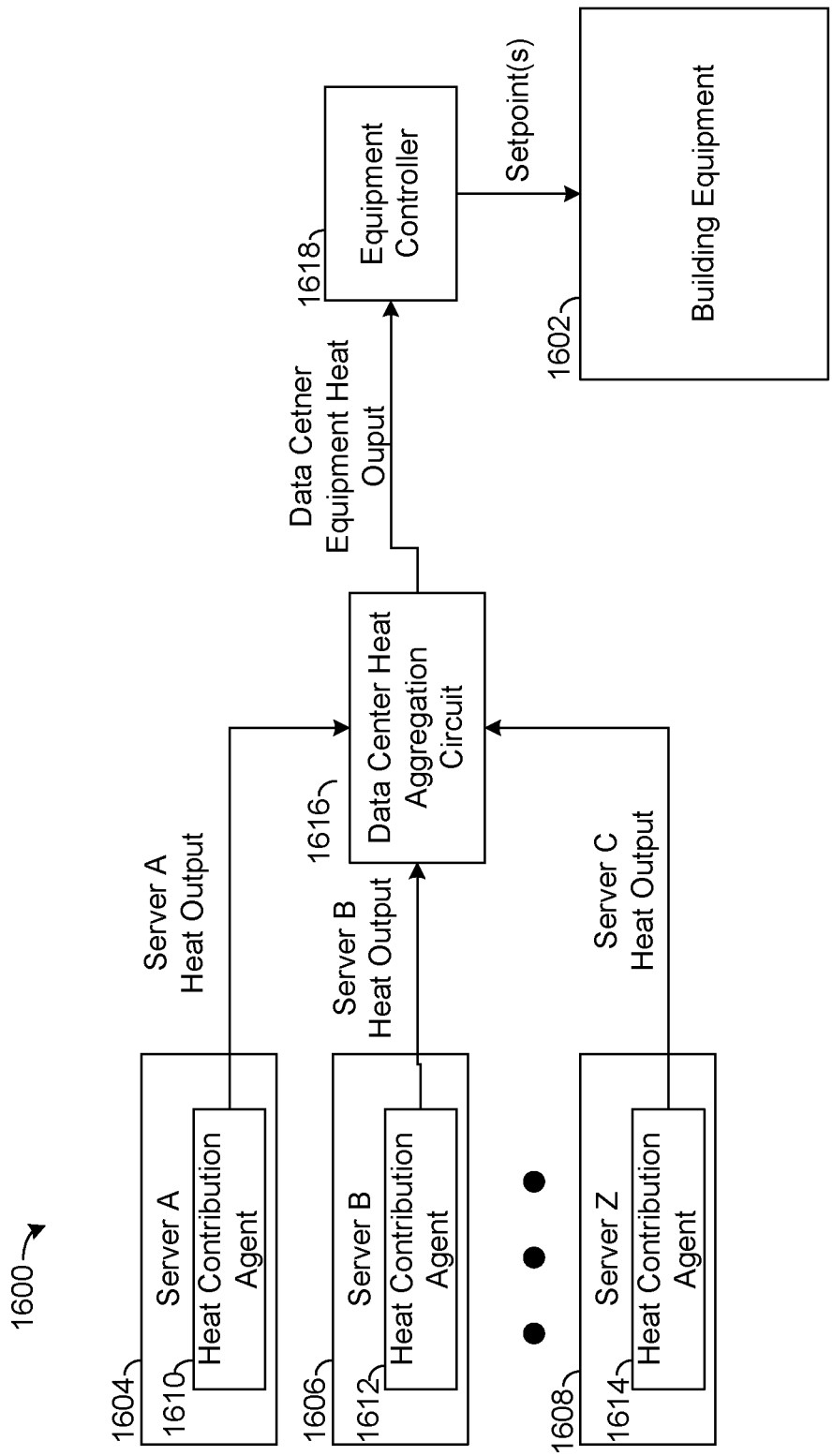
FIG. 16 is a block diagram of a system for feedforward control, according to an exemplary embodiment.

Referring now to FIG. 16, a block diagram of a system 1600 configured to facilitate feedforward control of building equipment 1602 based on per server heat contribution in a data center is shown, according to an exemplary embodiment. As shown in FIG. 16, the system 1600 includes multiple servers, shown as server A 1604, server B 1606, through server Z 1608. Any number of servers may be included in various embodiments.

Server A 1604 is shown to include a server heat contribution agent 1610 configured to determine a heat contribution of server A. That is, the server heat contribution agent 1610 of server A 1604 is configured to determine the heat (e.g., total thermal energy) generated by server A 1604 during operation of the server A 1604. The heat generated by the server A 1604 varies based on the utilization of the server A 1604 (e.g., calculations performed, data transmitted, programs executed, etc.). The server heat contribution agent 1610 for server A may use an artificial intelligence or rules-based algorithm to determine a heat output of server A 1604. In some embodiments, the server heat contribution agent 1610 determines the heat output of server A 1604 in real-time (i.e., for a current/ongoing time period). In other embodiments, the server heat contribution agent 1610 predicts the heat output of server A 1604 over a future time period, for example based on historical data and/or queued tasks awaiting execution by the server A 1604. Various techniques can be used to determine heat output including, but not limited to, assessing processor utilization, clock speeds, memory usage, operations per unit time, power supply output, etc.

The various other servers (e.g., server B 1606 and server Z 1608) also include heat contribution agents (shown in FIG. 16 as server heat contribution agent 1612 and server heat contribution agent 1614). The heat generated by each of the servers 1604-1608 is thereby ascertained on a per server basis (i.e., independently for each server 1604-1608). In other embodiments, heat contribution agents are associated with each CPU, each blade of a data server, or some other sub-unit of a data center, and are configured to ascertain the heat generated by the corresponding sub-unit.

The server heat contribution agents 1610-1614 provide the calculated values of heat contribution for the corresponding servers to a data center heat aggregation circuit 1614. The data center heat aggregation circuit 1614 is configured to receive the values of the heat contribution of the servers 1604-1608 and aggregate (e.g., sum) the values to determine a total amount of heat generated by the servers 1604-1608. The data center heat aggregation circuit 1614 provides an indication of the total amount of heat generated by the servers 1604-1608 to an equipment controller 1616.

The equipment controller 1616 is configured to receive the indication of the total amount of heat generated by the servers 1604-1608 and perform a feedforward control process based on the indication from the data center aggregation circuit 1614. The equipment controller 1616 is configured to determine one or more setpoints for the building equipment 1602 that cause the building equipment 1602 to operate to offset the amount of heat generated by the servers 1604-1608, thereby maintaining the data center at a desired indoor air temperature (e.g., an optimal temperature for operation of the servers 1604-1608). For example, the equipment controller 1616 may control the building equipment 1602 to remove an amount of heat from the data center approximately equal to an amount of heat generated by the servers 1604-1608. In some embodiments, the equipment controller 1616 also accounts for the effects of outdoor air temperature, solar irradiance, etc. on the indoor air temperature, for example increasing the amount of heat removed from the data center by the building equipment 1602 in a scenario where the outdoor air temperature is higher than the desired temperature of the data center.

The amount of heat generated by the servers 1604-1608 (or other sub-units of data center in various embodiments) is thereby ascertained on a per-server (or per-sub-unit) basis and fed forward into a control algorithm for building equipment 1602. The building equipment 1602 can thus be controlled to compensate for server heat generation, without waiting for deviations in measured air temperature from a setpoint and then correcting for such deviations as in other temperature control approaches. A more consistent air temperature at the data center may thus be achieved.

In some embodiments, the heat contribution agent predicts the heat contribution for each respective server 1604, 1606, and 12608 based upon one or more of time of day, time of year, operation schedules, maintenance schedules, historical data, da of the week, etc. The predicted heat load can be provided for future time intervals as appropriate. Pre-cooling, feedforward control, and/or optimization can be performed using the predicted heat load on an individual server basis, in some embodiments.

Predictive Control for Data Center

Figure 17:
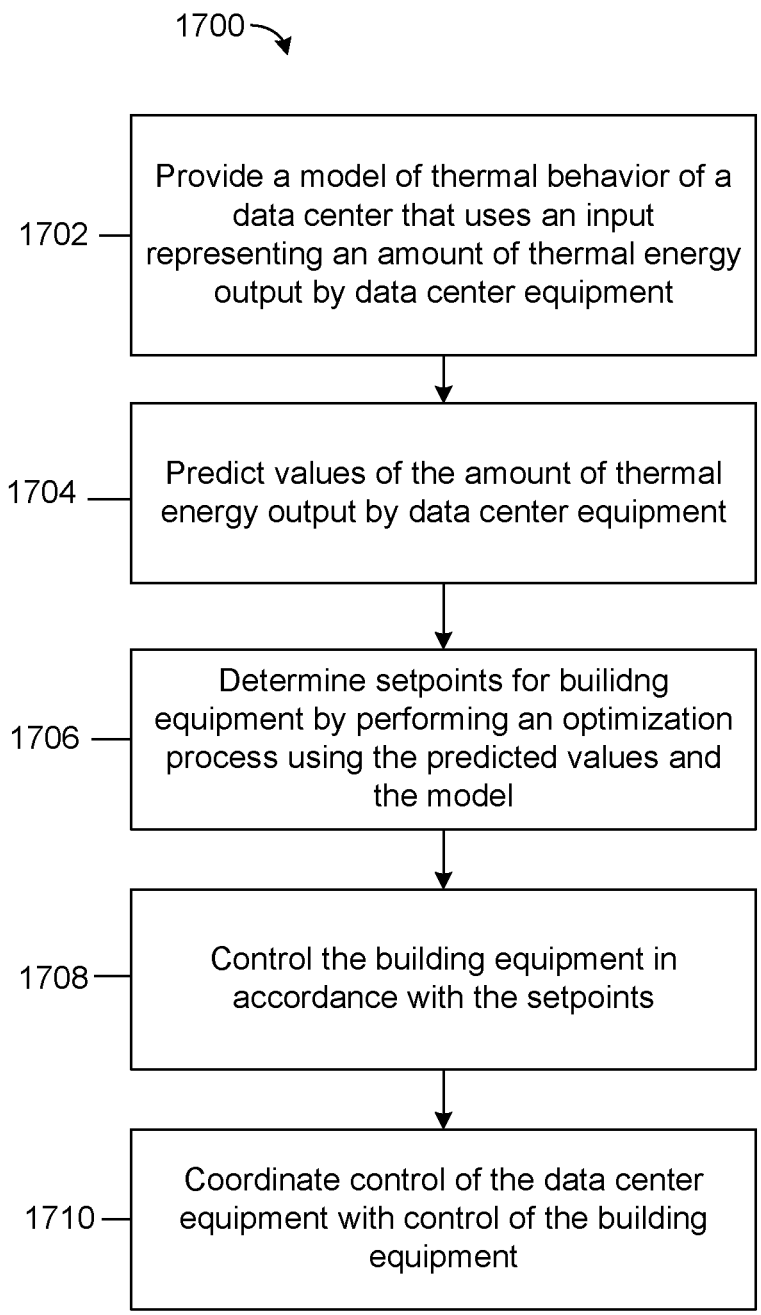
FIG. 17 is a flowchart of a process for controlling thermal behavior of the data center, according to an exemplary embodiment.

Referring now to FIG. 17, a flowchart of a process 1700 for model predictive control for a data center is shown, according to an exemplary embodiment. The process 1700 can be executed using the system 1299, for example. In various embodiments, the process 1700 is used for control of HVAC systems, variable refrigerant flow (VRF) systems, in-floor cooling systems, rooftop units, data center rack cooling equipment, etc.

At step 1702, a model is provided that predicts thermal behavior of the data center. The model uses an amount of thermal energy generated by the data center equipment as an input. In some embodiments, the model uses different amounts of thermal energy generated by different portions of the data center equipment as multiple inputs. In some embodiments, the model is a grey-box model that can be identified using historical data, for example as described above with reference to FIGS. 12-14. In other embodiments, the model is implemented as a neural network or other learning-based or artificial intelligence algorithm. Parameters of the neural network may be obtained using machine learning, for example supervised or unsupervised learning. In some embodiments, a grey-box model as described above is used to generate additional data to facilitate training of a neural network, for example as described in U.S. patent application Ser. No. 16/413,946, filed May 16, 2019, the entire disclosure of which is incorporated by reference herein.

At step 1704, values of the amount of thermal energy generated by the data center are predicted. For example, in some embodiments a relationship between the complexity of calculations executed on the data center equipment 1202 and the heat generated by the data center equipment is determined. Heat generation can then be modeled and predicted based on predicted and/or scheduled upcoming calculations assigned to the data center equipment 1202.

As another example, in some embodiments, a model of a physical layout of the data equipment is used and each data transmission (or a statistical approximation thereof) through the data equipment is analyzed based on a understanding of the starting points, ending points, and paths taken therebetween of various transmissions, calculations, messages, etc. The distance of each transmission may be correlated to an amount of heat generated based on a relationship between electrical resistance, current, and heat. The total amount of heat generated may then be calculated based on an aggregation of the heat generated by each communication/data transmission within the data equipment.

As another example, repeating patterns of the heat generated by the data equipment may be ascertained, for example based on time-of-day, day-of-week, holiday/workday, etc. In some embodiments, a machine-learning algorithm is trained on historical data to predict the amount of heat that will be generated by data center equipment based on inputs such as day of the week, time of day, season, weather, economic conditions, special events, or other domain-specific factors (i.e., relating to the field of use of the data center). Predictions of the amount of thermal energy generated by the data equipment may thereby generated at step 1704.

At step 1706, setpoints for the building equipment are determined by performing an optimization process using the predicted values and the model. In some embodiments, the optimization process includes determining setpoints for the building equipment that are predicted to cause a temperature of the data center to be maintained within an acceptable range while minimizing an overall amount of energy usage, a total operational cost, or some other metric. Some such optimization approaches are described above with reference to FIGS. 1-14. In other embodiments, an artificial intelligence agent is configured to automatically select the setpoints. Such an artificial intelligence agent can be trained on historical data to find setpoints that allow for minimization of overall amount of energy usage, a total operational cost, or some other metric while conforming to temperature constraints of the data center.

At step 1708, the building equipment is controlled in accordance with the setpoints. For example, the setpoints may be amounts of thermal energy to be added or removed from the data center by the building equipment. In such embodiments, the building equipment is controlled to add or remove approximately the amounts of thermal energy defined by the setpoints from the data center. As another example, the setpoints may be indoor air temperature setpoints for the data center, and the building equipment may be controlled using feedback control to drive the indoor air temperature towards the setpoints.

At step 1710, control of the data center equipment is coordinated with control of the building equipment. Such coordination may be executed by artificial intelligence agents, for example coordinating agents 1504 of FIG. 15. For example, in some embodiments coordinating control of the data center equipment with control of the building equipment may result in shifting time-insensitive calculations to times when weather or other factors place a lower load on the building equipment, for example early morning when outdoor air temperatures are lowest. As another example, process 1700 may result in pre-cooling of a data center in advance of times of predicted or schedule high activity for the data center. At step 1710, operations of the data center equipment may be scheduled based on a time-variant cost of operating the building equipment and/or the data center equipment. For example, time-varying utility rates may be accounted for in scheduling operation of the data center equipment and the building equipment to minimize a total utility cost of operating both the data center equipment and the building equipment.

Figure 23:
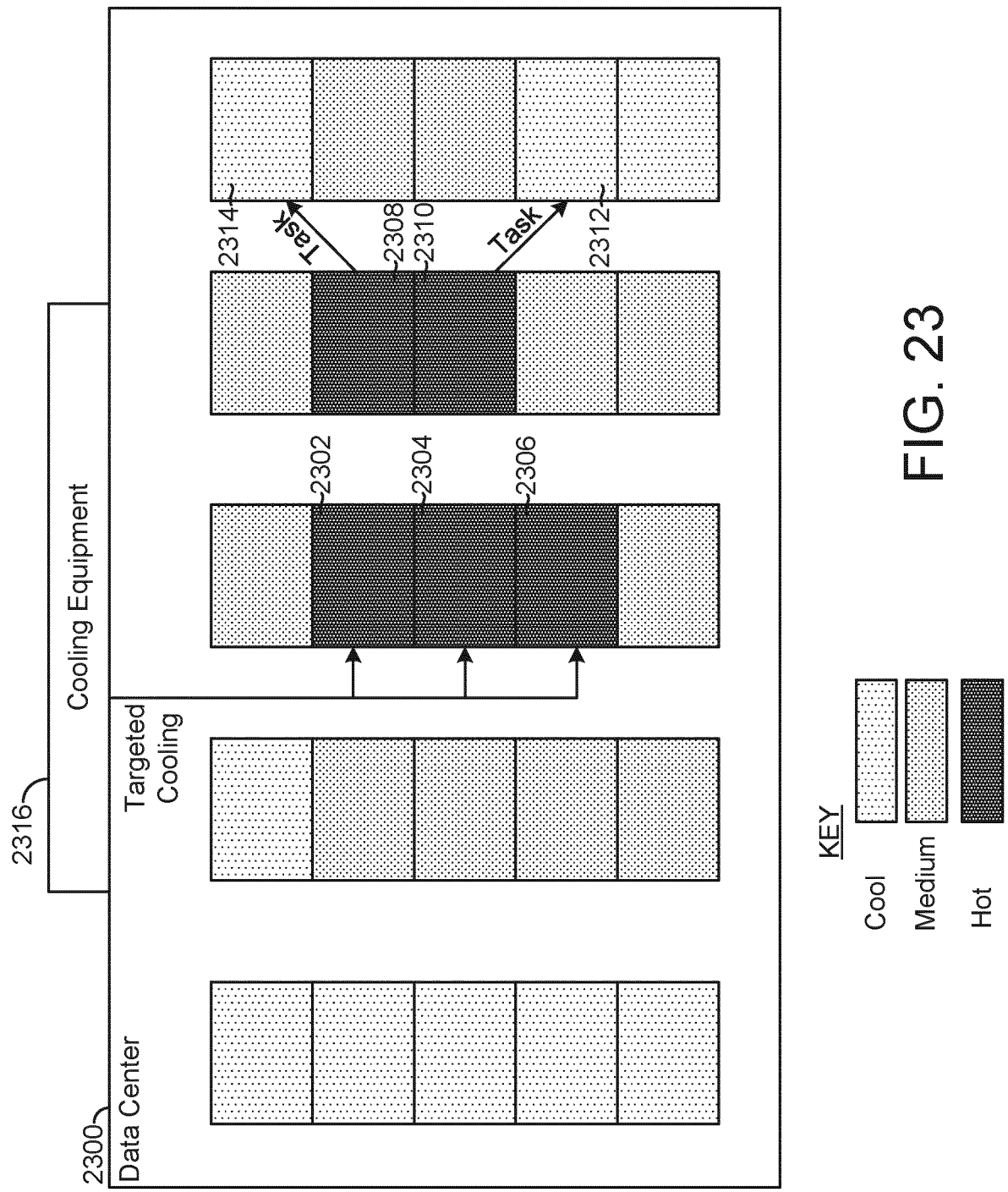
FIG. 23 is an illustration of a heat map for a data center and associated approaches for managing the heat equilibrium, according to an exemplary embodiment.

In some embodiments, the process 1700 is performed on a per-server basis, where the both the setpoints of the building equipment and operating parameters of individual units of data center equipment are controlled using the model. For example, the model can control which servers operate at which rates or execute which tasks to control heat generation in the data room, i.e., by the various servers. In some embodiments, more heat efficient servers or servers in cooler portions of the data room are selected for more operations depending upon predicted heat load. In another example, current cooling capacity on a per-server basis is determined and the load on the servers is adjusted to match the heat contribution to the local cooling capacity for each server. Advantageously, such a model may take advantage of data rooms where certain areas, walls, sub-rooms, racks, etc. have higher cooling capacity than other areas in the data center to optimize heat contribution and control across all areas of the room. In some embodiments, the local cooling capacity is weather dependent and the model accounts for weather with respect to local cooling capacity (e.g., colder weather may result in greater cooling capacity at the external walls and hotter weather may result in less cooling capacity along external walls). FIG. 23 provides an illustration relating to such implementations.

Coordinated Control of Building Equipment and Data Center Equipment

Referring now to FIGS. 18-19, examples processes 1800 and 1900 of coordinated control of building equipment and data center equipment are shown. The processes 1800 and 1900 may occur as part of the process 1700 of FIG. 17, as a result of operation of various systems and methods described herein, or may be executed independently.

FIG. 18 shows a flowchart of a process 1800 for coordinated control of building equipment and data center equipment. At 1802, an upcoming high-activity period for the data center is determined. In some embodiments, the high-activity period may be pre-scheduled, for example with a large task or large number of tasks planed for a particular upcoming time period. In other embodiments, the high-activity period is predicted based on historical data, time of day, etc. For example, a spike in activity of the data center may occur every day at a similar time, for example at a beginning of business hours (e.g., for business services servers), in the evening (e.g., for a data center that handles entertainment services such as video streaming), at an initial release of content to a large audience, etc.

At step 1804, the data center is pre-cooled in advance of the upcoming high-activity period. For example, a temperature setpoint for the data center may be lowered to a bottom of an optimal temperature range for the data center equipment or below such a temperature range. Building equipment (including, in some cases, specialty data center cooling devices) may be controlled to drive the temperature of the data center to the lowered setpoint, thereby reducing the temperature in the data center before the high-activity period.

When the high-activity period occurs, the data center equipment will generate heat. Because the data center was pre-cooled, the temperature of the data center can be allowed to drift upwards during the high-activity period. The building equipment need not offset the entirety of the heat generation of the data center equipment during the high-activity period. The peak load on the building equipment may thereby be reduced. Furthermore, process 1800 may result in a separation of peak operation of the data center equipment from peak operation of the building equipment which can reduce peak demand on energy resources for the overall facility.

FIG. 19 illustrates a process 1900 for coordinated control of building equipment and data center equipment. At step 1902, low-cost periods and/or high-costs periods for operation of building equipment are identified. In some embodiments, low-cost and high-cost periods are differentiated based on time varying utility rates, such that the low-cost periods correspond to relatively cheap utility rates while the high-cost periods correspond to relative expensive utility rates. In some embodiments, the low-cost and high-cost periods are defined based on an incentive-based response program of a utility company, for example a demand response program or a peak contribution program. In other embodiments, the low-cost and high-cost periods are determined based on the relative efficiency (e.g., coefficient of performance) of operating the building equipment at different times. For example, cooling equipment may operate more efficiently at lower outdoor air temperatures, and in some cases outdoor air may be used directly to cool the data center. Accordingly, the low-cost periods may be periods of low outdoor air temperature, where the high-cost periods are periods of high outdoor air temperature.

At step 1904, time-insensitive data center tasks scheduled for high-costs periods are identified. For example, a list of all tasks scheduled to be executed by the data center during high-costs periods may be determined. Those tasks may then be classified based on the type of task, due date for execution, criticality, priority, etc. Based on such criteria, those tasks which are time-insensitive (i.e., which do not need to be executed at a particular time or during the high-cost period) are identified.

At step 1906, data center operations are rescheduled to shift the tasks identified at step 1904 to low-cost periods. That is, step 1906 includes actively managing the data center schedule and operation to cause tasks to be executed during low-cost periods where possible. As a result, heat generation associated with such tasks can be compensated for by the building equipment during low-cost periods rather than during high-cost periods, thereby reducing the overall cost of operating the building equipment and the data center facility as a whole.

Total Resource Consumption Optimization with Server Efficiency Model

Figure 20:
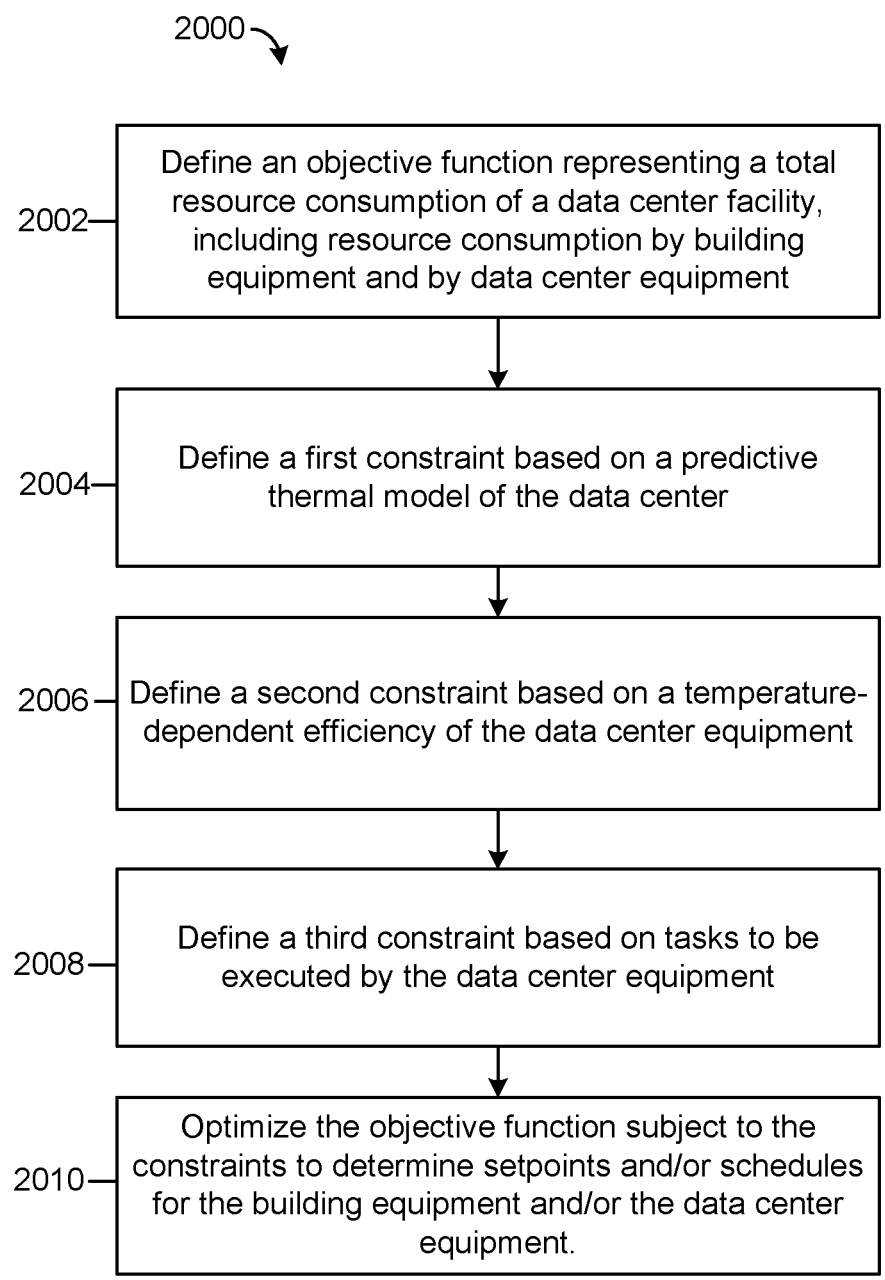
FIG. 20 is a flowchart of a process for controlling thermal behavior of the data center, according to an exemplary embodiment.

Referring now to FIG. 20, a flowchart of a process 2000 for optimizing resource consumption of a data center is shown, according to an exemplary embodiment. As described in detail in the following, the process 2000 includes consideration of the resource consumption of building equipment, the resource consumption of the data center equipment, and the efficiency of the data center equipment as a function of temperature. By accounting for these characteristics, control of the building equipment and the data center equipment can be optimized to minimize resource consumption while meeting performance expectations for the data center equipment.

At step 2002, an objective function is defined that represents a total resource consumption of a data center facility. The objective function may account for both resource consumption by building equipment and resource consumption by data center equipment. For example, in some embodiments, the objective function takes the form of: $J(x, y, t) = J_{BE}(x, t) + J_{DCE}(y, t)$, where $J_{BE}(x, t)$ describes a total resource consumption of the building equipment at time t for a control dispatch x, while $J_{DCE}(y, t)$ describes a total resource consumption of the data center equipment at time t for a control variable y. The control variable x may be defined variously depending on the building equipment available in a given embodiment, and may include temperature setpoints, energy targets, operating setpoints, etc. in various embodiments. The control variable y for the data center may be defined variously depending on the controllable variables relating to operation of the data center equipment. For example, in some embodiments, operation of the data center equipment can be characterized based on a number of tasks y performed by the data center equipment in a time step. For example, the resource consumption may be defined as $J_{DCE}(y, t) = \rho(t)*y(t)$, where $\rho(t)$ defines an amount of resources consumed per task and y(t) is a number of tasks performed by the data center equipment at time t.

At step 2004, a first constraint is defined based on a predictive thermal model of the data center. For example, the predictive thermal model may be defined as described above with reference to FIG. 13 and identified based on training data as described with reference to FIG. 14. For example, as explained in further detail above, the thermal model may be defined as:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{DCE}$$

$$C_m \dot{T}_m = \frac{1}{R_{mi}}(T_{ia} - T_m).$$

In this example, $\dot{Q}_{HVAC}$ is a function of the control variable x and $\dot{Q}_{DCE}$ is a function of the control variable y, thereby creating interactions between the objective function and the thermal model. In other embodiments, other types of models, for example a neural-network-based model may be used to predict thermal behavior of the data center. In such an example, the neural network may use the variables x and y as inputs to the neural network.

At step 2006, a second constraint is defined based on a temperature-dependent efficiency of the data center equipment. For example, the value of the efficiency function $\rho(t)$ may be defined as a function of air temperature at the data center equipment, i.e., indoor air temperature $T_{ia}$, for example $\rho(t)=\rho(T_{ia}(t))$. In such a case, the per-task resource consumption is modeled as being dependent on the air temperature at the data center equipment. As one possible example, the efficiency function $\rho(T_{ia}(t))$ may be defined as a Gaussian curve with a maximum values at an optimal temperature for the data center equipment and decreasing away from such optimal temperature. The efficiency function $\rho(t)$ may be dependent on various other variables in various embodiments.

At step 2008, a third constraint is defined based on the tasks to be executed by the data center equipment. For example, due to expectations of the performance of the data center equipment, the values of y(t) may be required to exceed a minimum value. For example, the total number of tasks over a time period including multiple time steps may be required to exceed a minimum value, i.e., $\int_{t=0}^{t=T} y(t) > y_{min,total}$. In such a case, the third constraint allows a degree of freedom in allocation of the tasks across the time period (i.e., across t=0, . . . , T).

In some embodiments, additional constraints are imposed. For example, a maximum number of tasks for any particular time may be imposed (e.g., $y(t)<y_{max}$) based on limitations of the data center equipment.

At step 2010, the objective function is optimized subject to the constraints to determine setpoints and/or schedules for the building equipment and/or the data center equipment. For example, an optimization process may be performed to select values of the number of calculations y to be performed by the data center equipment and values of the dispatch x (e.g., an energy target, a temperature setpoint, an operating setpoint) for the building equipment which, together, correspond to a minimum value of the resource consumption of the data center while satisfying the constraints. In some examples, the optimization process is optimized over a time horizon, for example, to select the minimum value of $\int_{t=0}^{t=T} J(x, y, t)$, for example by optimally allocating data center computation tasks and building equipment operation across the time steps t of period t=0, . . . T. Resource consumption for the entire data center can thereby be optimized in an integrated process.

The notation and formulation of FIG. 20 relates to some embodiments of the process 2000. Other formulations and algorithms are also possible, for example based on an artificial intelligence, neural network, and/or machine learning approach to optimizing overall resource usage of the data center.

Asset Allocation System for Data Center

Figure 21:
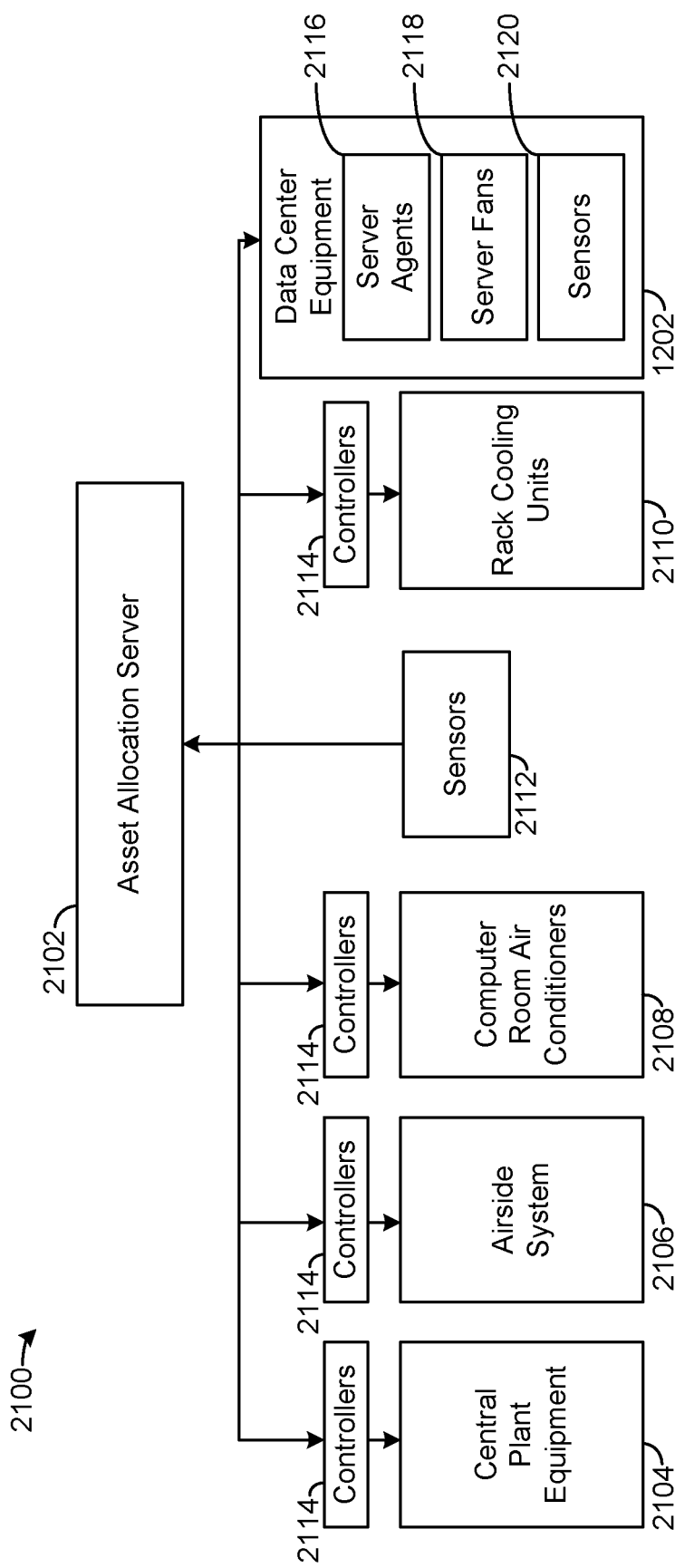
FIG. 21 is a block diagram of a system of controlling thermal behavior of the data center, according to an exemplary embodiment.

Referring now to FIG. 21, a block diagram of a system 2100 for managing operation of a data center is shown, according to an exemplary embodiment. The system 2100 includes an asset allocation server 2102, central plant equipment 2104, airside system 2106, computer room air conditioners 2108, rack cooling units 2110, data center equipment 1202, and sensors 2112. The system 2100 also includes controllers 2114 configured to control the central plant equipment 2104, airside system 2106, computer room air conditioners 2108, and rack cooling units 2110. In other embodiments, other heating and/or cooling equipment is include (e.g., variable refrigerant flow systems, liquid cooling systems, rooftop units, etc.). The data center equipment 1202 is shown to include server agents 2116, server fans 2118, and sensors 2120.

The central plant equipment 2104, airside system 2106, computer room air conditioners 2108, rack cooling units 2110, and server fans 2118 all function to affect the temperature of the data center equipment. The central plant equipment 2104 may include subplants described with reference to FIGS. 1-10. The airside system 2106 includes HVAC air handling units and/or other airside equipment that uses chilled water (or hot water) from the central plant equipment 2104 to heat or cool a building zone.

The computer room air conditioners 2108 may be specialized cooling equipment for a data room and can be rooftop units. The computer room air conditioners 2108 may include local refrigeration equipment or may use chilled water from the central plant equipment 2104 (or other resource such as a variable refrigerant flow outdoor unit). The computer room air conditioners 2108 are positioned in the data center and remove heat from the data center. In some embodiments, the computer room air conditioners 2108 intake warm ambient air from the data center, cool the air using a chilled fluid (from the central plant equipment 2104 or chilled locally at the computer room air conditioner 2108), and provide the cooled air into sub-floor ducts. The cooled air moves through the sub-floor ducts, which vent out at locations aligned with server racks for the data center equipment 1202. The computer room air conditioners 2108 thereby operated to move cooled air directly to the data center equipment 1202.

The rack cooling units 2110 are installed on the server racks (i.e., mounted on a shared structure with the data center equipment 1202) and operated to cool the data center equipment 1202. In some embodiments, the rack cooling units 2110 receive chilled fluid from the central plant equipment 2104 (or other resource such as a variable refrigerant flow outdoor unit). In other embodiments, a refrigeration cycle is executed locally at the rack cooling units 2110. The rack cooling units 2110 operate locally at individual units of data center equipment 1202 and may therefore be advantageous for targeting temperature changes at individual units of data center equipment 1202

The server fans 2118 are located on the servers (data center equipment 1202) and operate to blow air across the servers to cool the servers. The effectiveness of the fans 2118 is dependent on the temperature of the air taken in by the fans 2118 to be blown across the servers. The server fans 2118 may consume electricity. The server fans 2118 can be controlled by the asset allocation server 2102 by communicating with server agents 2116.

The asset allocation server 2102 is configured to allocate loads across the central plant equipment 2104, airside system 2106, computer room air conditioners 2108, rack cooling units 2110, and server fans 2118, for example to optimally manage the temperature of the data center equipment 1202. In some embodiments, the asset allocation server 2102 is configured to coordinate control of or assist coordination of the central plant equipment 2104, airside system 2106, computer room air conditioners 2108, rack cooling units 2110, and server fans 2118. The overall thermal behavior of the system can be optimized in an integrated process while minimizing a total resource usage of all such assets. The asset allocation server 2102 may receive and utilize data from sensors 2112 at the data center and/or sensors 2120 in the data center equipment. The asset allocation server 2102 may also receive data from the server agents 2116 and the various controllers 2114.

The asset allocation server 2102 may be performed using integrated control across the system 2100 using the integrated optimization processes of U.S. patent application Ser. No. 14/694,633, filed Apr. 23, 2015, the entire disclosure of which is incorporated herein by reference. In some embodiments, the asset allocation server 2102 may allocate loads across the system 2100 using the asset allocation processes of U.S. patent application Ser. No. 15/473,496, filed Mar. 29, 2017, the entire disclosure of which is incorporated herein by reference. In some embodiments, the asset allocation server 2102 executes process 1700, process 1800, process 1900, and/or process 2000. For example, the asset allocation process of U.S. patent application Ser. No. 15/473,496, filed Mar. 29, 2017, the entire disclosure of which is incorporated herein by reference, may be adapted to account for and control operation of the data center equipment as described with reference to FIGS. 17-20.

The asset allocation server 2102 may thereby generate control dispatches for the c central plant equipment 2104, airside system 2106, computer room air conditioners 2108, rack cooling units 2110, and data center equipment 1202, and transmit such dispatches to the controllers 2114 and the server agents 2116. The system 2100 can thereby be operated in a unified manner for optimal performance.

In some embodiments, the asset allocation server 2102 is remote from the data center. In other embodiments, the asset allocation server 2102 is included in the data center equipment 1202 and operates locally within the data center, such that the asset allocation server 2102 is among the servers for which temperature is managed by operation of the asset allocation server 2102.

Liquid Cooling for Data Center

Figure 22:
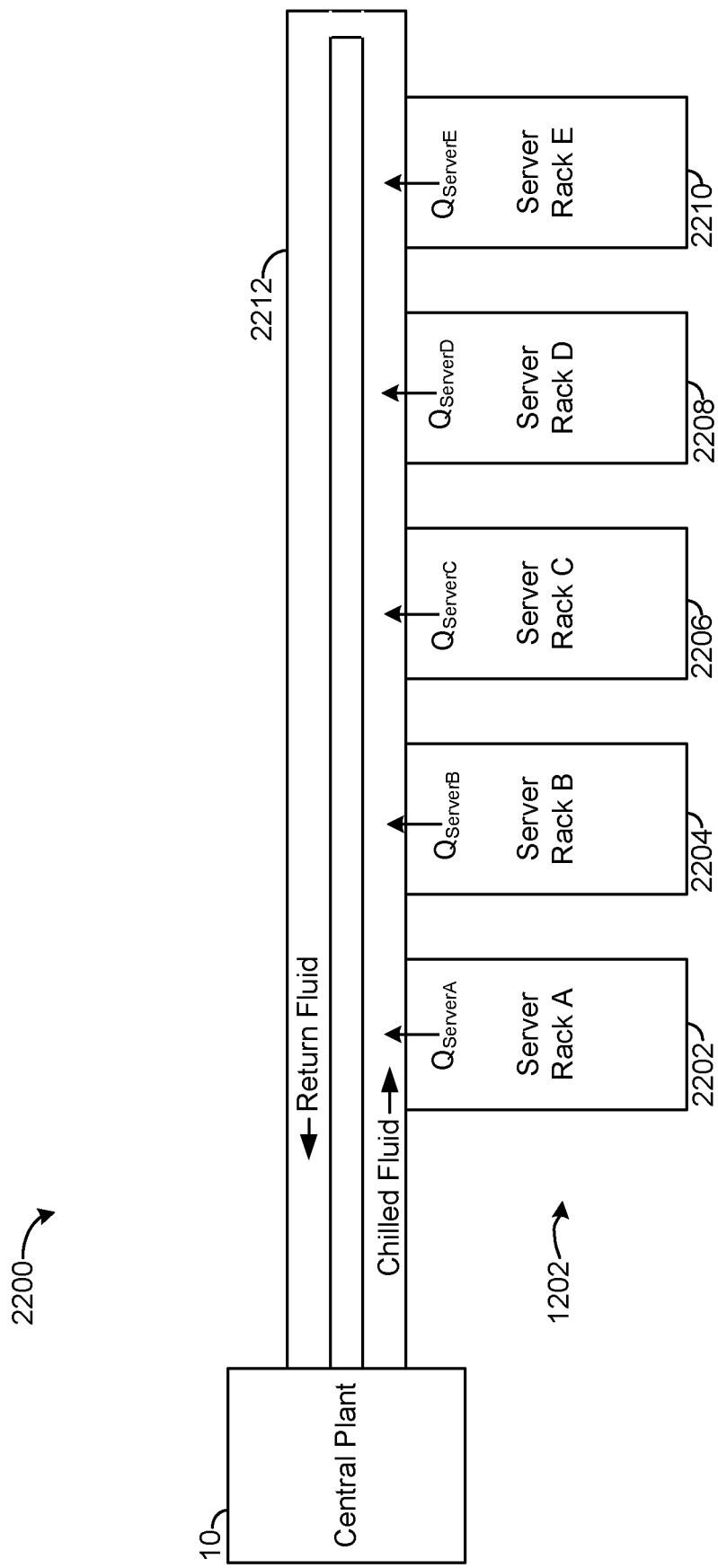
FIG. 22 is schematic illustration of a liquid cooling system for a data center, according to an exemplary embodiment.

Referring now to FIG. 22, a schematic illustration of a system 2200 that provides liquid cooling for a data center is shown, according to an exemplary embodiment. As described in detail above, the central plant 10 is configured to generate chilled fluid (e.g., water) that can be provide to a building, including to a data center. In the system 2200, the chilled fluid is used for liquid cooling of the data center. In the example shown the central plant 10 provides chilled fluid to a data center via a pipe (or other fluid pathway) 2212. The fluid is also returned to the central plant 10 via the pipe 2212.

In the example shown, the data center equipment 1202 includes multiple server racks, shown as server rack A 2202, server rack B 2204, server rack C 2206, server rack D 2208, and server rack E 2210. Each server rack is in direct thermal contact with the pipe 2212. For example, each server rack may include a heat exchanger configured to provide a high efficiency of thermal energy transfer from the server rack to the pipe 2212. In the illustration of FIG. 22, server rack A 2202 provides thermal energy generated by devices at server rack A 2202, denoted as $Q_{ServerA}$, to the chilled fluid from the central plant 10. Additionally, server rack B 2204 provides thermal energy generated by devices at server rack B 2204, denoted as $Q_{ServerB}$, to the chilled fluid from the central plant 10, server rack C 2206 provides thermal energy generated by devices at server rack C 2206, denoted as $Q_{ServerC}$, to the chilled fluid from the central plant 10, server rack D 2208 provides thermal energy generated by devices at server rack D 2208, denoted as $Q_{ServerD}$, to the chilled fluid from the central plant 10, and server rack E 2210 provides thermal energy generated by devices at server rack E 2210, denoted as $Q_{ServerE}$, to the chilled fluid from the central plant 10. Although the racks 2202-2210 are shown as arranged in series along the pipe 2212, in other embodiments, the pipe 2212 is configure to interact with the racks 2202-2210 in parallel.

The fluid warms due to the thermal energy from the racks 2202-2210. The return fluid is returned to the central plant 10, where it can be chilled again or otherwise allocated in the central plant 10.

Advantageously, the liquid cooling system 2200 is configured to benefit from all of the various features described above with reference to FIGS. 1-11. In particular, the chilled water load attributable to the liquid cooling system 2200 for the data center equipment 1202 can be incorporated into the central plant optimization systems and methods of FIGS. 1-11, and the central plant controller can be configured to allocate loads to cover the demands of the liquid cooling system 2200. The liquid cooling system 2200 may also be used with the systems and methods of FIGS. 12-21.

Controlling Heat and Task Distribution Across Data Center

Referring now to FIG. 23, an illustration of heat and task distribution across a data center is shown, according to an exemplary embodiment. In particular, FIG. 23 shows a heat map of a data center 2300. The heat map shows multiple servers (data center equipment 1202), with the illustration indicating a relative temperature of each server. For example, server 2302, server 2304, server 2306, server 2308, and server 2310 are shown as being hot, e.g., relative to a preset value above which a server is classified as hot. As another example, server 2312 and server 2314 are shown as being cool, e.g., relative to a preset value below which a server is classified as being cool. Other servers are shown as medium temperature, e.g., at temperatures between the values that define the hot and cold categories.

The data shown in the heat map of FIG. 23 may be collected by sensors positioned in the servers and/or by multiple sensors or cameras distributed around the data center 2300. The sensors can detect hot spots in the data center. Temperature differential across the servers may be caused by differences in task allocation across the servers, hardware differences between the servers, proximity of servers to airflow, heat flow through walls or from building mass, the arrangement and operation of cooling equipment 2316, etc. The temperature differential is considered across the area of the data center (e.g., the floor) or across vertical levels (i.e., in two dimensions), or across volumes in three-dimensions. Server locations and operations can be adjusted to reduce temperature gradations vertically and/or across the area of the data center in some embodiments.

In some embodiments, different servers have different optimal operating temperatures. In such cases, the classification illustrated by the heat map may be configured to adjust for such differences by independently defining the classification criteria for each server. Accordingly, each server may be classified as hot, medium, or cool based on the optimal operating temperature or temperature range of the corresponding server. A server-by-server thermal control may be implemented based on a particular temperature setpoint for each particular server.

As illustrated in FIG. 23, the cooling equipment 2316 (e.g., computer room air conditioners, rack cooling units, server fans, airside system, liquid cooling system) that serves the data center 2200 may be configured to provide targeted cooling to the servers classified as being hot. In the example shown, the cooling equipment 2316 provides targeted cooling to hot servers 2302-2306. By targeting the cooling, energy is saved from being used to needlessly affect the temperature of other servers which are already maintained at an acceptable temperature level. Additionally, cooling can be directed as need to control to different setpoints for different servers.

Also as illustrated in FIG. 23, in some cases the data center 2300 is controlled to shift tasks from hot servers to cool- or medium-temperature servers. In the example shown, tasks originally scheduled to be executed by server 2308 are reassigned to server 2314, while tasks originally scheduled to be executed by server 2310 are reassigned to server 2312. The heat generation associated with execution of these tasks is thereby also shifted from the hot servers 2308-2310 to cool servers 2312-2314, potentially achieving a similar heat-reduction as that which would result from targeted cooling. Heat may thereby be spread more evenly around the data center 2300, which may reduce the risk of overheating of any individual server and reduce the need for targeted cooling. This may increase the reliability and efficiency of all servers in the data room as well as reduce the load on the cooling equipment 2316. Additionally, task shifting may facilitate controlling temperature to different setpoints for different servers.

In various embodiments, coordination of targeted cooling from the cooling equipment 2316 and task shifting between servers is performed, for example by integrated controller 1500 of FIG. 15 or asset allocation server 2102 of FIG. 21. One goal for balancing the use of targeted cooling and task shifting may be an attempted to establish an equilibrium across the data room. In some cases, a temperature gradient across the data room is minimized by task shifting and control of the cooling equipment 2316. In some embodiments, process 2000 is adapted to provide for control on a per-server basis that optimizes overall resource usage.

In some embodiments, the data center includes multiple temperature sensors disposed at multiple spots in the data center. The sensors can detect hot spots within the data center (e.g., due to operations of one or more servers). In some embodiments, the hot spots are detected using one or more thermal cameras in the data room. The operations performed by the one or more servers in the hot spots are shifted by the load control agent or other controller to other servers outside of the hot spots in some embodiments. In some embodiments, servers in the cooler and/or coolest areas of the rooms are chosen for the operations shed form the servers in the hot spots. In some embodiments, the servers are deployed in movable racks on automated carts and the carts are moved outside of the hot spots to cooler area in the data room in response to a detection of a hot spot. In some embodiments, the load control agent adjusts the loads on the server or the placement of the servers to achieve a thermal equilibrium throughout the data center. In some embodiments, the cooling equipment may directly provide cool air or liquid to the hot spot location in response to hot spot detection.

Various adaptations of the systems and methods described herein to facilitate server-by-server monitoring and control are within the scope of the present disclosure.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for operating a heating, ventilation, and air conditioning (HVAC) system in a data center, the method comprising:
   removing heat from air in the data center utilizing the HVAC system;
   collecting space temperature data, server temperature data, and time series data associated with the space temperature data and the server temperature data;
   using the space temperature data, the server temperature data, the time series data, and a model of performance for the HVAC system and the data center to predict changes to the HVAC system and the data center, the changes predicted to conserve energy while complying with (i) temperature constraints for the data center and (ii) a processing demand constraint on the data center; and
   electronically controlling the HVAC system and the data center in accordance with the changes for both the HVAC system and the data center.

2. The method of claim 1, wherein the model of performance of the HVAC system and the data center models an operational efficiency of servers of the data center as a function of at least one of the space temperature data or the server temperature data.

3. The method of claim 1, wherein the model of performance for the HVAC system and the data center models thermal behavior of the data center as a function of a predicted outdoor air temperature.

4. The method of claim 1, wherein the changes comprises operating the HVAC system to pre-cool the data center in advance of a predicted increase in the processing demand on the data center.

5. The method of claim 1, wherein the changes comprises shifting one or more computing tasks of the data center to a time period corresponding to a predicted increase in the efficiency of the HVAC system.

6. The method of claim 1, wherein the temperature constraints for the data center comprise a plurality of server temperature constraints corresponding to a plurality of servers.

7. The method of claim 1, wherein the changes comprise providing targeted cooling to a first server of the data center and reassigning tasks from a second server of the data center to a third server of the data center.

8. The method of claim 1, further comprising collecting utility cost data comprising a time-variant cost of operating the data center, wherein predicting the changes to the HVAC system further uses the utility cost data, and wherein the changes are further predicted to conserve a cost of operating the data center.

9. A heating, ventilation, and air conditioning (HVAC) system for a data center, the system comprising:
one or more sensors configured to measure space temperature and server temperature data associated with the data center; and
a controller comprising one or more processors configured to:
electronically control HVAC equipment to remove heat from air in the data center;
collect, by the one or more sensors, the space temperature data, the server temperature data, and time series data associated with the space temperature data and the server temperature data;
predict changes to the HVAC system and the data center that conserve energy while complying with (i) temperature constraints for the data center and (ii) a processing demand constraint on the data center, the changes predicted using the space temperature data, the time series data, the server temperature data, and a model of performance for the HVAC system and the data center; and
electronically control the HVAC equipment and the data center in accordance with the changes for both the HVAC system and the data center.

10. The system of claim 9, wherein the model of performance of the HVAC system and the data center models an operational efficiency of servers of the data center as a function of at least one of the space temperature data or the server temperature data.

11. The system of claim 9, wherein the model of performance for the HVAC system and the data center models thermal behavior of the data center as a function of a predicted outdoor air temperature.

12. The system of claim 9, wherein the changes comprises operating the HVAC equipment to pre-cool the data center in advance of a predicted increase in the processing demand on the data center.

13. The system of claim 9, wherein the changes comprises shifting one or more computing tasks of the data center to a time period corresponding to a predicted increase in the efficiency of the HVAC system.

14. The system of claim 9, wherein the temperature constraints for the data center comprise a plurality of server temperature constraints corresponding to a plurality of servers.

15. The system of claim 9, wherein the changes comprise providing targeted cooling to a first server of the data center and reassigning tasks from a second server of the data center to a third server of the data center.

16. The system of claim 9, wherein the processors are further configured to collect utility cost data comprising a time-variant cost of operating the data center, wherein predicting the changes to the HVAC system further uses the utility cost data, and wherein the changes are further predicted to conserve a cost of operating the data center.

17. A non-transitory computer readable medium comprising instructions stored thereon that, when executed by one or more processors, cause the one or more processors to:
electronically control heating, ventilation, and air conditioning (HVAC) equipment associated with a data center to remove heat from air in the data center;
collect, by the one or more sensors, space temperature data, server temperature data, and time series data associated with the space temperature data and the server temperature data;
predict changes to an HVAC system and the data center that conserve energy while complying with (i) temperature constraints for the data center and (ii) a processing demand constraint on the data center, the changes predicted using the space temperature data, the time series data, the server temperature data, and a model of performance for the HVAC system and the data center; and
electronically control the HVAC equipment and the data center in accordance with the changes for both the HVAC system and the data center.

18. The computer readable medium of claim 17, wherein the model of performance of the HVAC system and the data center models an operational efficiency of servers of the data center as a function of at least one of the space temperature data or the server temperature data.

19. The computer readable medium of claim 17, wherein the model of performance for the HVAC system and the data center models thermal behavior of the data center as a function of a predicted outdoor air temperature.

20. The computer readable medium of claim 17, wherein the changes comprises operating the HVAC equipment to pre-cool the data center in advance of a predicted increase in the processing demand on the data center.

21. The computer readable medium of claim 17, wherein the changes comprises shifting one or more computing tasks of the data center to a time period corresponding to a predicted increase in the efficiency of the HVAC system.

22. The computer readable medium of claim 17, wherein the changes comprise providing targeted cooling to a first server of the data center and reassigning tasks from a second server of the data center to a third server of the data center.

23. The computer readable medium of claim 17, wherein the instructions further cause the one or more processors to collect utility cost data comprising a time-variant cost of operating the data center, wherein predicting the changes further uses the utility cost data, and wherein the changes are further predicted to conserve a cost of operating the data center.

* * * * *